(12) United States Patent
Nakamura et al.

(10) Patent No.: US 10,975,973 B2
(45) Date of Patent: Apr. 13, 2021

(54) TUBE UNIT AND TRANSPORT APPARATUS

(71) Applicant: SoLARIS Inc., Tokyo (JP)

(72) Inventors: Taro Nakamura, Tokyo (JP); Yasuyuki Yamada, Tokyo (JP); Shun Yoshihama, Tokyo (JP); Kyota Ashigaki, Tokyo (JP)

(73) Assignee: SOLARIS INC., Tokyo (JP)

( * ) Notice: Subject to any disclaimer, the term of this patent is extended or adjusted under 35 U.S.C. 154(b) by 106 days.

(21) Appl. No.: 16/335,404

(22) PCT Filed: Sep. 21, 2017

(86) PCT No.: PCT/JP2017/034165
§ 371 (c)(1),
(2) Date: Mar. 21, 2019

(87) PCT Pub. No.: WO2018/056378
PCT Pub. Date: Mar. 29, 2018

(65) Prior Publication Data
US 2020/0018404 A1    Jan. 16, 2020

(30) Foreign Application Priority Data

Sep. 21, 2016 (JP) .............................. JP2016-184533
Sep. 27, 2016 (JP) .............................. JP2016-188567
(Continued)

(51) Int. Cl.
*F16K 7/07*  (2006.01)
(52) U.S. Cl.
CPC ..................................... *F16K 7/07* (2013.01)

(58) Field of Classification Search
CPC ............. F16K 7/07; F04B 43/12; F01B 19/04
See application file for complete search history.

(56) References Cited

U.S. PATENT DOCUMENTS 2,026,916 A * 1/1936 Smith ....................... E03D 3/06
251/46
2,487,226 A * 11/1949 Eastman ................... F16K 7/07
251/5
(Continued)

FOREIGN PATENT DOCUMENTS

| CN | 101493087 A | 7/2009 |
| JP | H05-33773 A | 2/1993 |

(Continued)

OTHER PUBLICATIONS

May 19, 2020 Office Action issued in Japanese Patent Application No. 2016-237121.
(Continued)

*Primary Examiner* — Umashankar Venkatesan
(74) *Attorney, Agent, or Firm* — Oliff PLC

(57) ABSTRACT

A tube unit includes an inner tube that is elastically deformable and has a tubular shape, and a pressurized space forming portion that forms a pressurized space in contact with an outer peripheral surface of the inner tube between the inner tube and the pressurized space forming portion. The inner tube is operable between a minimum pressure state and a maximum pressure state. The inner tube has a cross-section having a non-circular shape perpendicular to an axial direction in the minimum pressure state. A transport apparatus includes the tube unit and a pressure controller.

15 Claims, 48 Drawing Sheets

(30) Foreign Application Priority Data

Dec. 6, 2016 (JP) .............................. JP2016-237120
Dec. 6, 2016 (JP) .............................. JP2016-237121

(56) References Cited

U.S. PATENT DOCUMENTS

| | | | | |
|---|---|---|---|---|
| 2,575,240 A | * | 11/1951 | Thompson | F16K 7/07 137/885 |
| 2,750,959 A | * | 6/1956 | Von Seggern | F16K 7/07 251/5 |
| 2,964,285 A | * | 12/1960 | Bardet | F16K 7/07 251/5 |
| 2,982,511 A | * | 5/1961 | Connor | F16K 7/07 251/5 |

FOREIGN PATENT DOCUMENTS

| | | |
|---|---|---|
| JP | 2000-002184 A | 1/2000 |
| JP | 2000-234589 A | 8/2000 |
| JP | 2010-196689 A | 9/2010 |
| JP | 2012-071230 A | 4/2012 |
| JP | 2013-174139 A | 9/2013 |

OTHER PUBLICATIONS

May 19, 2020 Office Action issued in Japanese Patent Application No. 2016-237120.
Mar. 26, 2019 International Preliminary Report on Patentability issued in International Patent Application No. PCT/JP2017/034165.
Nov. 1, 2019 Office Action issued in Chinese Patent Application No. 201780058403.3.
Aug. 4, 2020 Office Action issued in Japanese Patent Application No. 2016-237121.
Nov. 14, 2017 International Search Report issued in International Patent Application No. PCT/JP2017/034165.
Sep. 8, 2020 Office Action issued in Japanese Patent Application No. 2016-237120.

* cited by examiner

Cross-sectional view taken from arrow A-A

Inflow side

Inflow side

Inflow side

Inflow side

TUBE UNIT AND TRANSPORT APPARATUS

TECHNICAL FIELD

The present disclosure relates to a tube unit and a transport apparatus.

BACKGROUND

Conventionally, as a tube unit used for a transporting apparatus configured to transport a transport object such as a fluid, a gas-liquid mixture or a solid-liquid mixture, tube units provided with an inner tube that is elastically deformable and has a tubular shape, and a pressurized space forming portion configured to form a pressurized space in contact with an outer peripheral surface of the inner tube between the outer peripheral surface of the inner tube and the pressurized space forming portion are known (e.g., see PTL 1 and PTL 2). Such tube units are configured to be operable between a minimum pressure state, in which an inner pressure of the pressurized space is minimized by the discharge of a pressurizing medium, and a maximum pressure state, in which the inner pressure is maximized by the supply of the pressurizing medium and the inner tube is deformed expanding in the radially inward direction due to the increase in the inner pressure from the minimum pressure state, whereby an inner space formed by the inner peripheral surface of the inner tube is contracted. The transport apparatus can transport the transport object from the inner space to the outside by causing a pressure controller to bring the inner tube into the maximum pressure state such that the inner space is contracted.

CITATION LIST

Patent Literature

PTL 1: JP-A-2013-174139
PTL 2: JP-A-2010-196689

SUMMARY

Technical Problem

In the conventional tube units as described in the PTL 1 and PTL 2, the inner tube includes localized protrusions or grooves for the purpose of elastically deforming the inner tube in the radially inward direction by, for example, causing buckling in a predetermined position on the circumference of the inner tube in the cylindrical shape. However, it is desired to realize elastic deformation of the inner tube in a more stable manner.

In light of the above problem, a first object of the present disclosure is to provide a tube unit and a transport apparatus capable of realizing elastic deformation of the inner tube in a stable manner.

In the conventional tube units as described in the PTL 1 and PTL 2, an optimal shape of the inner tube in the minimum pressure state depends on the purpose and usage such as having stable expanding deformation of the inner tube in the radially inward direction by causing buckling in a predetermined position on the periphery of the inner tube. However, it is not preferable to manufacture inner tubes with different shapes or structures to be used in tube units for different purposes or usages, from the viewpoint of manufacturing efficiency.

In light of this problem, a second object of the present disclosure is to provide a tube unit and a transport apparatus that include an inner tube that may be shaped as desired during operation, regardless of a shape and a structure of the inner tube.

The transport apparatuses as described in the PTL 1 and PTL 2 which include a plurality conventional tube units coupled to one another transport a transport object downstream in a pushing manner by sequentially repeating a process to expand the inner tubes of the tube units in a radially inward direction from an upstream side to a downstream side in a manner similar to peristalsis. This poses a problem that an improvement in a transport speed can be limited.

In light of this problem, a third object of the present disclosure is to provide a transport apparatus capable of improving transportation efficiency of a transport object.

Solution to Problem

According to an embodiment of the present disclosure, a tube unit includes an inner tube that is elastically deformable and has a tubular shape, and a pressurized space forming portion configured to form a pressurized space in contact with an outer peripheral surface of the inner tube between the outer peripheral surface and the pressurized space forming portion. The inner tube is configured to be operable between a minimum pressure state and a maximum state. In the minimum state, an inner pressure of the pressurized space is minimized by discharge of a pressurizing medium. In the maximum pressure state, the inner pressure is maximized by supply of the pressurized medium and the inner tube is deformed expanding in a radially inward direction due to an increase in the inner pressure from the minimum pressure state, whereby an inner space formed by the inner peripheral surface of the inner tube is contracted. The inner tube has a cross-section having a non-circular shape perpendicular to an axial direction in the minimum pressure state.

This configuration can provide a tube unit capable of realizing stable elastic deformation of the inner tube.

In one embodiment of the present disclosure, the non-circular shape is a substantially triangle shape or a star-like shape.

In one embodiment of the present disclosure, the tube unit further includes a shape regulating portion that includes a contact portion for coming into contact with the inner tube at least in the minimum pressure state and configured to cause the contact portion to change a shape of the inner tube into the non-circular shape in the minimum pressure state.

This configuration can provide a tube unit capable of shaping the inner tube as desired during operation, regardless of the shape and the structure of the inner tube.

In one embodiment of the present disclosure, the shape regulating portion is configured as a ring having a plate-like shape and an opening into which the inner tube is inserted, and an outer peripheral edge of the opening includes the contact portion.

In one embodiment of the present disclosure, the ring is arranged between axial ends of the inner tube in the pressurized space.

In one embodiment of the present disclosure, the ring is provided to at least one of the axial ends of the inner tube in the pressurized space, and the opening of the ring is joined to the outer peripheral surface of the inner tube over the entire circumference of the opening.

In one embodiment of the present disclosure, the pressurized space forming portion forms a plurality of pressurized spaces separate from one another. Each portion of the inner tube surrounded by the plurality of pressurized spaces is operable between the minimum pressure state and the maximum pressure state. The shape regulating portion includes the contact portion for coming into contact with the each portion at least in the minimum pressure state and causes the contact portion to change a shape of the each portion into a non-circular shape in the minimum pressure state.

In one embodiment of the present disclosure, the pressurized space forming portion includes an outer tube that forms the pressurized space between the outer tube and the outer peripheral surface of the inner tube. The inner tube includes a movable tube that constitutes an axial longitudinal portion in contact with the pressurized space. The movable tube has a cross-section having a non-circular shape perpendicular to at least one of an axial direction of an outer peripheral surface and an axial direction of an inner peripheral surface of the movable tube.

In one embodiment of the present disclosure, the movable tube includes the cross-section having the non-circular shape in a continuous manner over an entire axial length of the movable tube.

In one embodiment of the present disclosure, the movable tube includes the cross-section having the non-circular shape in a fixed size over an entire axial length of the movable tube.

In one embodiment of the present disclosure, the movable tube includes the cross-section having the non-circular shape that is rotated in a circumferential direction in accordance with an axial position.

In one embodiment of the present disclosure, the movable tube includes the cross-section having the non-circular shape that is rotated in a circumferential direction at a constant rate in accordance with an axial position.

In one embodiment of the present disclosure, the tube unit includes a plurality of sets of the pressurized space and the movable tube.

In one embodiment of the present disclosure, the non-circular shape is a substantially triangular shape.

In one embodiment of the present disclosure, the substantially triangular shape is a substantially equilateral triangle shape.

In one embodiment of the present disclosure, the non-circular shape is a star-like shape.

In one embodiment of the present disclosure, the inner tube is obtained by performing extrusion molding.

In one embodiment of the present disclosure, the outer tube can be bent in a direction perpendicular to a central axis thereof.

In one embodiment of the present disclosure, a cross-section of the inner peripheral surface of the outer tube and a cross-section of an outer peripheral surface of the movable tube perpendicular to the axial direction are similar to each other over entire axial lengths thereof.

A transport apparatus according to one embodiment of the present disclosure includes a tube unit according to the present disclosure, and a pressure controller configured to control the supply and discharge of the pressurizing medium to and from the pressurized space of the tube unit.

In one embodiment of the present disclosure, the transport apparatus further includes a resilient body having a tubular shape that is coupled to the tube unit and configured to be extended and contracted in an axial direction, and a driving means configured to extend and contract the resilient body.

The pressurized space forming portion of the tube unit includes an outer tube that forms the pressurized space between the outer tube and an outer peripheral surface of the inner tube.

The transport apparatus configured as described above can push the transport object in a contraction direction or an extension direction by causing extension or contraction of the resilient body in a state in which the tube unit is expanded. Thus, the transportation efficiency can be improved.

In one embodiment of the present disclosure, the outer tube is configured to be restricted in extending in the axial direction and to expand in a radially outward direction when the pressurizing medium is supplied to the pressurized space, so as to be able to expand and contract the tube unit in the axial direction.

In this configuration, the resilient body is contracted in the axial direction by the expansion of the tube unit, thus enabling further movement of the transport object by a contraction amount of the resilient body in the axial direction in addition to the movement of the transport object caused by the expansion of the tube unit. Thus, transportation efficiency can be further improved.

In one embodiment of the present disclosure, the resilient body includes an outer tube and an inner tube arranged on an inner peripheral side of the outer tube. The resilient body is extended and contracted when the driving means expands and contracts the outer tube and the inner tube in synchronization in the axial direction.

In one embodiment of the present disclosure, the resilient body includes an outer tube and an inner tube arranged on an inner peripheral side of the outer tube. The resilient body is extended and contracted when the driving means moves the outer tube and the inner tube relative to each other in the axial direction.

In one embodiment of the present disclosure, the resilient body includes a gas chamber defined by the outer tube and the inner tube and is expanded and contracted by supply and discharge of a fluid into and from the gas chamber.

This configuration enables the same fluid to be commonly used for the tube unit and for the expansion and contraction of the resilient body.

In one embodiment of the present disclosure, the resilient body is arranged in series with the tube unit.

This configuration enables the transport object to be pushed in the contraction direction or in the extension direction by contracting or extending the resilient body in a state in which the tube unit is expanded, and thus can improve the transportation efficiency.

In one embodiment of the present disclosure, a plurality of resilient bodies are arranged on the outer periphery of the tube unit, and each end of the plurality of the resilient bodies is coupled to an end of the tube unit.

This configuration enables expansion of the inner tube in the radially inward direction by extending and contracting each of the resilient bodies in a state in which the tube unit is expanded, and thus can transport the transport object in a greater quantity from the inside of the inner tube.

In one embodiment of the present disclosure, the tube unit is provided to the inner peripheral side of the resilient body, and an end of the tube unit is coupled to an end of the resilient body.

This configuration enables expansion of the inner tube in the radially inward direction by expanding and contracting the tube unit in a state in which the resilient body is expanded, and thus can transport the transport object in a greater quantity from the inside of the inner tube.

Advantageous Effect

According to the present disclosure, a tube unit and a transport apparatus that are capable of realizing stable elastic deformation of the inner tube can be provided.

According to the present disclosure, a tube unit and a transport apparatus that are capable of shaping the inner tube as desired during operation, regardless of the shape and structure of the inner tube, can be provided.

According to the present disclosure, a transport apparatus capable of improving the transportation efficiency of a transport object can be provided.

DETAILED DESCRIPTION

Hereinafter, a tube unit and a transport apparatus according to various embodiments of the present disclosure will be described in detail with reference to the drawings. Note that the term "axial direction of an inner tube" used herein refers to a direction along a central axis of the inner tube. Also, the term "axial direction of an outer tube" refers to a direction along a central axis of the outer tube. Although the central axis of the inner tube and the central axis of the outer tube coincide with each other in each of the embodiments, this is not restrictive. Also, the term "joined to" is not limited to adhesion using an adhesive or fixation by welding or the like but may refer to fixation or fitting using screws, bolts, nuts, rivets, and the like.

Figure 1A:
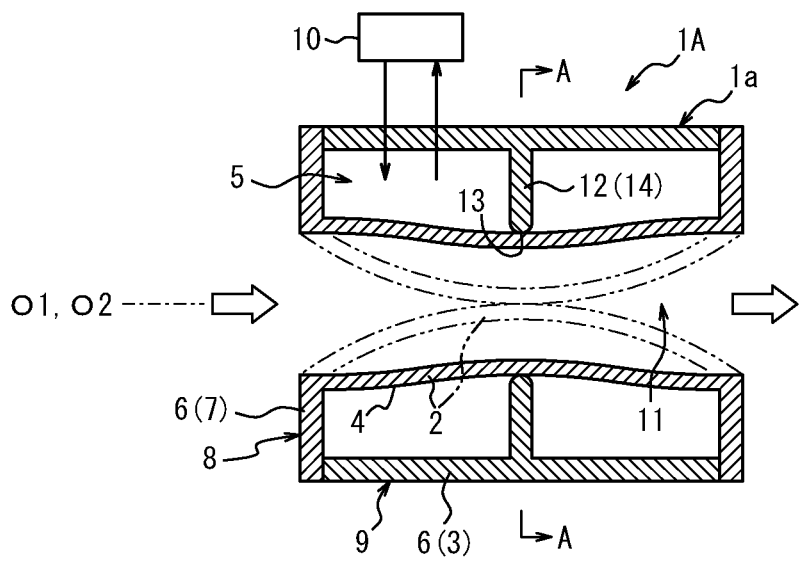
FIG. 1A is a longitudinal cross-sectional view illustrating a tube unit and a transport apparatus according to a first embodiment of the present disclosure.

First, a tube unit 1a and a transport apparatus 1A according to a first embodiment of the present disclosure will be described in detail with reference to FIG. 1A to FIG. 2D. As illustrated in FIG. 1A, the tube unit 1a according to the present embodiment includes an inner tube 2 that is elastically deformable and has a cylindrical shape. The inner tube 2 is not limited to have the cylindrical shape but may have any tubular shape. The tube unit 1a also includes a pressurized space forming portion 6 for forming a pressurized space 5 in contact with an outer peripheral surface 4 of the inner tube 2 between the pressurized space forming portion 6 and the outer peripheral surface 4. The pressurized space 5 is in contact with the entire circumference of the outer peripheral surface 4 of the inner tube 2. However, the pressurized space 5 may be in contact with a part of the circumference of the outer peripheral surface 4.

Figure 1B:
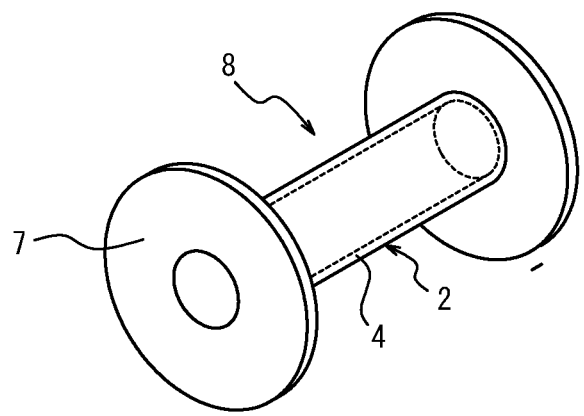
FIG. 1B is a perspective view illustrating an inner member of the tube unit illustrated in FIG. 1A.
Figure 1C:
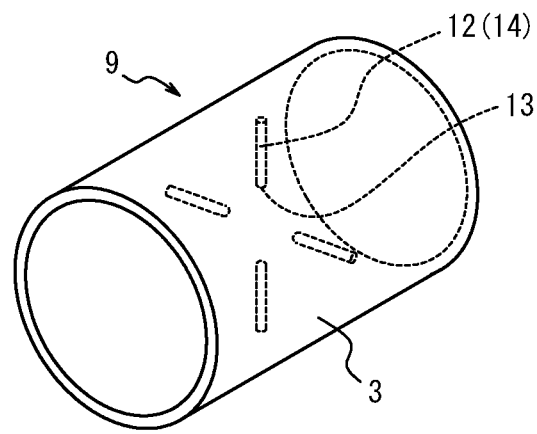
FIG. 1C is a perspective view illustrating an outer member of the tube unit illustrated in FIG. 1A.

As illustrated in FIG. 1B and FIG. 1C, the tube unit 1a includes an inner member 8 that is made of a resilient material such as a rubber or a soft synthetic resin, in which a pair of flanges 7 is integrally formed with both axial ends of the inner tube 2, and an outer member 9 made of a rigid material such as a hard synthetic resin or a metal that includes an outer tube 3 in a cylindrical shape. As illustrated in FIG. 1A, the pair of flanges 7 and the outer tube 3 are joined together in a fluid-tight manner, e.g., tightly fixed together. Accordingly, the pressurized space forming portion 6 is made up of the pair of flanges 7 of the inner member 8 and the outer tube 3 of the outer member 9.

Note that the tube unit 1a does not need to include the inner member 8 and the outer member 9 as described above. For example, the pair of flanges 7 and the inner tube 2 may be individual elements. The pair of flanges 7 may be integrally formed with the outer member 9 and, further, may be made of the same rigid material as the outer member 9. The outer member 9 may be made of a resilient material such as a rubber or a soft synthetic resin. Further, the tube unit 1a may not include the pair of flanges 7 and may be made up of the outer tube 3 and the inner tube 2 tightly joined together at their axial ends. In this case, the pressurized space forming portion 6 is formed by the outer tube 3. In this case, preferably, the inner peripheral surface of the outer tube 3 is provided with a circumferential groove continuously extending over the entire circumference, whereby an operation speed of a pressurizing medium of the inner tube 2 may be increased. In this case, the outer tube 3 is not limited to have the cylindrical shape but may have any tubular shape. In the present embodiment, the outer tube 3 has a radial rigidity sufficient not to be substantially deformed expanding in the radially outward direction when the pressuring medium is supplied to the pressurized space 5. The outer tube 3 may be deformed bending in a direction perpendicular to the central axis O2 thereof. For example, the outer tube 3 may be made of a resilient material such as a rubber or a soft synthetic resin including fiber cords woven in a sleeve-shape embedded therein. This configuration enables a transportation direction of a transport object to be bent in a desired direction.

The inner tube 2 is operable between a minimum pressure state, in which the inner pressure of the pressurized space 5 is minimized by the discharge of the pressurizing medium, and a maximum pressure state, in which the inner pressure is maximized by the supply of the pressurizing medium and the inner tube 2 is deformed expanding in a radially inward direction by the increase of the inner pressure from the minimum pressure state (see the inner tube 2 indicated by the two-dot chain lines in FIG. 1A), whereby the inner space 11 formed by the inner peripheral surface of the inner tube 2 is contracted. Here, a state in which the inner pressure of the pressurized space 5 is minimized during the operation of the inner tube 2 is referred to as the minimum pressure state. The inner pressure in the minimum pressure state may be set as appropriate. Also, a state in which the inner pressure of the pressurized space 5 is maximized during the operation of the inner tube 2 is referred to as the maximum pressure state. The inner pressure in the maximum pressure state may also be set as appropriate. As the pressurizing medium, any fluid including a gas such as air or carbon dioxide and a liquid such as water or oil may be used.

The tube unit 1a and the pressure controller 10 constitute the transport apparatus 1A. The pressure controller 10 may control the supply of the pressurizing medium to the pressurized space 5 (see the down arrow in FIG. 1A) and the discharge of the pressurizing medium from the pressurized space 5 (see the up arrow in FIG. 1A). The pressure controller 10 may include, for example, a pressure source such as a compressor, a flow path forming portion such as a pipe, and a flow path switching valve.

The tube unit 1a includes a shape regulating portion 12. The shape regulating portion 12 includes a contact portion 13 to come into contact with the inner tube 2 at least in the minimum pressure state and is configured to change the shape of the inner tube 2 into a predetermined shape by using the contact portion 13 in the minimum pressure state. Here, "change" of the shape of the inner tube 2 refers to a change of the shape from "the shape of the inner tube 2 when the contact portion 13 is not in contact with the inner tube 2". Preferably, the "predetermined shape" is a non-cylindrical shape.

Figure 2A:
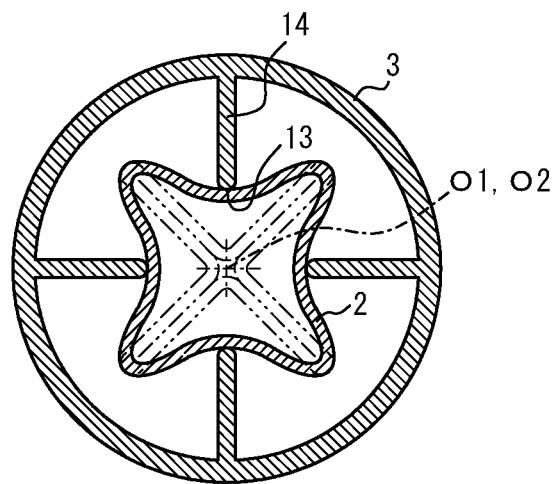
FIG. 2A is a cross-sectional view take from arrow A-A of FIG. 1A.

In the present embodiment, the shape regulating portion 12 is configured as four protrusions 14 provided to the pressurized space forming portion 6. The four protrusions 14 are arranged at equal intervals in the circumferential direction of the outer tube 3. Each of the four protrusions 14 protrudes in the radially inward direction of the outer tube 3 from the inner peripheral surface of the outer tube 3. In the present embodiment, the four protrusions 14 are formed integrally with the outer tube 3. The distal end of each of the four protrusions 14 form the contact portion 13, which comes into contact with the outer peripheral surface 4 of the inner tube 2 in the minimum pressure state. The inner tube 2 has the cylindrical shape as its original shape before being deformed by the contact portion 13. In the minimum pressure state, the inner tube 2 is elastically deformed in such a manner that the cross-section thereof has a tubular shape including a star-like shape as illustrated in FIG. 2A. That is, in the minimum pressure state, the inner tube 2 is deformed in such a manner that its cross-section has a circular shape at both axial ends and gradually forms a star-like shape toward a predetermined position between the axial ends. Accordingly, by changing from the minimum pressure state to the maximum pressure state, the inner tube 2 may be deformed expanding with four folds functioning as base points between two contact portions 13 adjacent to one another as indicated by the two-dot chain lines in FIG. 2A.

Figure 2B:
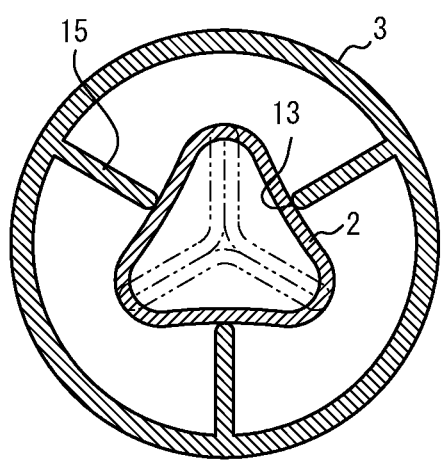
FIG. 2B is a cross-sectional view illustrating a variation of the tube unit illustrated in FIG. 1A corresponding to FIG. 2A.
Figure 2C:
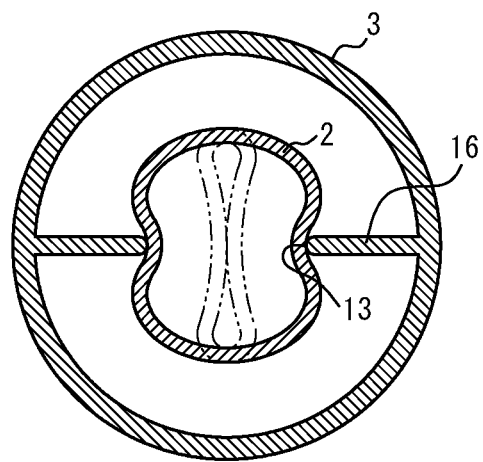
FIG. 2C is a cross-sectional view illustrating a variation of the tube unit illustrated in FIG. 1A corresponding to FIG. 2A.
Figure 2D:
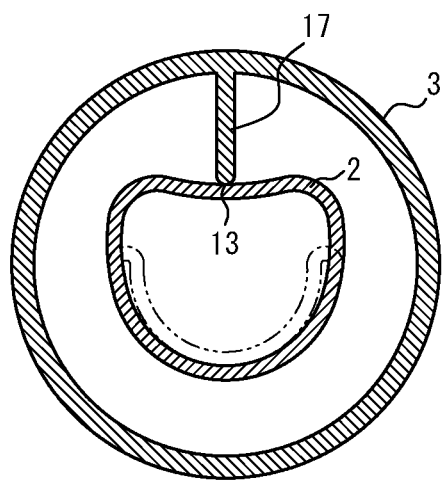
FIG. 2D is a cross-sectional view illustrating a variation of the tube unit illustrated in FIG. 1A corresponding to FIG. 2A.

The shape regulating portion 12 is not limited to be configured as the four protrusions 14 as illustrated FIG. 1C and FIG. 2A. For example, the shape regulating portion 12 may be configured as three protrusions 15 as illustrated in FIG. 2B, two protrusions 16 as illustrated in FIG. 2C, one protrusion 17 as illustrated in FIG. 2D, or more than four protrusions. Each of the two-dot chain lines illustrated in FIG. 2B to FIG. 2D indicates a shape of the inner tube 2 in the maximum pressure state. When the shape regulating portion 12 is configured as a plurality of protrusions, the plurality of protrusions are preferably arranged at equal intervals in the circumferential direction of the outer tube 3. When the shape regulating portion 12 is configured as a plurality protrusions or one protrusion, the shape regulating portion 12 may have any appropriate shape. The protrusion may be made of any appropriate material and may have any appropriate structure. The protrusions are integrally formed with, and thus made of the same rigid material as, the outer member 9. However, the protrusions may be made of a resilient material. For example, coil springs may be arranged on the protrusion in a radially central portion of the outer tube 3 so as to push the contact portion 13 in the radially inward direction. For example, coil springs may be provided in place of the protrusions. As described above, the shape regulating portion 12 is not limited to be configured as a rigid body but may be configured as a resilient body.

Figure 3A:
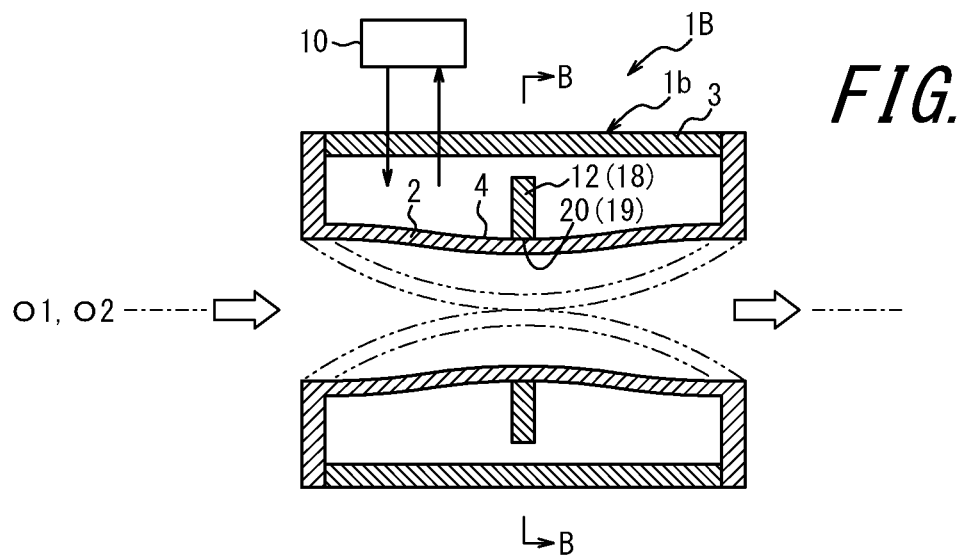
FIG. 3A is a longitudinal cross-sectional view illustrating a tube unit and a transport apparatus according to a second embodiment of the present disclosure.
Figure 3B:
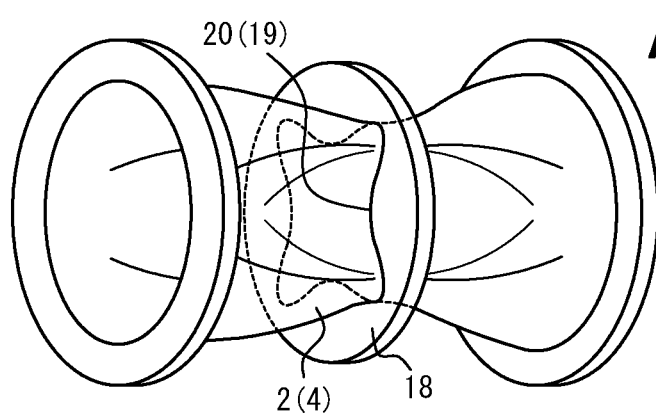
FIG. 3B is a perspective view illustrating a state in which a ring is attached to an inner member of the tube unit illustrated in FIG. 3A.
Figure 3C:
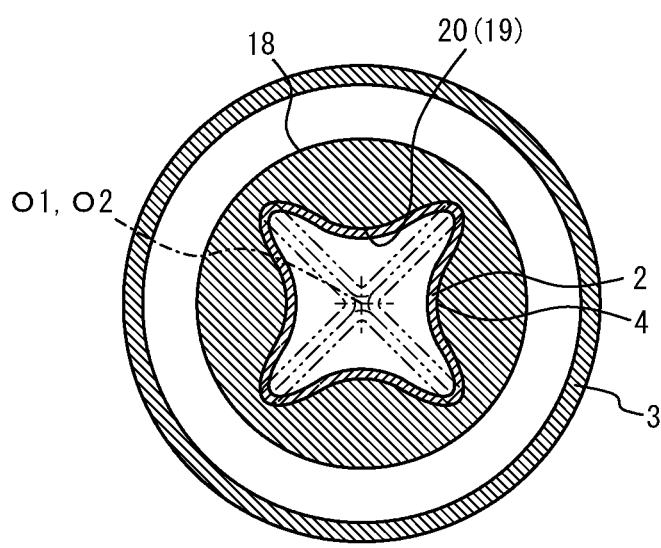
FIG. 3C is a cross-sectional view take from arrow B-B of FIG. 3A.

The shape regulating portion 12 is not limited to be configured as the protrusions. As illustrated in FIG. 3A to FIG. 3C and FIG. 4A, for example, in a tube unit 1b according to a second embodiment of the present disclosure, the shape regulating portion 12 is configured as a ring 18. The ring 18 has a plate-like shape and includes an opening 19 into which the inner tube 2 is inserted. The outer peripheral edge of the opening 19 includes a contact portion 20. The contact portion 20 comes into contact with the outer peripheral surface 4 of the inner tube 2 in the minimum pressure state. As illustrated in FIG. 3A, the contact portion 20 includes a portion that is spaced apart from the outer peripheral surface 4 of the inner tube 2 in the maximum pressure state. The two-dot chain lines illustrated in FIG. 3A illustrate the shape of the inner tube 2 in the maximum pressure state. As illustrated in FIG. 3A to FIG. 3C, the ring 18 is disposed between the axial ends of the inner tube 2. The opening 19 of the ring 18 is not limited to have the star-like shape illustrated in FIG. 3B, FIG. 3C, and FIG. 4A but may have any appropriate shape including the shapes illustrated in FIG. 4B and FIG. 4C, by way of example. Although the ring 18 is made of a rigid material such as a synthetic resin or a metal, the ring 18 may be made of a resilient material such as a rubber or a soft synthetic resin. Although the ring 18 is a member independent of the inner tube 2 and the outer tube 3, the ring 18 may be integrally formed with, for example, the outer tube 3. In this case, the ring 18 is preferably provided with holes for allowing the pressurizing medium to pass therethrough, as appropriate. The shape regulating portion 12 may not be configured as the ring 18 but may be made up of, for example, a plurality of bead members arranged at intervals (e.g., equal intervals) in the circumferential direction of the inner tube 2, and an annular member having an annular shape that penetrates the plurality of beads and pushes the plurality of beads against the inner tube 2 at least in the minimum pressure state. The annular member may or may not have resiliency in the circumferential direction in a manner similar to, for example, a rubber band.

Figure 5A:
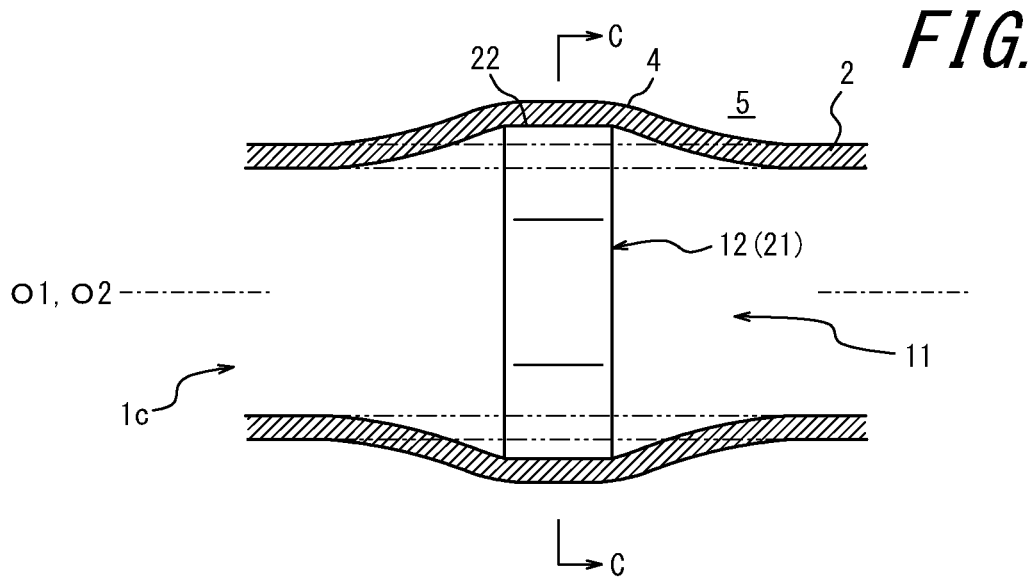
FIG. 5A is a cross-sectional side view illustrating a part of a tube unit according to a third embodiment of the present disclosure.
Figure 5B:
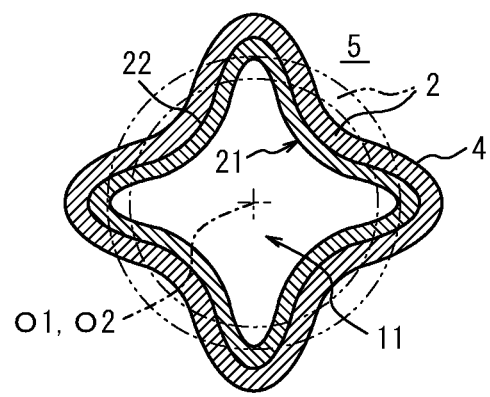
FIG. 5B is a cross-sectional view taken from arrow C-C of FIG. 5A.
Figure 5C:
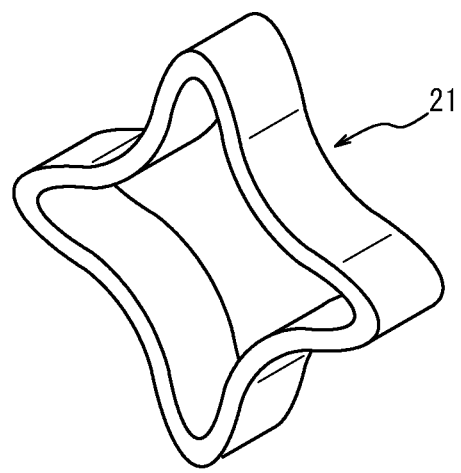
FIG. 5C is a perspective view illustrating a resilient tubular body illustrated in FIG. 5B.

FIG. 5A to FIG. 5C illustrate a tube unit 1c according to a third embodiment of the present disclosure. In the present embodiment, the shape regulating portion 12 is configured as a resilient tube 21 made of a resilient material such as a rubber or a soft synthetic resin, as illustrated in FIG. 5A to FIG. 5C. The resilient tube 21 of the tube unit 1c according to the present embodiment includes a contact portion 22 which comes into contact with the inner peripheral surface of the inner tube 2 at least in the minimum pressure state and is configured to change the shape of the inner tube 2 into a predetermined shape (in this example, a tubular shape having a star-like cross-section) by using the contact portion 22 in the minimum pressure state. The resilient tube 21 is elastically deformed together with the inner tube 2 when the inner pressure of the pressurized space 5 is increased, and thus can contract an inner space 11. Note that the resilient tube 21 may have any appropriate shape, size, resilience, and the like in accordance with the shape required to the inner tube 2. The resilient tube 21 may be joined to the inner peripheral surface of the inner tube 2 over the entire circumference or in a part of the circumference of the inner peripheral surface via the contact portion 22. The resilient tube 21 may by sufficiently larger than the inner tube 2 and press-fitted to the inner tube 2, such that a joining process is omitted. Alternatively, the resilient tube 21 may be attached to the outer peripheral surface 4 of the inner tube 2. In this case also, the resilient tube 21 may be joined to the inner tube 2, as necessary. The two-dot chain lines in FIG. 5B illustrate the original shape of the inner tube 2.

As have been described in the above embodiments, when the shape regulating portion 12 is provided between the axial ends of the inner tube 2, the inner tube 2 having a versatile cylindrical shape may be elastically deformed such that, in the minimum pressure state, the cross-section shape thereof (the cross-sectional shape formed by a plane perpendicular to the central axis) becomes circular at both axial ends and gradually forms a non-circular shape toward a predetermined position between the axial ends. Because the inner tube 2 can be deformed into a non-circular shape as described above, the inner tube 2 is easily deformed expanding by the increase in the inner pressure of the pressurized space 5 such that the inner space 11 is contracted and can be stably operated to be deformed expanding in a substantially constant manner. Thus, transportation properties can be stabilized. Further, because the inner tube 2 has the cross-section in a circular shape at both axial ends, the inner tube 2 may be directly coupled to a general pipe having a circular shape. This configuration makes the inner tube 2 convenient. Although the inner tube 2 may have the non-circular shape as described above as the original shape, the inner tube 2 that can be deformed into a non-circular tubular shape by the shape regulating portion 12 of the present embodiment enables an existing tube to be used as the inner tube 2 and improves the manufacturing efficiency. That is, regardless of the shape and structure of the inner tube 2, the inner tube 2 may be shaped as desired during operation. Also, when the shape regulating portion 12 is configured as the ring 18 as described above, the shape regulating portion 12 may be easily arranged with respect to the inner tube 2.

Note that the original shape of the inner tube 2 before being deformed by the contact portion 13 of the shape regulating portion 12 is not limited to the cylindrical shape. Also, the inner tube 2 may have a cylindrical or any tubular shape as the original shape locally provided with protrusions (not illustrated) protruding in the radially inward direction. For example, when such protrusions are arranged in each of circumferential positions that most protrude in the radially inward direction when the inner tube 2 is deformed expanding such that the inner space 11 becomes contracted, a central portion of the inner space 11 may be easily closed by the protrusions in the maximum pressure state. The inner tube 2 may have, for example, a groove or ridge extending in the axial direction.

Figure 6A:
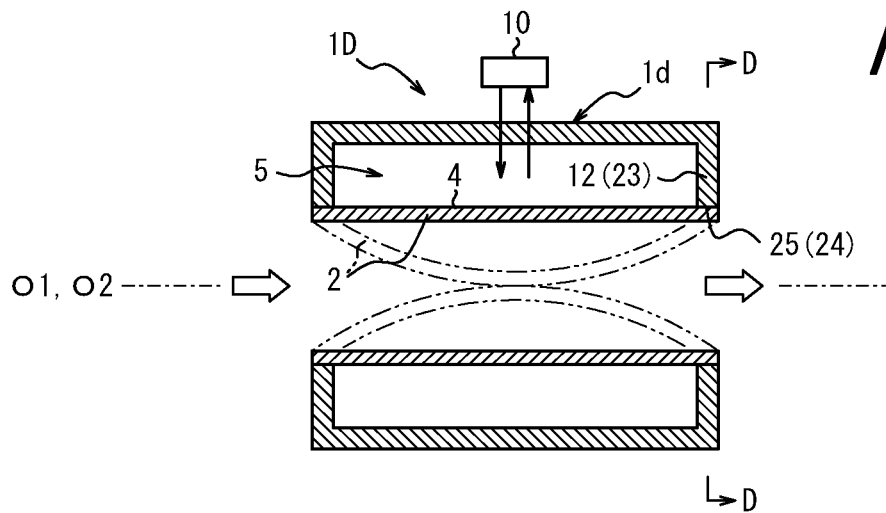
FIG. 6A is a longitudinal cross-sectional view illustrating a tube unit and a transport apparatus according to a fourth embodiment of the present disclosure.
Figure 6B:
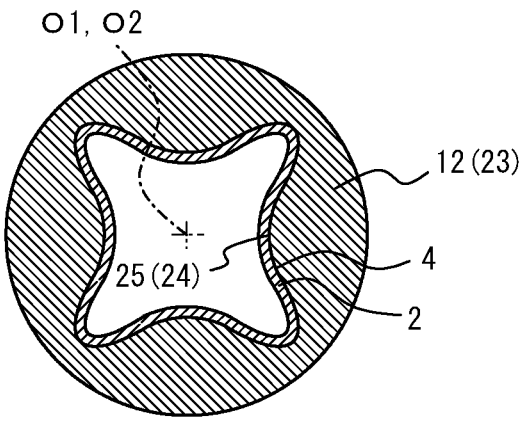
FIG. 6B is a cross-sectional view taken from arrow D-D of FIG. 6A.
Figure 6C:
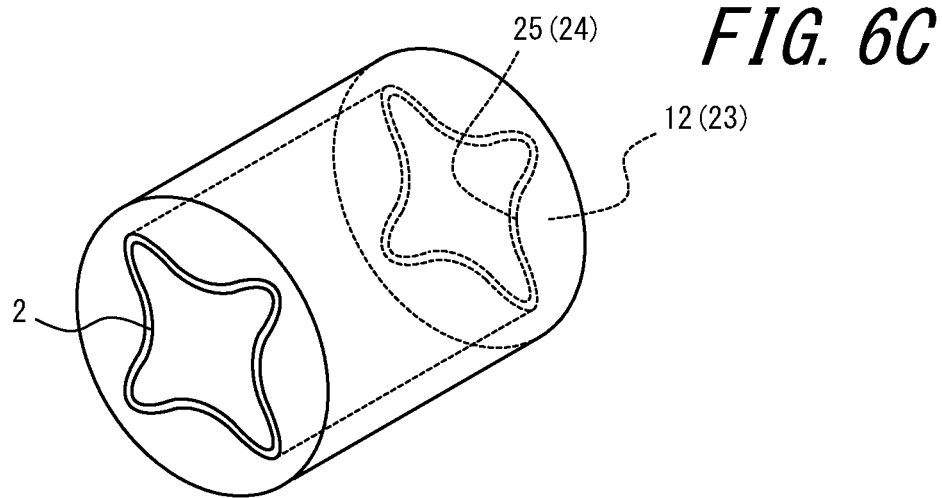
FIG. 6C is a perspective view of the tube unit illustrated in FIG. 6A.

FIG. 6A to FIG. 6C illustrate a tube unit 1d according to a fourth embodiment of the present disclosure. In the present embodiment, the shape regulating portion 12 is provided at each of the axial ends of the inner tube 2 in the pressurized space 5 and has a configuration similar to the ring 18 described above, as illustrated in FIG. 6A to FIG. 6C. That is, in place of the pair of flanges 7 provided at both axial ends of the inner tube 2 described above, a pair of rings 23 as illustrated in FIG. 6A to FIG. 6C is provided to the inner tube 2. Each of the pair of rings 23 includes an opening 24 into which the inner tube 2 is inserted. Each of the outer peripheral edges of the opening 24 of the pair of rings includes a contact portion 25. Each of the contact portions 25 of the pair of rings 23 is joined in a fluid-tight manner, e.g., firmly fixed to the entire circumference of the outer peripheral surface 4 of the inner tube 2. In the present embodiment, the pair of rings 23 is integrally formed with the outer tube 3. The opening 24 of the pair of rings 23 is not limited to have the star-like shape as illustrated in FIG. 6B but may have an appropriate shape including the shapes illustrated in FIG. 4B to FIG. 4D. Although the pair of rings 23 is made of a rigid material such as a hard synthetic resin or a metal, the pair of rings 23 may be made of a resilient material such as a rubber or a soft synthetic resin. The shape regulating portion 12 may be provided to only one of the axial ends of the inner tube 2 in the pressurized space 5. In this case also, the shape regulating portion 12 may be configured as the ring 23. The shape regulating portion 12 at one axial end of the inner tube 2 in the pressurized space 5 may have a shape different from that of the shape restricting portion 12 provided at the other axial end (e.g., one has a substantially triangular shape and the other has a star-like shape). When the shape regulating portion 12 is provided to each of the axial ends of the inner tube 2 in the pressurized space 5 as described in the present embodiment, the inner tube 2 may be shaped as desired during operation, regardless of its original shape and structure. In the present embodiment, a support for supporting the axial central portion of the inner tube 2 may be provided to the outer tube 3. For example, when such a support is provided on the bottom side of the inner tube 2, the inner tube 2 is inhibited from sagging due to weight of the transport object. For example, such a support may be continuously or intermittently provided to the entire circumference, so as to shape the axial central portion of the inner tube 2 as desired in the minimum pressure state (i.e., so as to function as an additional shape regulating member). The shape of the support is not limited and may be, for example, a ridge extending in the axial direction or in the circumferential direction, or a protrusion extending in the radially inward direction. The support may be configured as a ring illustrated in FIG. 3A to FIG. 3C or FIG. 4A to FIG. 4D. The support may be configured as, for example, a stick-like member (a shaft or the like) extending in the axial direction. The position of the support is not limited to the bottom side of the inner tube 2. That is, the stick-like member (a shaft or the like) extending in the axial direction may be provided as the shape regulating portion in one or more positions in the circumferential direction so as to shape the inner tube 2 as desired during operation. Such a stick-like member may extend, for example, in a spiral manner.

Figure 7A:
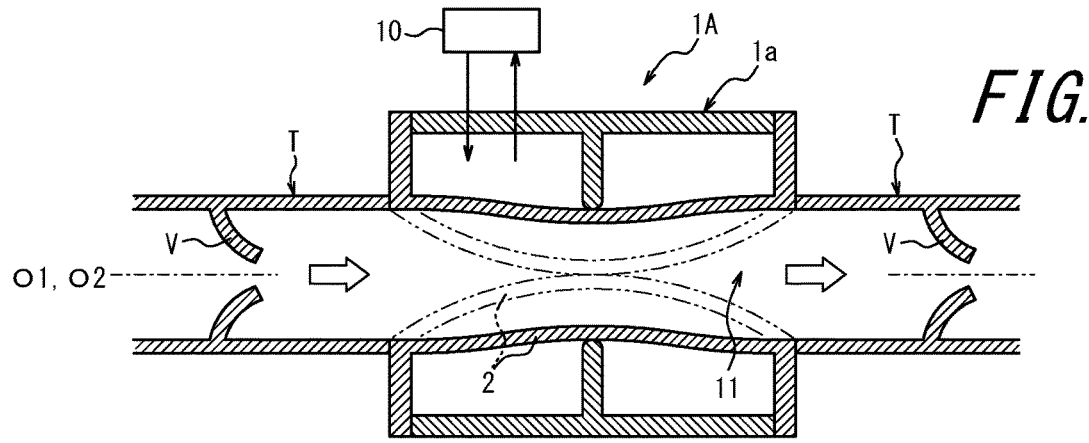
FIG. 7A is a longitudinal cross-sectional view illustrating a pump apparatus that includes the tube unit illustrated in FIG. 1A.
Figure 7B:
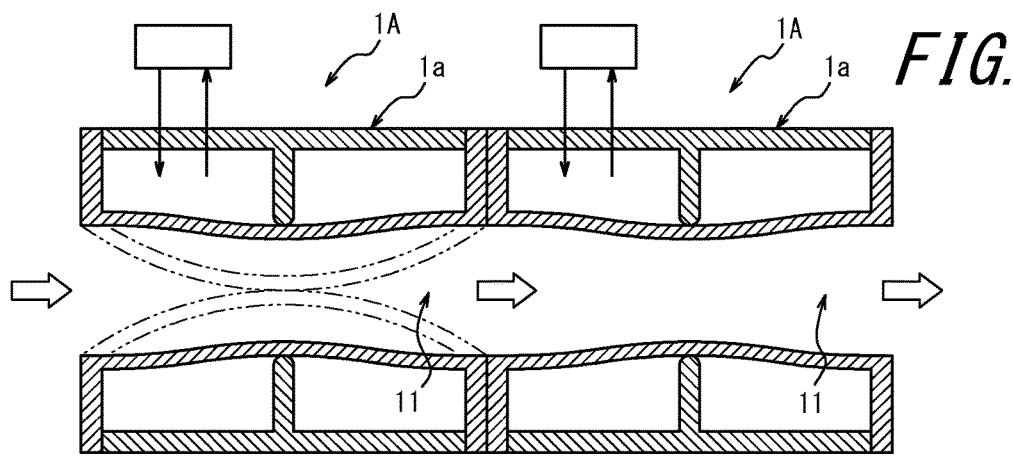
FIG. 7B is a longitudinal cross-sectional view illustrating a pump apparatus that includes a plurality of the tube units illustrated in FIG. 1A.

The tube units 1a, 1b, 1c, and 1d (hereinafter, simply referred to as "tube units 1a or the like") as described above may be used for, for example, a pump apparatus or a mixing apparatus. As illustrated in FIG. 7A, for example, the pump apparatus may include pipes T for functioning as a path of the transport object. Each of the pipes T is coupled to each of the axial ends of the inner space 11 of the tube units 1a or the like and equipped with a check valve V for allowing the transport object to pass to one side of the axial direction and inhibiting the transport object from passing to the other side. In this case, by deforming the inner tube 2 of the tube unit 1a or the like such that the inner space 11 is contracted by the pressure applied by the pressure controller 10, the transport object can be transported to one side of the axial direction. As illustrated in FIG. 7B, alternatively, by using a plurality of tube units 1a coupled to one another in the axial direction and sequentially pressurizing the tube units 1a adjacent to one another at different timings, the inner spaces 11 may be sequentially contracted and may transport the transport object. Such a peristaltic movement enables smooth transportation of, in particular, a solid-liquid mixture such as a slurry, or powder. Alternatively, at least one of axial end surfaces of the tube units 1a or the like may be inclined with respect to the central axes O1 and O2. By coupling a plurality of the tube units 1a or the like having such an inclination together, the transportation path may have a variety of shapes. The tube units 1a or the like coupled together may have the shape regulating portions 12 in different shapes (e.g., one of the shape regulating portion 12 has a substantially triangular shape while the other has a star-like shape).

The pump apparatus configured as described above crushes the transport object during transportation thereof and thus may also function as the mixing apparatus. That is, when, for example, a solid-liquid mixture is used as the transport object, mixing of a solid and a liquid may be promoted. When a plurality of types of liquids, solid-liquid mixtures, or powders are used, mixing thereof may also be promoted. When the mixing apparatus includes the tube unit 1a or the like as described above, a flow path of the transport object preferably has an annular shape (i.e., to form a circulation path). When both ends of the flow path of the transport object formed throughout the plurality of tube units 1a or the like coupled to one another are configured to be closable, the ends may be closed such that the transport object is moved back and forth between the ends of the flow path in a reciprocating manner. When one tube unit 1a or the like is used, the inner tube 2 may be operated with its both axial ends closed, so as to mix contents in the inner space 11.

Figure 8:
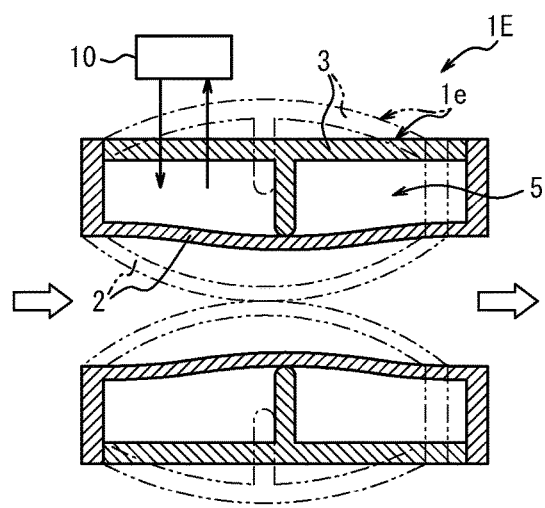
FIG. 8 is a longitudinal cross-sectional view illustrating a tube unit and a transport apparatus according to a fifth embodiment of the present disclosure.

The transport object to be transported by the tube units 1a or the like as described above may be a fluid such as a liquid, a gas-liquid mixture, a solid-liquid mixture, or powder. However, the tube units 1a or the like may be configured to be able to transport a stick-like object longer than the length of the inner space 11. For example, the tube unit 1a or the like may be configured such that each of the inner tube 2 and the outer tube 3 have resiliency in their axial directions, that is, such that the inner tube 2 and the outer tube 3 are deformed expanding or contracting in their axial direction upon application of the pressure to the pressurized space 5 in such a manner that the inner tube 2 is deformed expanding in the radially inward direction and the outer tube 3 is deformed expanding in the radially outward direction. As an example of such a configuration, a tube unit 1e according to a fifth embodiment of the present disclosure will be described with reference to FIG. 8. According to the tube unit 1e of the present embodiment, upon application of a pressure to the pressurized space 5, the axial length of the tube unit 1e can be extended and contracted as indicated by the two-dot chain lines in FIG. 8. This enables transportation of a stick-like object as described above from one axial end of the tube unit 1e to the other axial end by fixing the one axial end. When the tube unit 1a as described above includes the inner tube 2 and the outer tube 3 having resiliency in their axial directions, the tube unit 1a is particularly advantageous in transporting a high viscosity liquid. In order to obtain the resiliency described above, for example, one of the outer tube 3 and the inner tube 2 is configured as a resilient tubular body having an axial fiber-reinforced structure in which a plurality of fiber codes extending in the axial direction of the resilient tubular body are embedded in the resilient tubular body. The other one of the outer tube 3 and the inner tube 2 is configured as a resilient tubular body that does not have such a structure. Each of the outer tube 3 and the inner tube 2 may be configured as a resilient tubular body having the axial fiber-reinforced structure. At least one of the inner tube 2 and the outer tube 3 may be configured as, in place of the resilient tubular body having an axial fiber-reinforced structure, a resilient tubular body having a sleeve-fiber-reinforced structure in which the outer surface of the resilient tubular body is covered with fiber cord woven in a sleeve-shape. When the tube unit 1a or the like as described above includes the outer tube 3 constituted of a rigid body that does not have the resiliency as described above, the tube unit 1a may particularly advantageously transport powder.

In this case, the inner tube 2 may be configured as the rigid tubular body that does not have the fiber-reinforced structure, the rigid tubular body with having axial fiber-reinforced structure, or the rigid tubular body having the sleeve-fiber-reinforced structure.

Figure 9A:
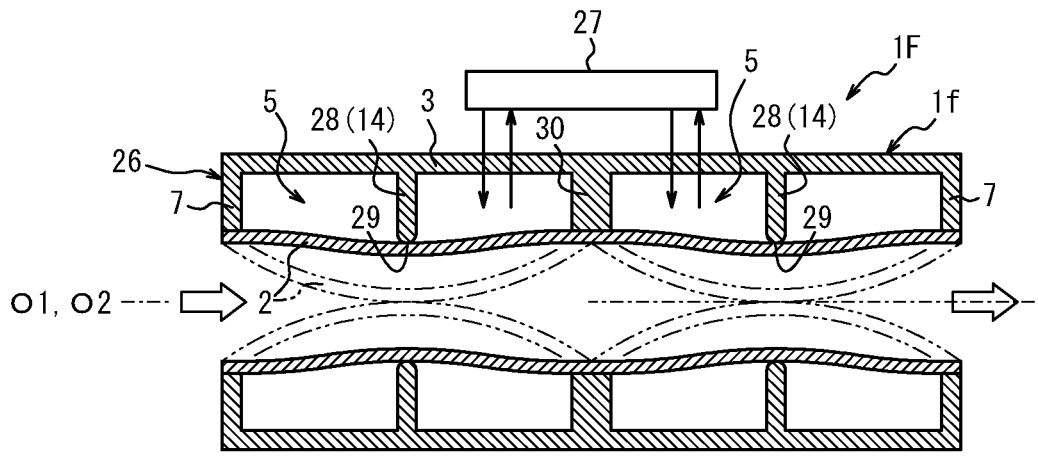
FIG. 9A is a longitudinal cross-sectional view illustrating a tube unit and a transport apparatus according to a sixth embodiment of the present disclosure.
Figure 9B:
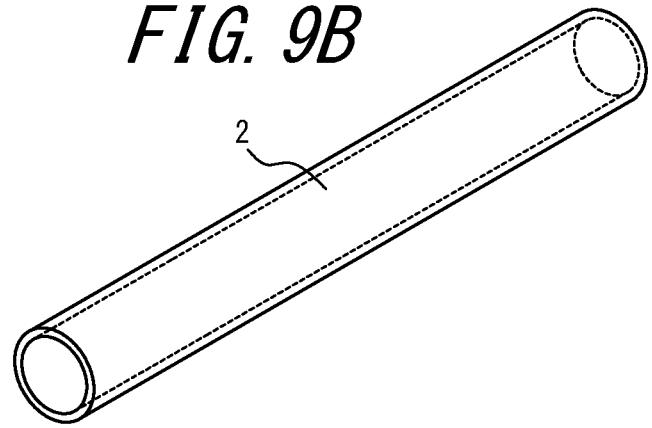
FIG. 9B is a perspective view of an inner tube illustrated in FIG. 9A.
Figure 9C:
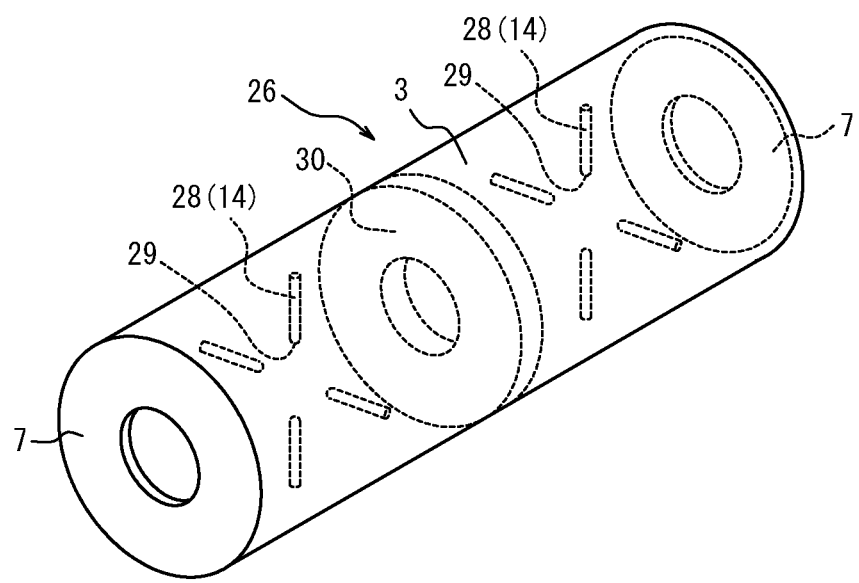
FIG. 9C is a perspective view of a pressurized space forming portion illustrated in FIG. 9A.

Further, the tube unit 1*a*, 1*b*, 1*c*, 1*d*, 1*e*, and the like as described above may include a plurality of pressurized spaces 5. According to a sixth embodiment of the present disclosure as illustrated in FIG. 9A to FIG. 9C, for example, a pressurized space forming portion 26 of a tube unit 1*f* forms a plurality of (two in the figure) pressurized spaces 5, and each of portions of the inner tube 2 surrounded by the plurality of pressurized spaces 5 is operable between the minimum pressure state and the maximum pressure state. A pressure controller 27 may cause the inner tube 2 to operate between the minimum pressure state and the maximum pressure state by controlling the inner pressure in the plurality of the pressurized spaces 5. The shape regulating portion 28 includes a contact portion 29 that comes into contact with each of the portions at least in the minimum pressure state, and changes the shape of the each of the portions of the inner tube 2 into a predetermined shape by using the contact portion 29 in the minimum pressure state. In particular, the pressurized space forming portion 26 includes the outer tube 3 having a cylindrical shape, a pair of flanges 7 provided to either axial end of the outer tube 3, and a separating wall 30 provided between the pair of flanges 7. The pair of flanges 7 and the separating wall 30 may be integrally formed with the outer tube 3. The pair of flanges 7 and the separating wall 30 are joined in a fluid-tight manner to, e.g., firmly fixed to, the inner tube 2. The tube unit 1*f* configured as described above can transport the transport object in a manner similar to the pump apparatus having a plurality of tube units 1*a* as illustrated in FIG. 7B. Although in FIG. 9A to FIG. 9C the shape regulating portion 28 is configured as the protrusion 14, the shape regulating portion 28 may be configured as, in place of the protrusion 14, the protrusions 15, 16 and 17, the ring 18, or the resilient tube 21 as described above. The shape regulating portion 28 may be provided between the axial ends of each of the portions of the inner tube 2 as illustrated in FIG. 9A or at the axial ends. In a manner similar to the tube unit 1*e* illustrated in FIG. 8, in the tube unit 1*f* each of the inner tube 2 and the outer tube 3 may have resiliency in their axial directions.

Figure 4A:
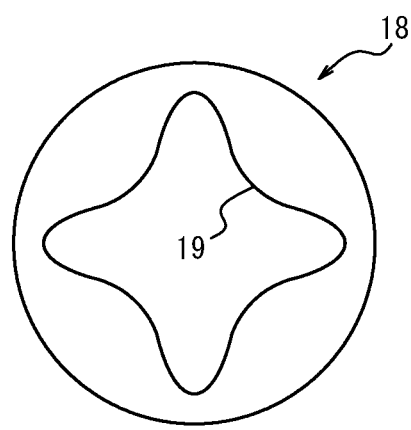
FIG. 4A is a plan view of the ring illustrated in FIG. 3A.
Figure 4B:
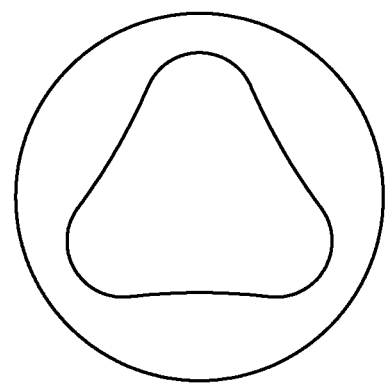
FIG. 4B is a plan view of a variation of the ring illustrated in FIG. 4A.
Figure 4C:
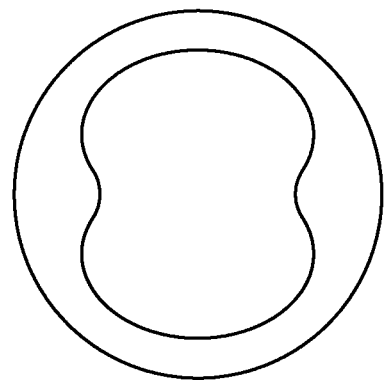
FIG. 4C is a plan view of a variation of the ring illustrated in FIG. 4A.
Figure 4D:
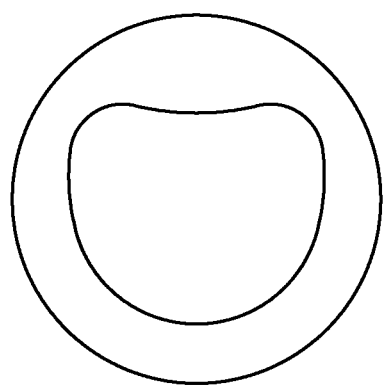
FIG. 4D is a plan view of a variation of the ring illustrated in FIG. 4A.

The first to sixth embodiments of the present disclosure and example variations thereof have been described above with reference to FIG. 1A to FIG. 9C. However, it is appreciated that the above description merely shows examples and various changes may be made without departing from the gist of the present disclosure. For example, the shape regulating portion may be provided between the axial ends of the pressurized space and, simultaneously, at least at one of the axial ends of the pressurized space. Also, although the shape regulating portion in various configurations for deforming the inner tube in the minimum pressure state is illustrated in FIG. 2A to FIG. 2D and FIG. 4A to FIG. 4D, the shape regulating portion does not necessarily need to be configured as a rigid body. When the shape regulating portion is configured as a resilient body and, for example, maintains a state receiving a force applied from a radially outward direction even when the inner tube seems to be hardly deformed, the inner tube may be easily deformed expanding in the radially inward direction upon application of a pressure to the pressurized space. Also, an expanding deformation manner (the shape upon deformation) may be changed, and the inner space may be maintained sufficient in size in the minimum pressure state and may improve transportation efficiency or mixing efficiency. The shape and size of the pressurized space in the minimum pressure state may be appropriately determined. The volume of the pressurized space is preferably small, such that the amount of the pressurizing medium used for operation of the inner tube can be reduced, and the operation speed of the inner tube can be improved. To reduce the volume of the pressurized space, for example, the outer tube may have an inner peripheral surface shaped in conformance with the shape of the inner peripheral surface in the minimum pressure state. In the minimum pressure state, for example, when the inner tube is deformed into the substantially triangular shape as illustrated in FIG. 4B by the ring, the outline of the ring and the shape of the outer tube surrounding the ring may also have the substantially triangular shape. This configuration enables, for example, parallel arrangement of a plurality of transport apparatuses close to each other, in a space saving manner. Also, in the pump apparatus or a mixing apparatus having a plurality of pressurized spaces separated from one another, a plurality of the shape regulating units as illustrated in FIG. 4A or FIG. 4B may be arranged in an offset manner. For example, the shape regulating portions illustrated in FIG. 4A may be arranged at 45 degrees with respect to one another in the pressurized spaces adjacent to each other. This configuration enables effective deformation of the inner tube 2 and improves the transportation efficiency. When the shape regulating portions illustrated in FIG. 4B are used in place of the shape regulating portions illustrated in FIG. 4A and arranged at 180 degrees or 30 degrees with respect to one another, the transportation speed of powder is especially improved. In the example illustrated in FIG. 6A to FIG. 6C, the shape regulating portion at one axial end and the shape regulating portion at the other axial end may be arranged at an angle of 45 degrees with respect to each other. Although the shape regulating portion in the examples illustrated in FIG. 6A to FIG. 6C have the star-like shape, the shape regulating portions may have the substantially triangular shape as illustrated in FIG. 4B and may be arranged at an angle of 180 degrees or 30 degrees with respect to one another.

Next, tube units and transport apparatuses according to seventh to sixteenth embodiments of the present disclosure will be described with reference to FIG. 10A to FIG. 22C.

Figure 10A:
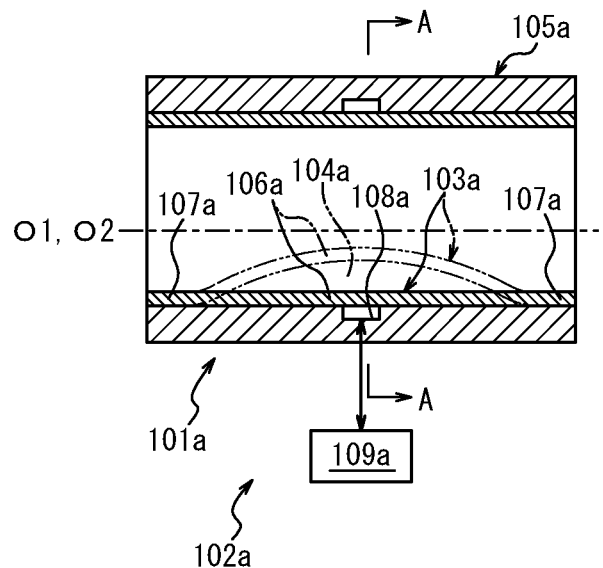
FIG. 10A is a longitudinal cross-sectional view illustrating a tube unit and a transport apparatus according to a seventh embodiment of the present disclosure.
Figure 10B:
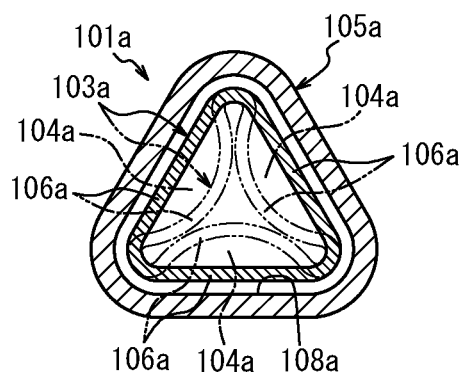
FIG. 10B is a cross-sectional view taken from arrow A-A of FIG. 10A.
Figure 10C:
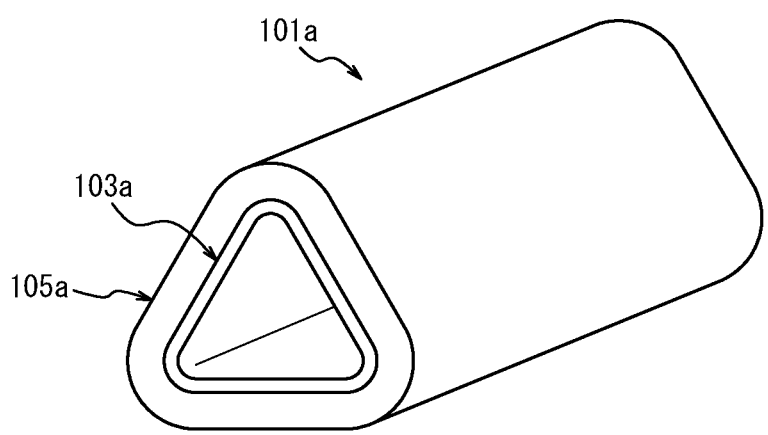
FIG. 10C is a perspective view of the tube unit illustrated in FIG. 10A.
Figure 22A:
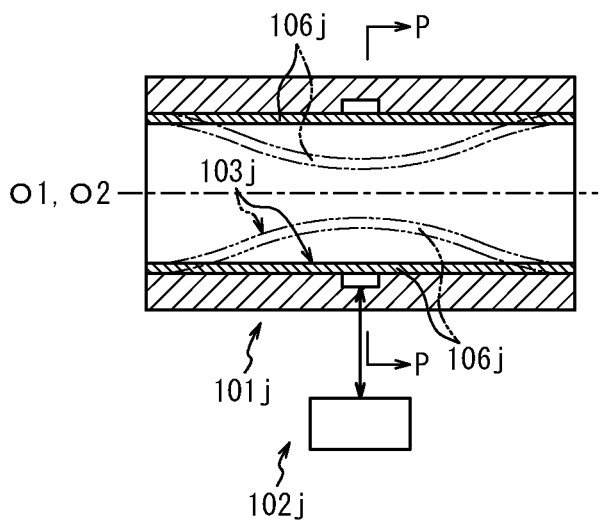
FIG. 22A is a longitudinal cross-sectional view illustrating a tube unit and a transport apparatus according to a sixteenth embodiment of the present disclosure.
Figure 22B:
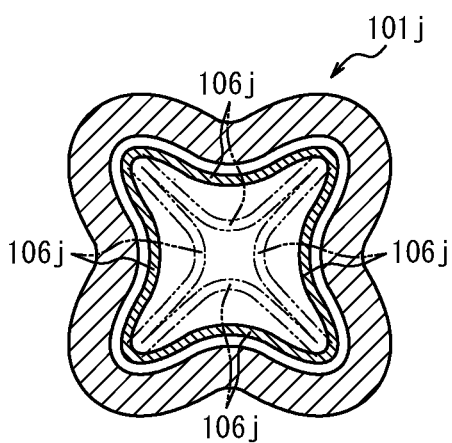
FIG. 22B is a cross-sectional view taken from arrow P-P of FIG. 22A.

First, a tube unit 101*a* and the transport apparatus 102*a* according to the seventh embodiment of the present disclosure will be described in detail with reference to FIG. 10A to FIG. 13. As illustrated in FIG. 10A to FIG. 10C, the tube unit 101*a* according to the present embodiment includes an inner tube 103*a* that is elastically deformable and has a cylindrical shape. The tube unit 101*a* also includes an outer tube 105*a* that forms, between the outer tube 105*a* and the outer peripheral surface of the inner tube 103*a*, a pressurized space 104*a* that comes into contact with the outer peripheral surface and causes the elastic deformation of the inner tube 103*a* in accordance with the supply and discharge of the pressurizing medium. In FIG. 10A and FIG. 10B, the two-dot chain lines illustrate a state in which the pressurized space 104*a* is expanded and thus the inner tube 103*a* is deformed expanding in the radially inward direction. The inner tube 103*a* includes a movable tube 106*a* constituting an axial longitudinal portion in contact with the pressurized space 104*a*. In the present embodiment, a cross-section of the movable tube 106*a* perpendicular to the axial directions of the outer peripheral surface and the inner peripheral surface thereof has a non-circular shape in a constant manner throughout the axial length. Alternatively, the cross-section of the movable tube 106*a* perpendicular to at least one of the axial direction of the outer peripheral surface and the axial direction of the inner peripheral surface may have a non-circular shape. For example, the cross-section of the movable tube 106a perpendicular to the axial direction of the outer peripheral surface and the axial direction of the inner peripheral surface may have a substantially triangle shape as illustrated in FIG. 10B at one axial end of the movable tube 106a and a star-like shape as illustrated in FIG. 22B at the axial other end. The cross-section of the movable tube 106a perpendicular to at least one of the axial direction of the outer peripheral surface and the axial direction of the inner peripheral surface may have a non-circular shape in a constant manner throughout the axial length.

In the present embodiment, the non-circular shape is a substantially triangular shape, and more specifically, a substantially equilateral triangular shape. Here, the apex of the substantially triangular shape or the substantially equilateral triangular shape may be curved as illustrated in FIG. 10A. Also, the non-circular shape may be determined as a substantially triangle shape that is optimum for a type and the like of the transport object.

In the present embodiment, the movable tube 106a has the cross-section having the non-circular shape in a fixed size throughout the axial length. The cross-section having the non-circular shape of the outer peripheral surface of the movable tube 106a may be varied depending on an axial position. The cross-section having the non-circular shape of the inner peripheral surface of the movable tube 106a may be varied depending on an axial position. Or, each of the size of the cross-section having the non-circular shape of the outer peripheral surface and the size of the cross-section having the non-circular shape of the inner peripheral surface of the movable tube 106a may be varied depending on an axial position.

In the present embodiment, the movable tube 106a has the cross-section having the non-circular shape are not rotated in the circumferential direction throughout the axial length. However, the movable tube 106a may have the cross-section having the non-circular shape that are rotated in accordance with an axial position. An example of such a configuration will be described later in a ninth embodiment.

In the present embodiment, the inner tube 103a is obtained by, for example, performing extraction molding of a resilient material such as a rubber or a soft synthetic resin. However, the material of the inner tube 3a is not limited to the resilient material, and the inner tube 103a may be obtained otherwise.

In the present embodiment, the pressurized space 104a is expanded and contracted by the elastic deformation of the inner tube 103a alone caused by the supply or discharge of the pressurizing medium. That is, the outer tube 105a has stiffness enough not to be substantially deformed expanding in the radially outward direction when the pressurizing medium is supplied to the pressurized space 104a. The outer tube 105a may be bent in the direction perpendicular to the central axis O2. For example, the outer tube 105a may be configured as a resilient material such as a rubber or a soft synthetic resin having fiber codes woven in a sleeve-shape embedded therein. This configuration enables the transportation direction of the transport object to be bent in a desired direction.

In the present embodiment, cross-sections of the inner peripheral surface of the outer tube 105a and the outer peripheral surface of the movable tube 106a perpendicular to the axial directions are aligned in the circumferential direction throughout the axial length and thus in shapes similar to each other. Thus, when a compressible fluid such as a gas is used as the pressurizing medium, a response speed of the elastic deformation of the inner tube 103a caused by the supply or discharge of the pressurizing medium and the transportation speed of the transport object can be increased, and a necessary flow rate of the pressurizing medium can be reduced. Further, when the inner peripheral surface of the outer tube 105a and the outer peripheral surface of the movable tube 106a are shaped in substantially conformance with each other as much as possible, the above effects may be further enhanced (i.e., the response speed of the elastic deformation of the inner tube 103a caused by the supply or discharge of the pressurizing medium and the transportation speed of the transport object can be increased, and the necessary flow rate of the pressurizing medium can be reduced).

In the present embodiment, the inner tube 103a includes, at the axial ends thereof, a non-movable tube 107a constituting an axial length that does not come into contact with the pressurized space 104a. The non-movable tube 107a, throughout the circumference thereof, is joined to the inner peripheral surface of the outer tube 105a in a fluid-tight manner. The inner peripheral surface of the outer tube 105a includes, throughout the circumference thereof, a circumferential groove 108a that extends in a circumferential direction. The circumferential groove 108a maintains a space from the outer peripheral surface of the movable tube 106a even when the pressurized space 104a is contracted. That is, when the pressurized space 104a is contracted, a portion of the inner peripheral surface of the outer tube 105a opposing to the movable tube 106a entirely comes into contact with the movable tube 106a, except for the circumferential groove 108a. In the present embodiment, the circumferential groove 108a is arranged in the axially central portion of the movable tube 106a. However, the position of the circumferential groove 108a with respect to the axial direction may be otherwise determined appropriately. The circumferential groove 108a as described above may improve the transportation speed of the transport object, especially during high-speed operation (i.e., during supplying and discharging the pressurizing medium), as compared to a configuration that does not have the circumferential groove 108a. Note that it may be configured such that, without providing the circumferential groove 108a, the entire portion of the inner peripheral surface of the outer tube 105a opposing to the movable tube 106a comes into contact with the movable tube 106a when the pressurized space 104a is contracted.

In the present embodiment, the pressurized space 104a is continuously formed throughout the entire circumference. This enables the pressurizing medium to be supplied and discharged from one location in the circumferential direction, thus simplifying the configuration. The pressurized space 104a may be intermittently formed throughout the circumference. Alternatively, the pressurized space 104a may be formed in one position (e.g., on the bottom of the substantially triangular shape) in the circumferential direction. However, to secure a high transportation speed of the transport object, the pressurized space 104a is preferably formed continuously or intermittently throughout the circumference. In the present embodiment, also, the outer peripheral surface of the movable tube 106a and the inner peripheral surface of the outer tube 105a have cross-sections perpendicular to the axial direction that are similar to each other and aligned in the circumferential direction throughout the axial length. This configuration enables, when arranging a plurality of the transport apparatuses 102a including the tube unit 101a, the outer tubes 105a to be arranged close to one another in a space-saving manner, as compared to a transportation apparatus in which the outer peripheral surface of the outer tube 105a has a cross-section in a circular shape.

The transport apparatus 102a according to the present embodiment includes the tube unit 101a described above and a pressure controller 109a configured to control the supply and discharge of the pressurizing medium in the tube unit 101a. The pressure controller 109a can control the supply of the pressurizing medium to the pressurized space 104a (see the up arrow in FIG. 10A) and the discharge of the pressurizing medium from the pressurized space 104a (see the down arrow in FIG. 10A). The pressure controller 109a may be constituted of, for example, a pressure source such as a compressor, the flow path forming portion such as a pipe, and the flow path switching valve (e.g., a solenoid valve). The pressuring medium may be any fluid, and preferably a gas such as air or carbon dioxide, or a liquid such as oil or water.

Figure 11:
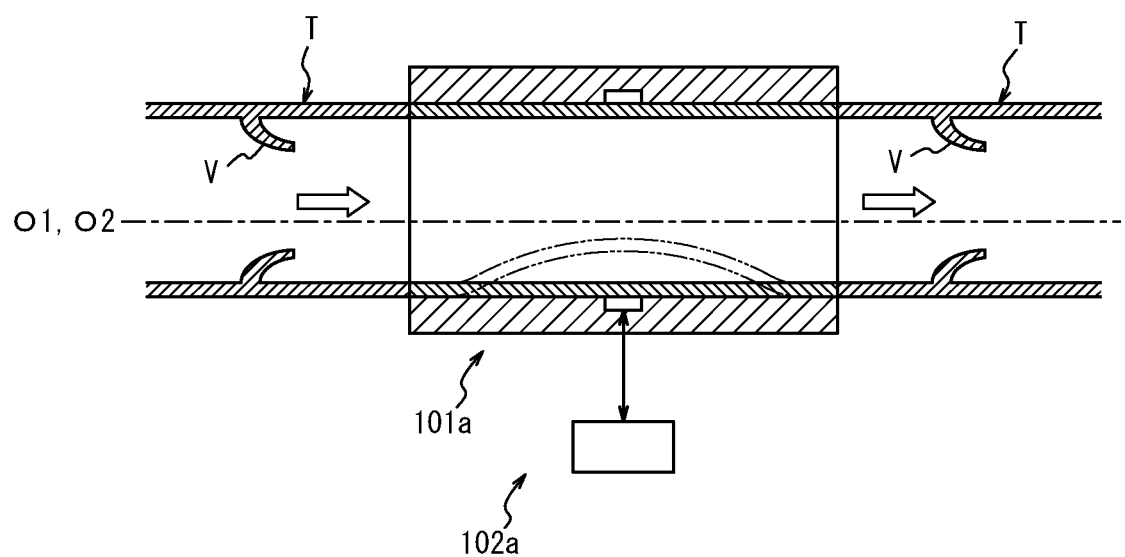
FIG. 11 is a longitudinal cross-sectional view illustrating a pump apparatus that includes the tube unit illustrated in FIG. 10A.

The tube unit 101a configured as described above may be used for, for example, a pump apparatus or a mixing apparatus. As illustrated in FIG. 11, for example, the pump apparatus may include tubes T that function as a path of the transport object and are coupled to the axial ends of the inner tube 103a. Each of the tubes T includes a check valve V that allows the transport object to pass in one of the axial directions and inhibits the transport object to pass in the other axial direction. In this case, when the inner tube 103a of the tube unit 101a is elastically deformed by the pressure controlled by the pressure controller 109a, the transported object can be transported in the one of the axial directions. Here, the transport object transported in the tube unit 101a may be a fluid such as a liquid, a gas-liquid mixture, a solid-liquid mixture, or powder.

Figure 12:
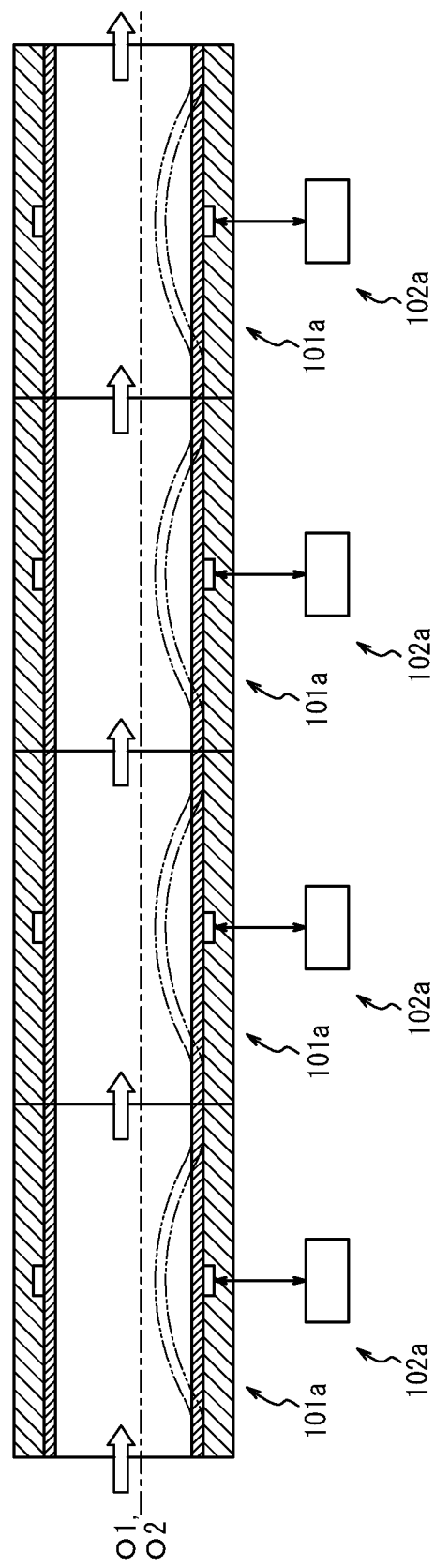
FIG. 12 is a longitudinal cross-sectional view illustrating a pump apparatus that includes a plurality of the tube units illustrated in FIG. 10A.

As illustrated in FIG. 12, further, when a plurality of tube units 101a are coupled to one another in the axial direction and the tube units 101a adjacent to one another are sequentially pressurized in different timings, the inner tube 103a may be sequentially contracted and may transport the transport object. The transportation in the peristaltic movement in this manner can smoothly transport a solid-liquid mixture such as a slurry, or powder, in particular. In the present embodiment, the substantial triangular shape of the inner tube 103a can maintain a sufficient size of the bottom surface to be deformed in the expanding manner, and thus can improve the transportation speed of powder, in particular. In the present embodiment, the outer peripheral surface of the outer tube 105a has the cross-section perpendicular to the axial direction in the substantially triangular shape. This configuration enables, when a plurality of pump apparatuses are arranged in parallel, the outer tubes 105a to be arranged closer to each other in a space-saving manner, as compared to a transportation apparatus in which the outer peripheral surface of the outer tube 105a has the cross-section in a circular shape. The outer peripheral surface of the outer tube 105a may have a substantially polygonal shape instead of the substantially triangular shape. At least one of the axial ends of the tube unit 101a may be inclined with respect to the central axes O1 and O2. When the tube units 101a having at least one axial end inclined in this manner are coupled to one another, the transportation path may have a variety of shapes. In the tube units 101a coupled to one another, the shapes of the cross-sections of the movable tubes 106a may be different from one another (e.g., one is in a substantially triangular shape and another is in a star-like shape). In the tube units 101a coupled to one another, circumferential directions of the cross-sections of the movable tubes 106a may be different from one another (e.g., one has a substantially triangular shape pointing upward and another has a substantially triangular shape pointing downward).

Figure 13:
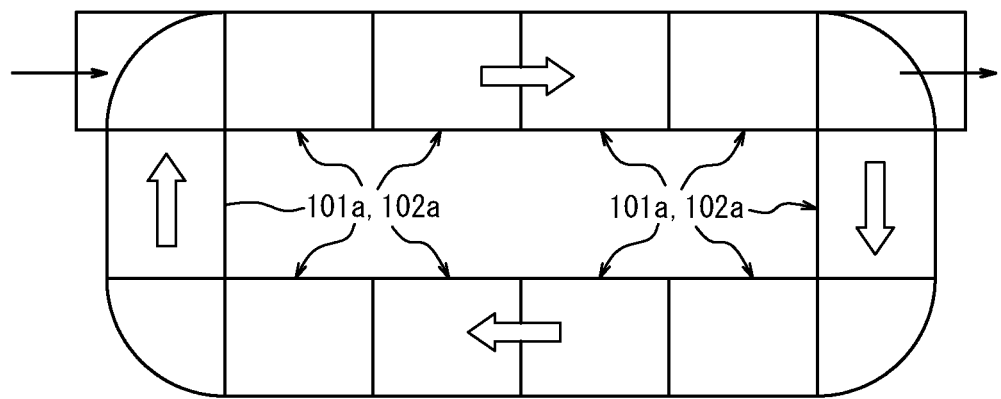
FIG. 13 is a plan view illustrating a mixing apparatus that includes a circulation path formed by a plurality of the tube units illustrated in FIG. 10A.

The pump apparatus configured as described above crushes the transport object during transportation thereof and thus may also function as the mixing apparatus. That is, when, for example, a solid-liquid mixture is used as a transport object, mixing of a solid and a liquid can be promoted. When a plurality of types of liquids, solid-liquid mixtures, or powders are used, mixing thereof can also be promoted. When the mixing apparatus includes the tube unit 101a as described above, the flow path of the transport object preferably forms an annular shape (i.e., a circuit), as illustrated in FIG. 13 by way of example. The thin arrows illustrated in FIG. 13 represent the transport object supplied to the circuit at an appropriate timing and the transport object discharged from the circulation path at an appropriate timing. In another configuration, for example, the flow path of the transport object formed throughout a plurality of tube units 101a coupled to one another may be configured to be closable at either end, and the transport object may be transported in a reciprocating manner between the ends of the flow path when the ends are closed. In still another configuration, one tube unit 101a may be used and operated in a state in which both axial ends thereof are closed, in such a manner as to mix an object within the space in the radially direction of the inner tube 103a.

Further, various types of the pump apparatuses (mixing apparatuses) as described above that include the tube unit 101a may be used for the transportation in the horizontal direction, in an inclined direction, and in a vertically upward direction. When the pump apparatus are used for the transportation in the inclined direction or in the vertical direction as described above, the movable tubes 106a of the inner tubes 103 are preferably formed such that, when being deformed expanding by the pressure applied to the pressurizing space 104a, portions brought close to one another from three directions toward the central axis O1 block the radially inward space of the inner tube 103a as much as possible. For such a configuration, for example, it may be considered to increase the expanding deformation amount of the movable tube 106a by increasing the amount of the pressurizing medium supplied to the pressurized space 104a. Alternatively, the cross-section perpendicular to the axial direction of the inner tube 103a may be shaped to promote the blocking.

As described above, in the tube unit 101a according to the present embodiment, at least one (in particular, both) of the outer peripheral surface and the inner peripheral surface has a cross-section perpendicular to the axial direction having a non-circular shape in a constant manner throughout the axial length. This may realize a stable elastic deformation (expanding deformation) of the inner tube 103a.

Figure 14:
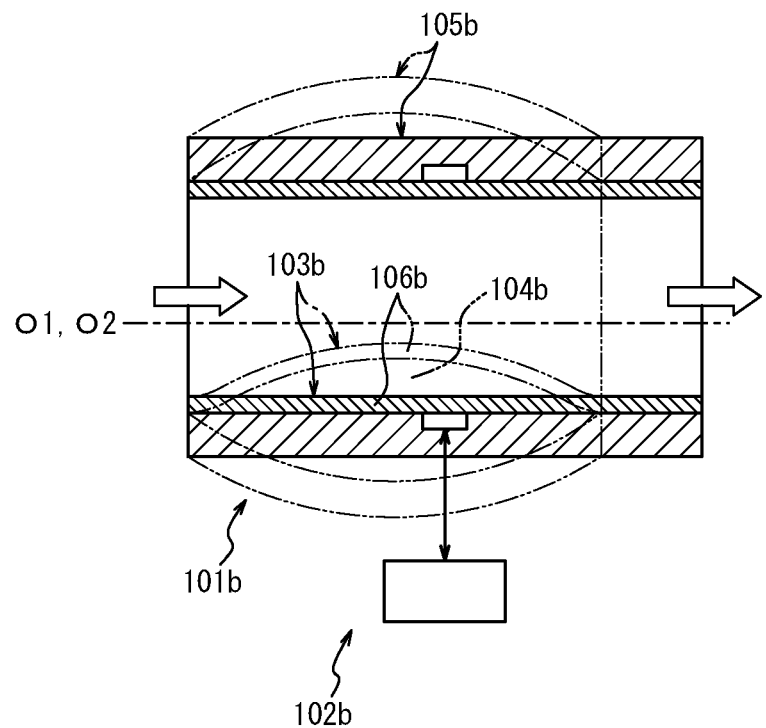
FIG. 14 is a longitudinal cross-sectional view illustrating a tube unit and a transport apparatus according to an eighth embodiment of the present disclosure.

Next, a tube unit 101b and a transport apparatus 102b according to a eighth embodiment of the present disclosure will be described in detail. The tube unit 101a according to the seventh embodiment described above has a configuration in which each of the inner tube 103a and the outer tube 105a does not have axial resiliency. On the other hand, the tube unit 101b according to the present embodiment has axial resiliency. As illustrated in FIG. 14, the tube unit 101b is configured such that each of the inner tube 103b and the outer tube 105b has the axial resiliency, that is, upon application of the pressure to the pressurized space 104b, the inner tube 103b is deformed expanding in the radially inward direction and the outer tube 105b is deformed expanding in the radially outward direction, in such a manner that each of the inner tube 103b and the outer tube 105b is deformed expanding in their axial directions. Other configurations are the same as those of the tube unit 101a and the transport apparatus 102a described above. The tube unit 101b according to the present embodiment may be used for the pump apparatus and the mixing apparatus, in a manner similar to the tube unit 101a described above.

According to the tube unit 101b of the present embodiment, upon application of a pressure to the pressure space 104b, the axial length of the tube unit 101b may be expanded and contracted as indicated by the two-dot chain lines in FIG. 14. Thus, for example, by fixing one axial end of the tube unit 101b, a stick-like object longer than the axial length of the movable tube 106b may be transported from one axial end of the tube unit 101b to the other axial end. Also, the tube unit 101b may particularly advantageously transport a high viscosity liquid. In order to obtain the resiliency as described above, for example, one of the outer tube 105b and the inner tube 103b may be configured as a resilient tubular body having an axial fiber-reinforced structure in which a plurality of fiber codes extending in the axial direction of the resilient tubular body are embedded in the resilient tubular body, and the other one of the outer tube 105b and the inner tube 103b is configured as a resilient tubular body that does not have the axial fiber-reinforced structure. Each of the outer tube 105b and the inner tube 103b may be configured as the resilient tubular body having the axial fiber-reinforced structure. Or, the outer tube 105b may be configured as, in place of the resilient tubular body having an axial fiber-reinforced structure, a resilient tubular body having a sleeve-fiber-reinforced structure in which the outer surface of the resilient tubular body is covered with a fiber cord woven in a sleeve-shape. When the tube unit 101b does not have resiliency in a manner similar to the tube unit 101a as described above, the tube unit 101a can particularly advantageously transport powder.

Figure 15A:
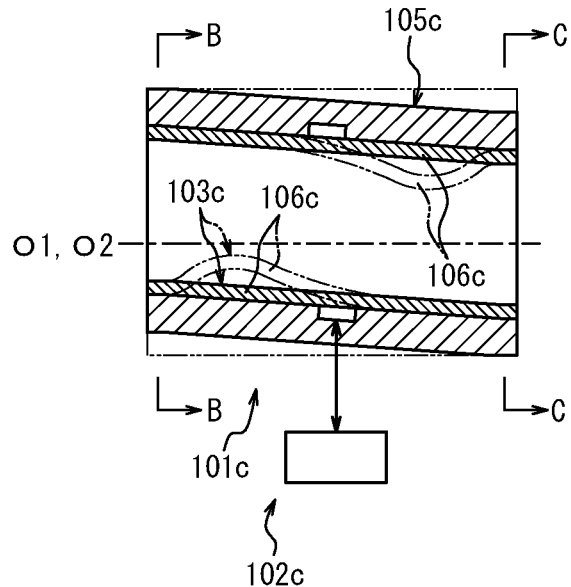
FIG. 15A is a longitudinal cross-sectional view illustrating a tube unit and a transport apparatus according to a ninth embodiment of the present disclosure.
Figure 15B:
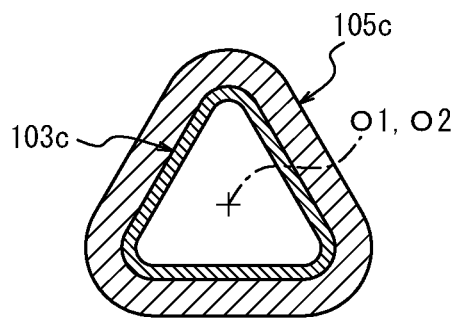
FIG. 15B is a cross-sectional view taken from arrow B-B of FIG. 15A.
Figure 15C:
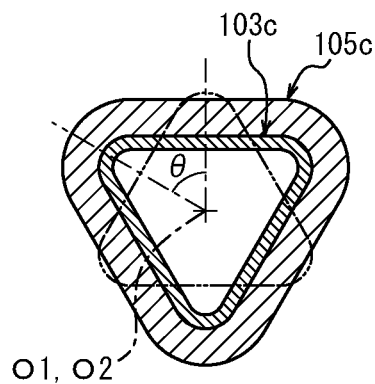
FIG. 15C is a cross-sectional view taken from arrow C-C of FIG. 15A.

Next, a tube unit 101c and a transport apparatus 102c according to a ninth embodiment of the present disclosure will be described in detail. In the tube unit 101a according to the seventh embodiment described above, the movable tube 106a is configured so that the cross-sections of the outer peripheral surface and the inner peripheral surface having the non-circular shapes are not rotated in the circumferential direction over the entire axial length. As illustrated in FIG. 15A to FIG. 15C, on the other hand, the movable tube 106c according to the present embodiment is configured such that cross-sections of the outer peripheral surface and the inner peripheral surface having the non-circular shapes (i.e., substantially equilateral triangle shapes) are rotated in the circumferential direction depending on the axial position. According to the present embodiment, in particular, the cross-sections having the non-circular shapes are rotated in the circumferential direction at a constant rate in accordance with the axial position. In the present embodiment, a rotation angle θ between the axial ends of the movable tube 106c is 60°. The rotation angle θ may be appropriately set to, for example, 30°. The movable tube 106c may be configured such that the cross-sections of the outer peripheral surface and the inner peripheral surface having the non-circular shapes are rotated in the circumferential direction at a non-constant rates in accordance with the axial position. According to the present embodiment, further, the outer tube 105c is configured such that the cross-sections of the inner peripheral surface and the outer peripheral surface are rotated in conformance with the rotation of the cross-section of the inner tube 103c in accordance with the axial position. Other configurations are the same as those of the tube unit 101a and the transport apparatus 102a described above. The tube unit 101c according to the present embodiment can also constitute the pump apparatus and the mixing apparatus, in a manner similar to the tube unit 101a described above. Further, the configuration including the rotation in the circumferential direction as described in the present embodiment can improve the transportation speed and the mixing efficiency of the transport object.

Figure 16A:
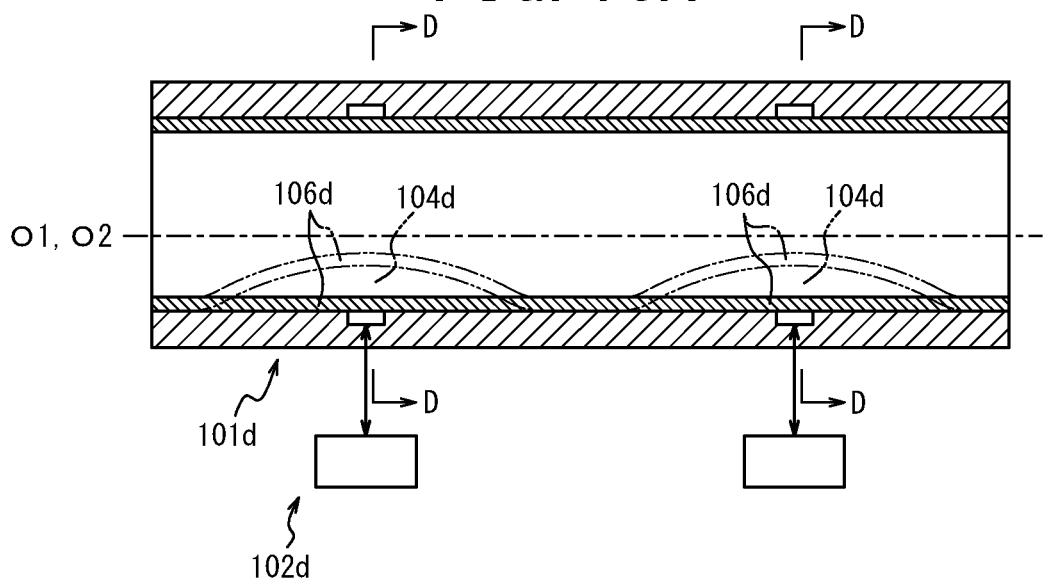
FIG. 16A is a longitudinal cross-sectional view illustrating a tube unit and a transport apparatus according to a tenth embodiment of the present disclosure.
Figure 16B:
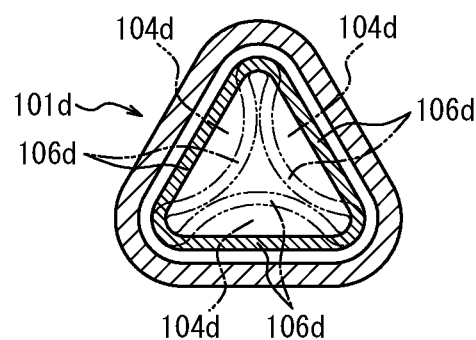
FIG. 16B is a cross-sectional view taken from arrow D-D of FIG. 16A.
Figure 16C:
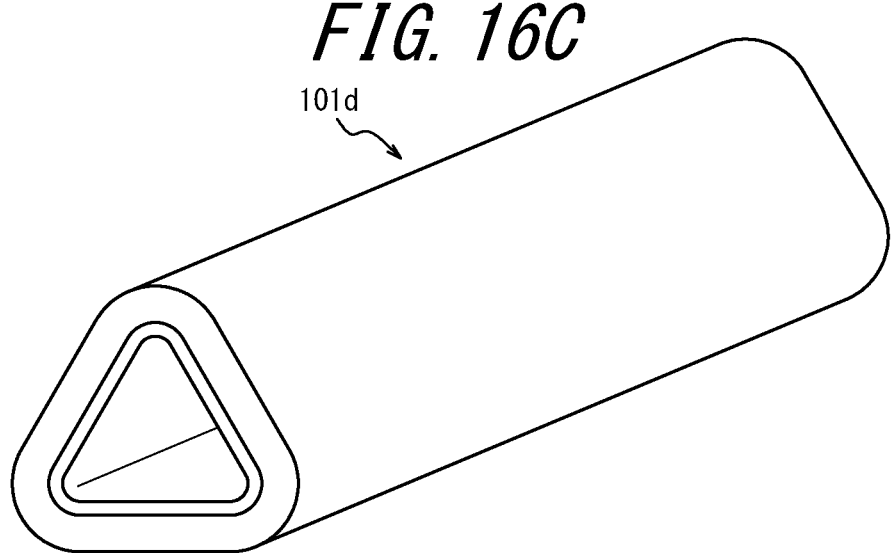
FIG. 16C is a perspective view of the tube unit illustrated in FIG. 16A.
Figure 17A:
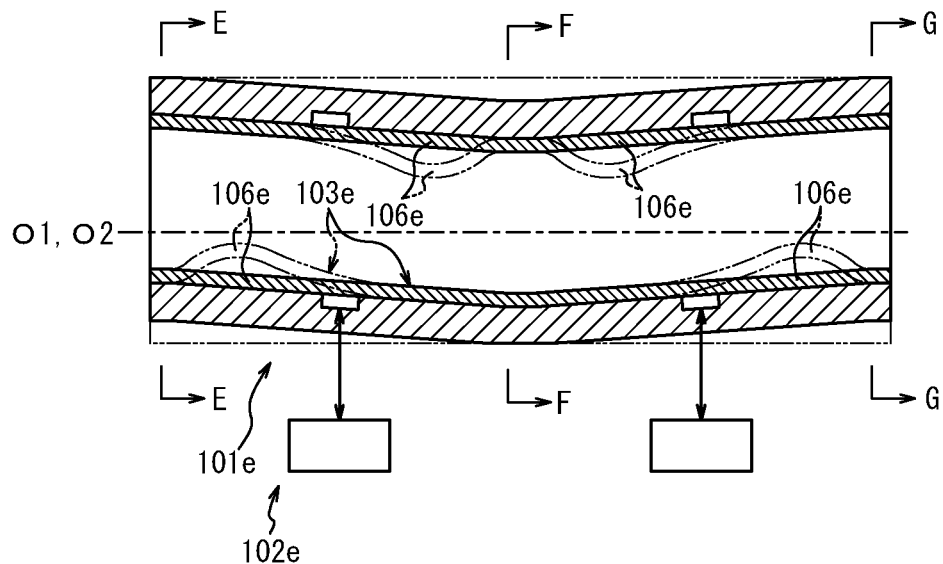
FIG. 17A is a longitudinal cross-sectional view illustrating a tube unit and a transport apparatus according to an eleventh embodiment of the present disclosure.
Figure 17B:
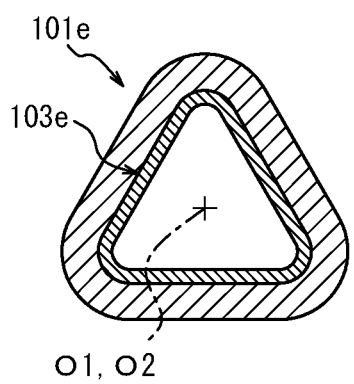
FIG. 17B is a cross-sectional view taken from arrow E-E of FIG. 17A.
Figure 17C:
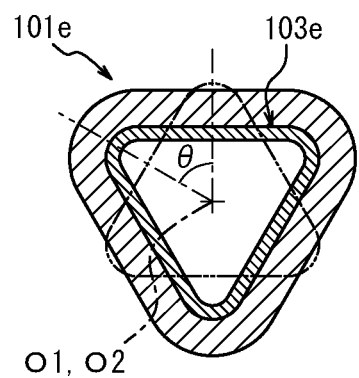
FIG. 17C is a cross-sectional view taken from arrow F-F of FIG. 17A.
Figure 17D:
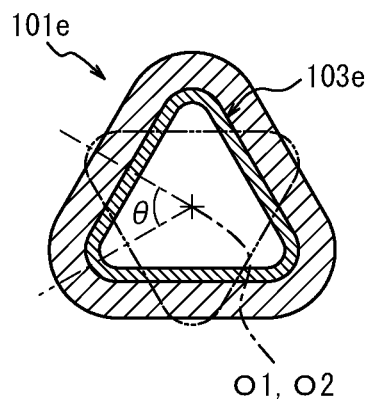
FIG. 17D is a cross-sectional view taken from arrow G-G of FIG. 17A.

Next, a tube unit 101d and a transport apparatus 102d according to a tenth embodiment of the present disclosure will be described in detail. The tube unit 101a according to the seventh embodiment described above includes one set of the pressurized space 104a and the movable tube 106a. As illustrated in FIG. 16A to FIG. 16C, on the other hand, the tube unit 101d according to the present embodiment includes a plurality of sets, in particular, two sets of the pressurized spaces 104d and the movable tubes 106d. The present embodiment is not limited to two sets thereof but may include three or more sets. Other configurations are the same as those of the tube unit 101a and the transport apparatus 102a described above. The tube unit 101d according to the present embodiment can also constitute the pump apparatus and the mixing apparatus in a manner similar to the tube unit 101a described above.

Next, a tube unit 101e and a transport apparatus 102e according to a eleventh embodiment of the present disclosure will be described in detail. In the tube unit 101d according to the tenth embodiment described above, each of the plurality of the movable tube 106a is configured such that the cross-sections of the outer peripheral surface and the inner peripheral surface having the non-circular shapes are not rotated in the circumferential direction over the entire axial length. According to the present embodiment as illustrated in FIG. 17A to FIG. 17D, on the other hand, each of the plurality of the movable tubes 106e is configured such that the cross-sections of the outer peripheral surface and the inner peripheral surface having the non-circular (substantially equilateral triangle) shapes are rotated in the circumferential direction in accordance with the axial position. According to the present embodiment, in particular, each of the cross-sections of the plurality of the movable tubes 106e having the non-circular shapes is rotated in the circumferential direction at a constant rate in accordance with the axial position. In the present embodiment, a rotation angle θ between the axial ends of each of the plurality of the movable tubes 106c is 60°. Other configurations are the same as those of the tube unit 101d and the transport apparatus 102d described above. The rotation angle θ may be appropriately set to, for example, 30°. The tube unit 101e according to the present embodiment can also constitute the pump apparatus and the mixing apparatus in a manner similar to the tube unit 101d described above. Note that in the present embodiment the inner tube 103e is obtained by performing, for example, extrusion molding of a material molded into a shape having the circumferential twist as described above. However, the inner tube 103e is not limited to such an item molded into the shape having the circumferential twist. That is, the inner tube 103e may be obtained by arranging, in a twisting manner, a product that does not have the circumferential twist.

Figure 18A:
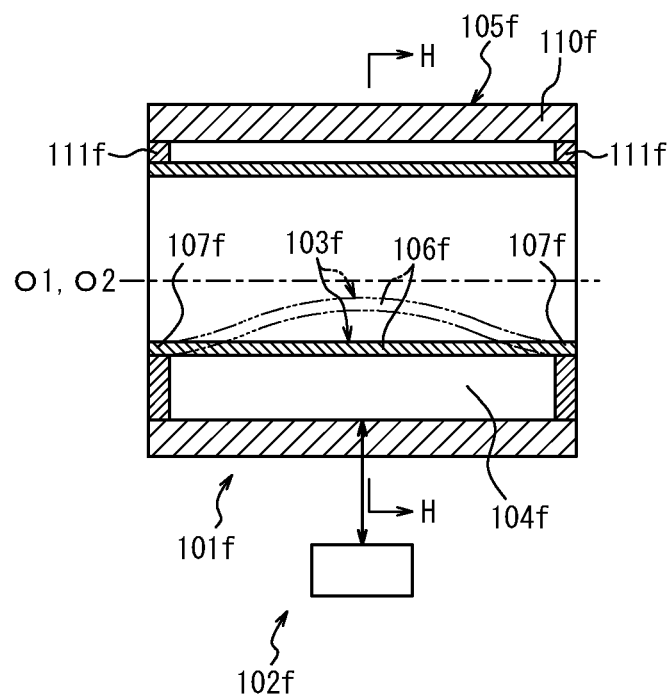
FIG. 18A is a longitudinal cross-sectional view illustrating a tube unit and a transport apparatus according to a twelfth embodiment of the present disclosure.
Figure 18B:
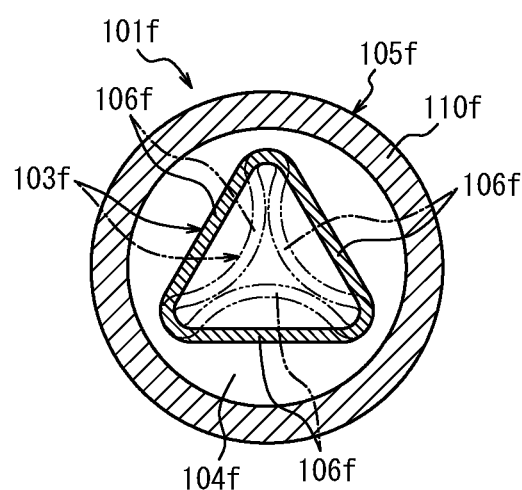
FIG. 18B is a cross-sectional view taken from arrow H-H of FIG. 18A.
Figure 18C:
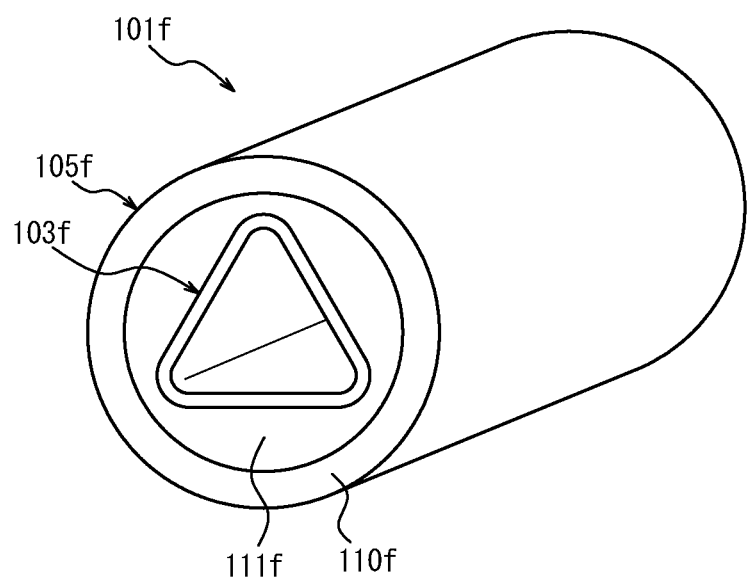
FIG. 18C is a perspective view of the tube unit illustrated in FIG. 18A.

Next, a tube unit 101f and a transport apparatus 102f according to a twelfth embodiment of the present disclosure will be described in detail. In the tube unit 101a according to the seventh embodiment described above, each of the cross-sections of the inner peripheral surface and the outer peripheral surface has the substantially equilateral triangular shape. In the tube unit 101*f* according to the present embodiment as illustrated in FIG. 18A to FIG. 18C, on the other hand, a portion of the cross-section of the inner peripheral surface of the outer tube 105*f* in contact with the pressurized space 104*f* has a circular shape. The cross-section of the outer peripheral surface of the outer tube 105*f* also has a circular shape. In the present embodiment, the outer tube 105*f* includes an outer peripheral member 110*f* having a cylindrical shape, and a pair of support members 111*f* each having an annular shape. The outer peripheral member 110*f* and the pair of support members 111*f* are joined together in a fluid-tight manner. Note that the outer tube 105*f* may be configured as one molded item obtained by integrally molding the outer peripheral member 110*f* and the pair of support members 111*f*. Each of the pair of support members 111*f* has an inner peripheral surface that has a cross-section in a substantially equilateral triangle shape and is joined in a fluid-tight manner to the outer peripheral surface of a corresponding end of the inner tube 103*f* (the non-movable tube 107*f*) over the entire circumference thereof. Other configurations are the same as those of the tube unit 101*a* and the transport apparatus 102*a* described above. The tube unit 101*f* according to the present embodiment can also constitute the pump apparatus and the mixing apparatus, in a manner similar to the tube unit 101*a*. In the present embodiment, a support for supporting the axially intermediate portion of the movable tube 106*f* may be provided to the outer tube 105*f* For example, by providing such a support to a bottom side of the movable tube 6*f*, the movable tube 106*f* can be inhibited from sagging due to the weight of the transport object. Further, for example, such a support may be provided continuously or intermittently throughout the circumference such that the cross-section perpendicular to the axial direction can be maintained in a desired shape at the time of the contracting deformation of the axial central portion of the movable tube 106*f*.

Figure 19A:
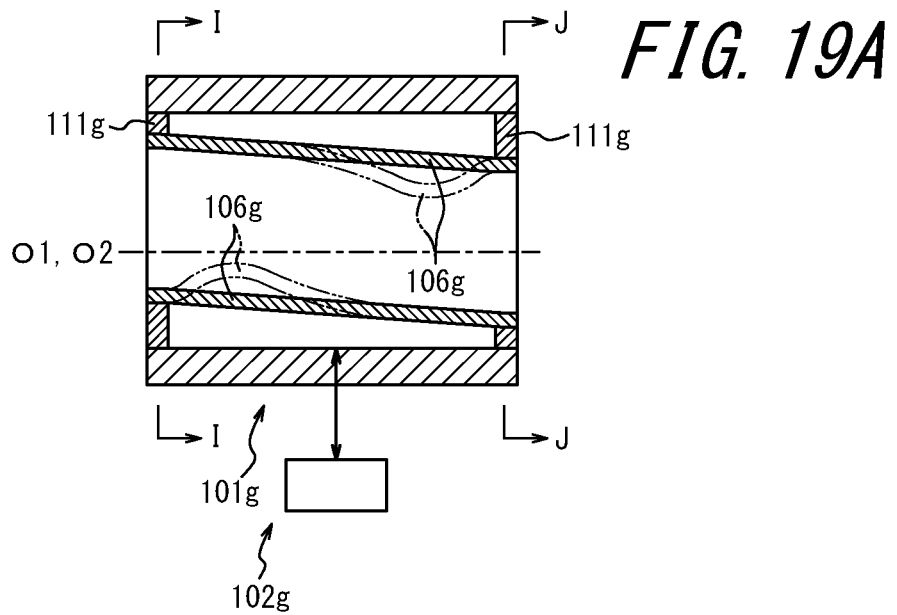
FIG. 19A is a longitudinal cross-sectional view illustrating a tube unit and a transport apparatus according to a thirteenth embodiment of the present disclosure.
Figure 19B:
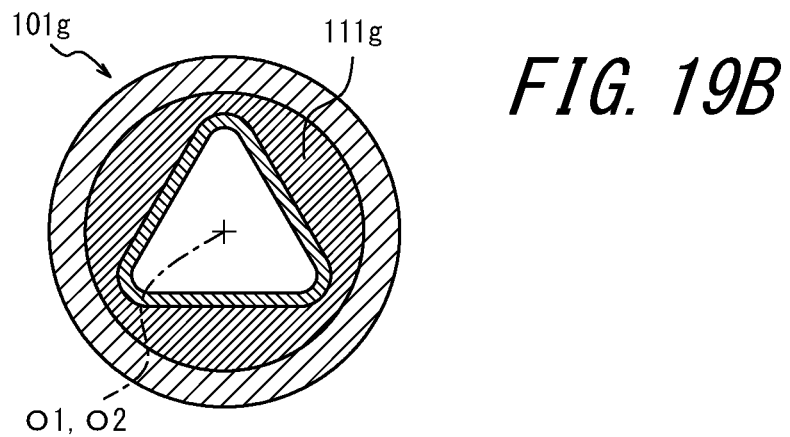
FIG. 19B is a cross-sectional view taken from arrow I-I of FIG. 19A.
Figure 19C:
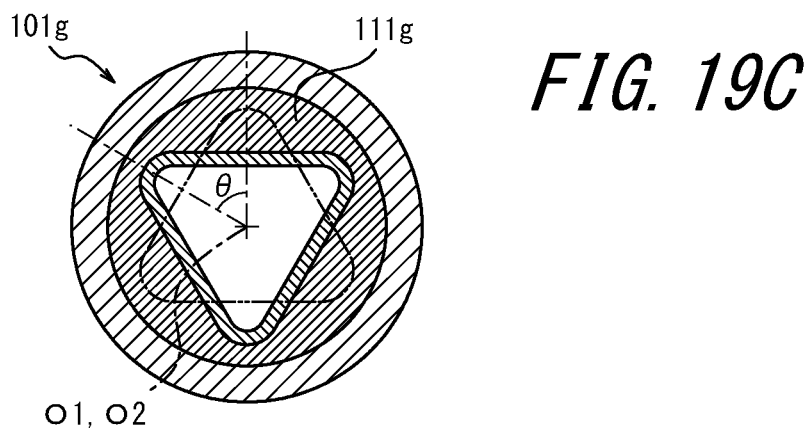
FIG. 19C is a cross-sectional view taken from arrow J-J of FIG. 19A.

Next, a tube unit 101*g* and a transport apparatus 102*g* according to a thirteenth embodiment of the present disclosure will be described in detail. In the tube unit 101*f* according to the twelfth embodiment described above, the movable tube 106*f* is configured such that the cross-sections of the outer peripheral surface and the inner peripheral surface having the non-circular shapes are not rotated in the circumferential direction over the entire axial length. As illustrated in FIG. 19A to FIG. 19C, on the other hand, the movable tube 106*g* according to the present embodiment is configured such that the cross-sections of the outer peripheral surface and the inner peripheral surface having the non-circular (substantially equilateral triangle) shapes are rotated in the circumferential direction in accordance with the axial position. According to the present embodiment, in particular, the cross-sections having the non-circular shapes are rotated in the circumferential direction at a constant rate in accordance with the axial position. In the present embodiment, a rotation angle θ between the axial ends of the movable tube 106*g* is 60°. A rotational angle between the pair of support member 111*g* is also 60°. The rotation angle θ may be appropriately set to, for example, 30°. The movable tube 106*g* may be configured such that the cross-sections of the outer peripheral surface and the inner peripheral surface having the non-circular shapes are rotated in the circumferential direction at non-constant rates in accordance with the axial position. Other configurations are the same as those of the tube unit 101*f* and the transport apparatus 102*f* described above. The tube unit 101*g* according to the present embodiment can also constitute the pump apparatus and the mixing apparatus in a manner similar to the tube unit 101*f* described above. Further, the configuration including the rotation in the circumferential direction as described in the present embodiment can improve the mixing efficiency of the transport object.

Figure 20A:
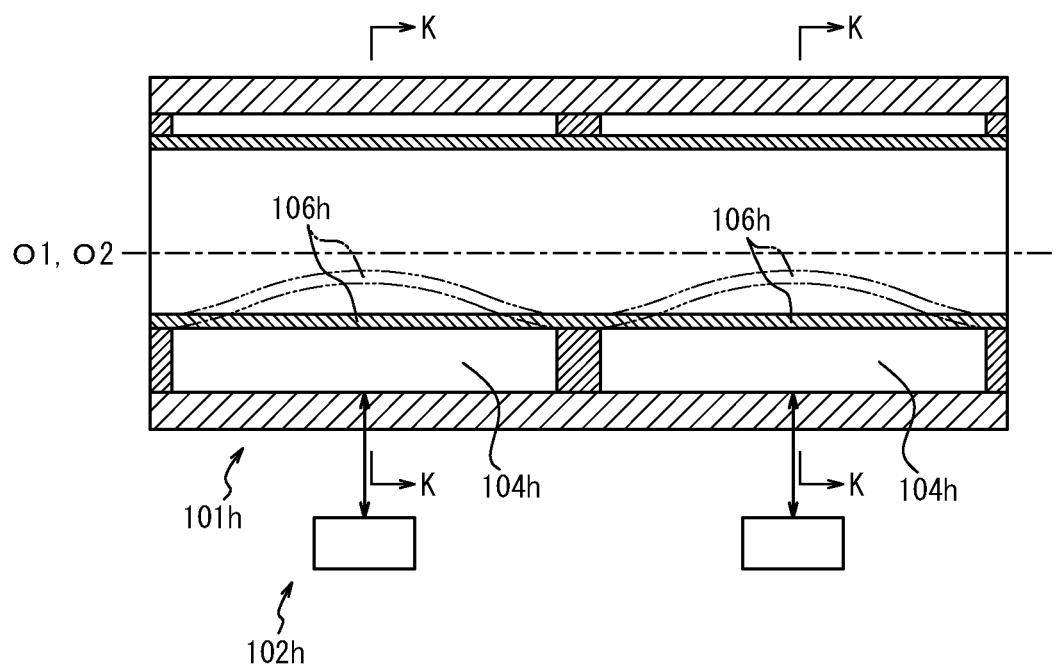
FIG. 20A is a longitudinal cross-sectional view illustrating a tube unit and a transport apparatus according to a fourteenth embodiment of the present disclosure.
Figure 20B:
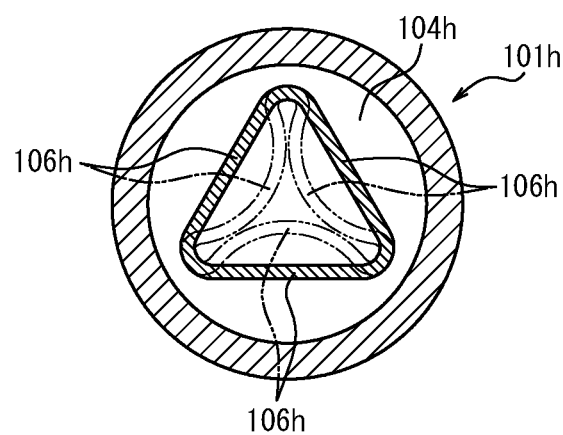
FIG. 20B is a cross-sectional view taken from arrow K-K of FIG. 20A.
Figure 20C:
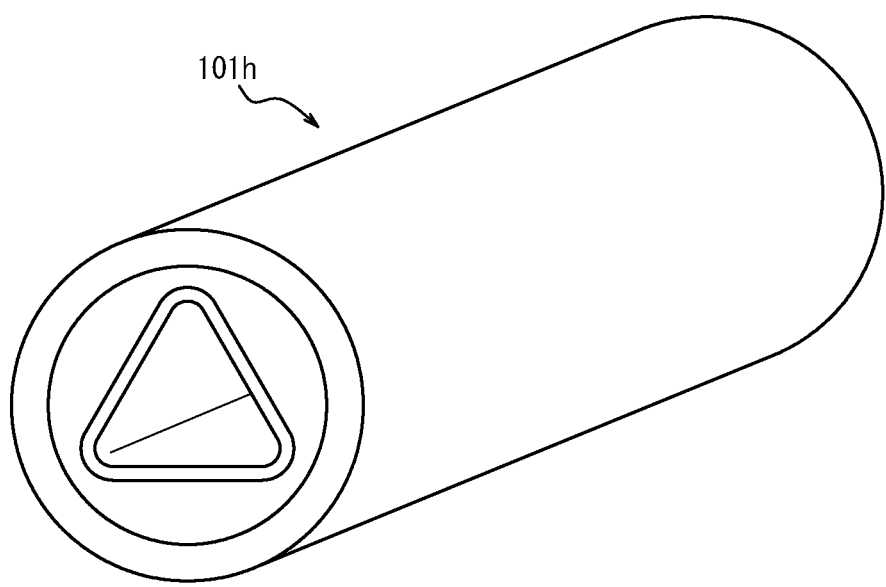
FIG. 20C is a perspective view of the tube unit illustrated in FIG. 20A.
Figure 21A:
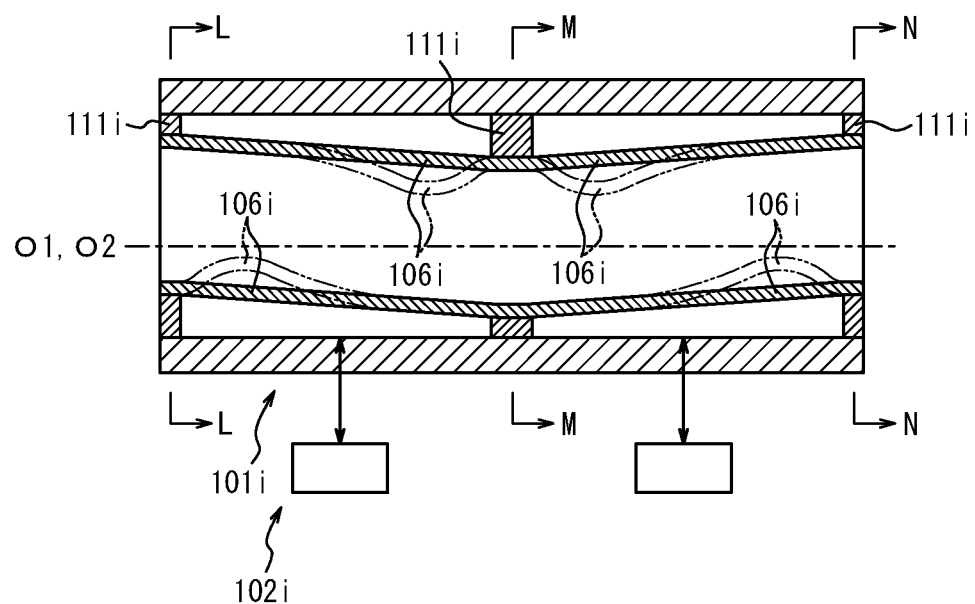
FIG. 21A is a longitudinal cross-sectional view illustrating a tube unit and a transport apparatus according to a fifteenth embodiment of the present disclosure.
Figure 21B:
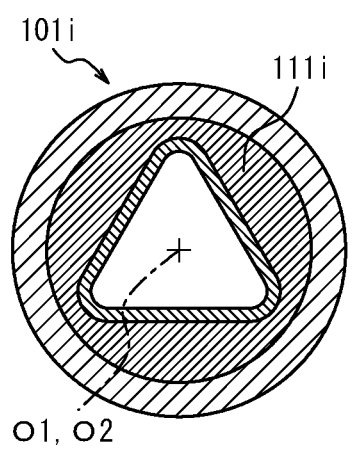
FIG. 21B is a cross-sectional view taken from arrow L-L of FIG. 21A.
Figure 21C:
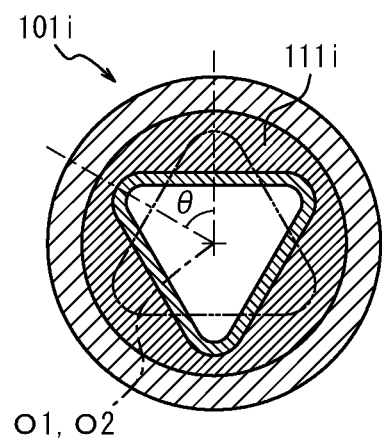
FIG. 21C is a cross-sectional view taken from arrow M-M of FIG. 21A.
Figure 21D:
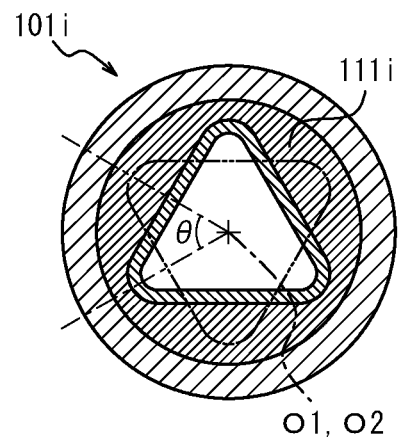
FIG. 21D is a cross-sectional view taken from arrow N-N of FIG. 21A.

Next, a tube unit 101*h* and a transport apparatus 102*h* according to an fourteenth embodiment of the present disclosure will be described in detail. The tube unit 101*f* according to the twelfth embodiment described above includes one set of the pressurized space 104*f* and the movable tube 106*f* As illustrated in FIG. 20A to FIG. 20C, on the other hand, the tube unit 101*h* according to the present embodiment includes a plurality of sets of a pressurized space 104*h* and a movable tube 106*h*, in particular, two sets thereof. The number of sets is not limited to two but may be three or more. Other configurations are the same as those of the tube unit 101*f* and the transport apparatus 102*f* described above. The tube unit 101*h* according to the present embodiment can also constitute the pump apparatus and the mixing apparatus in a manner similar to the tube unit 101*f* described above.

Next, a tube unit 101*i* and a transport apparatus 102*i* according to a fifteenth embodiment of the present disclosure will be described in detail. The tube unit 101*h* according to the fourteenth embodiment described above includes a plurality of the movable tubes 106*h*, whose outer peripheral surface and inner peripheral surface have cross-sections having a non-circular shape that are not rotated in the circumferential direction over the axial length thereof. In the present embodiment as illustrated in FIG. 21A to FIG. 21D, on the other hand, each of the plurality of movable tubes 106*i* includes the outer peripheral surface and the inner peripheral surface having the cross-section in non-circular (substantially equilateral triangular) shapes which are rotated in the circumferential direction in accordance with an axial position. According to the present embodiment, in particular, the cross-section of the each of the plurality of movable tubes 106*i* is rotated in the circumferential direction at a constant rate in accordance with the axial position. In the present embodiment, a rotation angle θ between the axial ends of each of the plurality of the movable tubes 106*i* is 60°. Other configurations are the same as those of the tube unit 101*h* and the transport apparatus 102*h* described above. A rotational angle between the pair of support member 111*i* adjacent to each other is also 60°. The rotation angle θ may be appropriately set to, for example, 30°. The tube unit 101*i* according to the present embodiment also can constitute the pump apparatus and the mixing apparatus in a manner similar to the tube unit 101*h* described above.

Figure 22C:
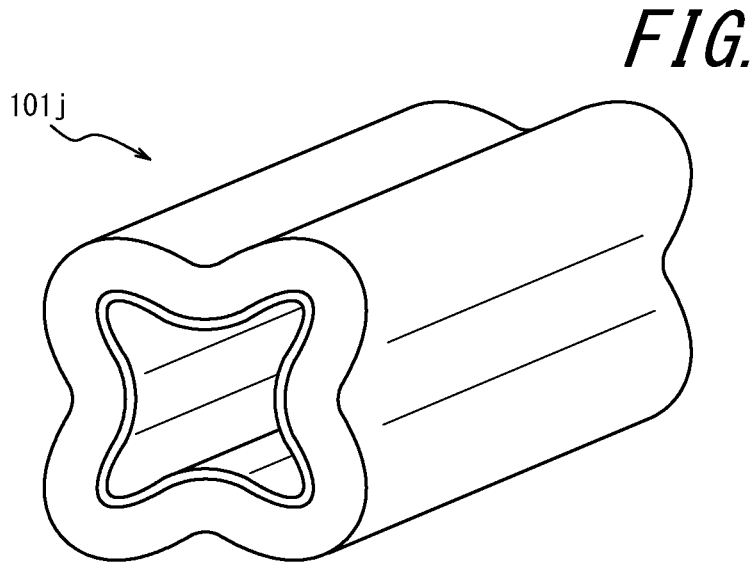
FIG. 22C is a perspective view of the tube unit illustrated in FIG. 22A.

Next, a tube unit 101*j* and a transport apparatus 102*j* according to a sixteenth embodiment of the present disclosure will be described in detail. In the tube unit 101*a* according to the seventh embodiment described above, the movable tube 106*a* has the cross-sections of the outer peripheral surface and the inner peripheral surface, perpendicular to the axial direction, having substantially equilateral triangle shapes over the entire axial length. In the present embodiment, as illustrated in FIG. 22A to FIG. 22C, the movable tube 106*j* includes the outer peripheral surface and the inner peripheral surface having cross-sections, orthogonal to the axial direction, having a constant star-like shape over the entire axial length. Other configurations are the same as those of the tube unit 101*a* and the transport apparatus 102*a* described above. The tube unit 101*j* according to the present embodiment also can constitute the pump apparatus and the mixing apparatus in a manner similar to the tube unit 101*a* described above. The tube unit 101*j* according to the present embodiment, in a manner similar to the tube unit 101c according to the ninth embodiment illustrated with reference to FIG. 15A to FIG. 15C, may be configured such that the cross-sections of the outer peripheral surface and the inner peripheral surface of the movable tube 106j having the star-like shape are rotated in the circumferential direction in accordance with an axial position. In this case, the rotation angle θ between the axial ends of the movable tube unit 106j is preferably at 45°. It is apparent that the tube unit 101j according to the present embodiment may be modified in a variety of manners, in a manner similar to the examples illustrated in FIG. 16A to FIG. 17D.

The seventh to sixteenth embodiments of the present disclosure and their example variations have been described above with reference to FIG. 10A to FIG. 22C. However, the above description is merely illustrative, and it is appreciated that various modifications may be made to the embodiments and example variations without departing from the gist of the present disclosure. For example, the tube units according to the seventh to sixteenth embodiments may include the shape regulating portion or the ring described in the first to fifteenth embodiments.

Next, other embodiments of the present disclosure will be described with reference to FIG. 23 to FIG. 34.

Figure 23:
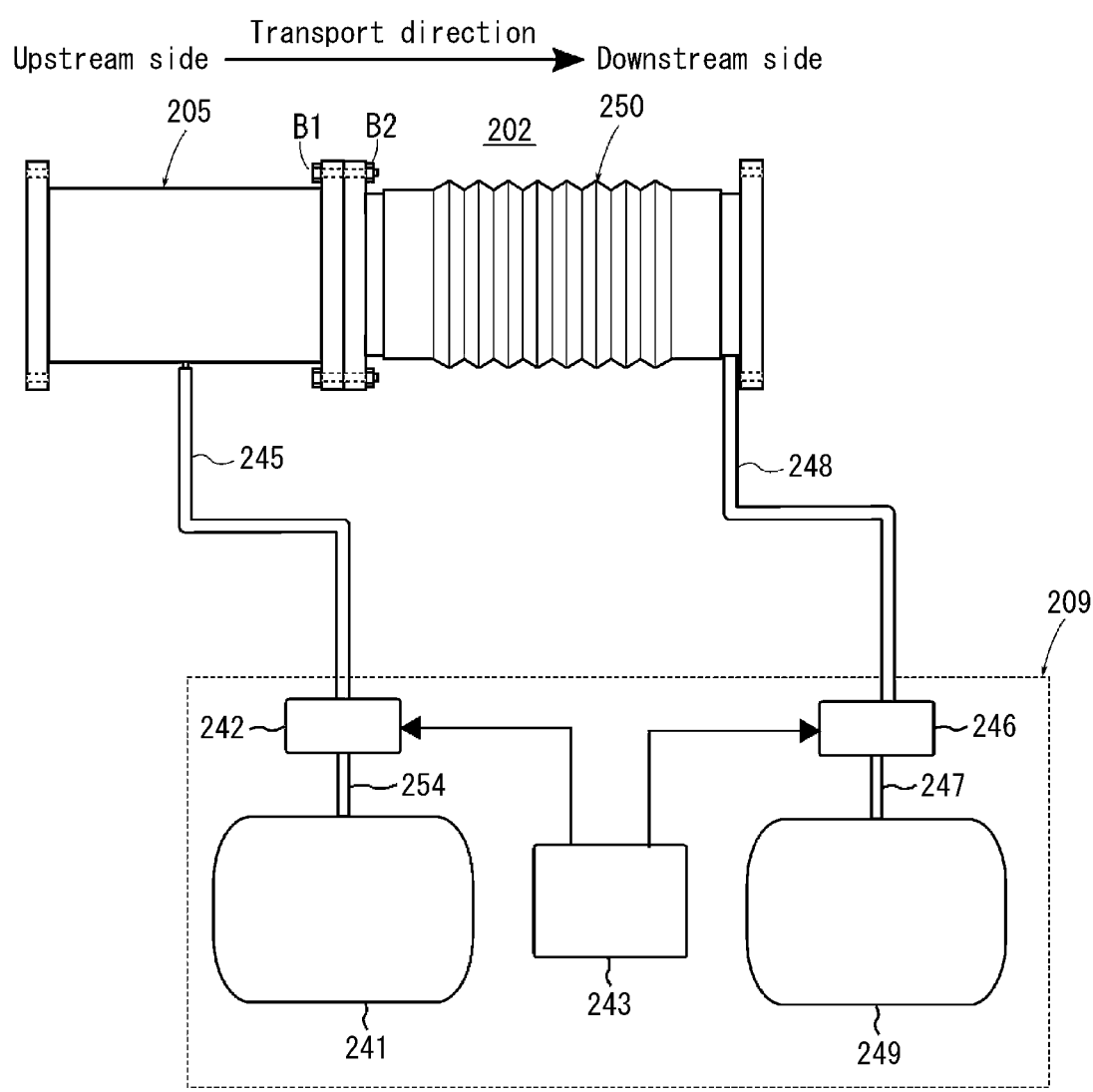
FIG. 23 is a diagram illustrating an example configuration of the transport apparatus.

FIG. 23 is a diagram illustrating an example configuration of a transport apparatus 202. The transport apparatus 202 is provided at a center of, or at an end on a loading side of, an existing pipe, which is not illustrated. As illustrated in FIG. 23, the transport apparatus 202 is constituted of a tube unit 205 and a resilient body 250 coupled to each other.

Figure 24A:
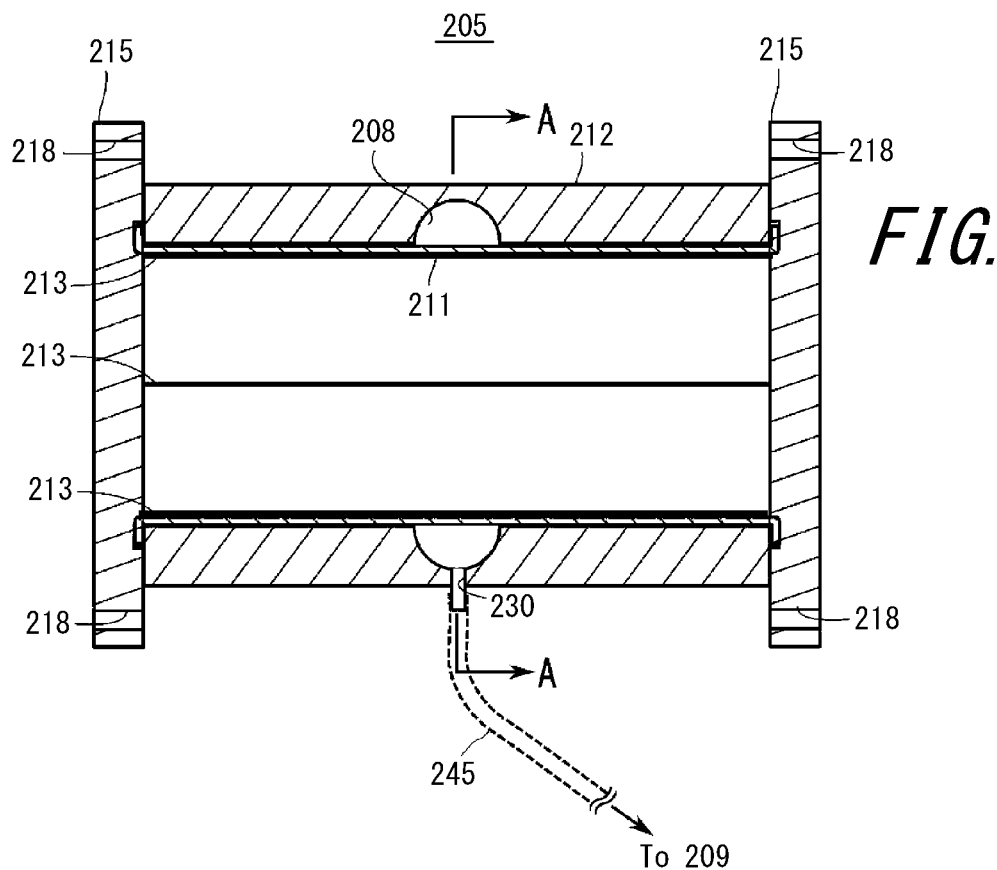
FIG. 24A is a diagram schematically illustrating a configuration of the tube unit.
Figure 24B:
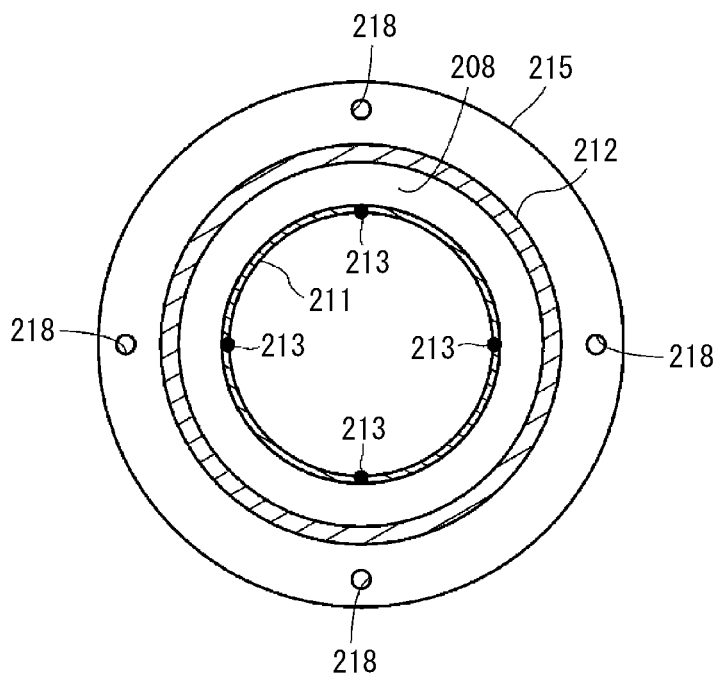
FIG. 24B is a diagram schematically illustrating the configuration of the tube unit.

FIG. 24A to FIG. 24D are cross-sectional views in the axial direction and cross-sectional views in the radial direction illustrating an example configuration of a tube unit 205. As illustrated in FIGS. 24A and 24B, the tube unit 205 includes an inner tube 211, an outer tube 212 provided coaxially with and along the outer peripheral surface of the inner tube 211, and a pair of end plates 215. That is, the tube unit 205 is provided with the inner tube 211 along the inner peripheral surface of the outer tube 212, and both axial ends of the outer tube 212 and inner tube 211 are closed by the pair of end plates 215. The inner tube 211 is obtained by, for example, forming a resilient matrix material such as a rubber or an elastomer with a thickness of approximately 0.2 to 5 mm into a tubular shape. The inner tube 211 includes a plurality of (four in the present embodiment) restricting members 213 embedded therein extending from one end of the inner tube 211 to the other end along the axial direction. In the present embodiment, the four restricting members 213 are embedded at equal angles of 90° in the circumferential direction.

The restricting members 213 may each be configured as, for example, a roving (aligned and pulled fibers), a yarn (twisted fibers), a cord (a yarn ply) of carbon fibers, glass fibers, or metal wires, those having tensile modules greater than that of the matrix material constituting the inner tube 211. For example, the inner tube 211 is formed in the tubular shape by coating the outer periphery of a tubular mold with latex rubber, arranging the restricting members 213 thereon, coating the resulting produce with latex rubber, performing crosslinking, and then removing the resulting item from the mold.

Note that the restricting members 213 may be formed by using the matrix material as the base material of the inner tube 211, rather than adding fibers as described above.

The outer tube 212 is configured as a tube made of a material such as metal or a hard synthesized resin that is not deformed by an air pressure or the like. The outer tube 212 includes a groove 208 circulating in the circumferential direction at the axial center of the inner peripheral surface, and a hole 230 extending to the outer peripheral surface from the groove 208. The inner tube 211 described above is provided along the inner periphery of the outer tube 212 and includes the axial ends each of which is fixed to the outer tube 212. In particular, the inner tube 211 is fixed with its ends bent in a radially expanding direction and clamped between the end plates 215 in the annular shape and the end surface of outer tube 212. The fixing method of the inner tube 211 is not limited thereto. For example, the inner tube 211 may be fixed with each of the ends thereof in the cylindrical shape pressed against the inner peripheral surface of the outer tube 212 by a pressing ring.

Each of the end plates 215 is made of a flat torus and fixed to, for example, the end surface of the outer tube 212 by a fixing means such as a bolt, which is not illustrated. Note that a fixing method of the end plates 215 to the outer tube 212 is not limited thereto. For example, the end plates 215 may be fixed to the outer tube 212 with the inner surfaces thereof screwed into the outer periphery of the outer tube 212.

Each of the end plates 215 is provided with a plurality of holes 218 penetrating in the axial direction at equal intervals on the same circumference, in such a manner as to connect the tube unit 205 to another tube unit 205 or the resilient body 250.

Figure 24C:
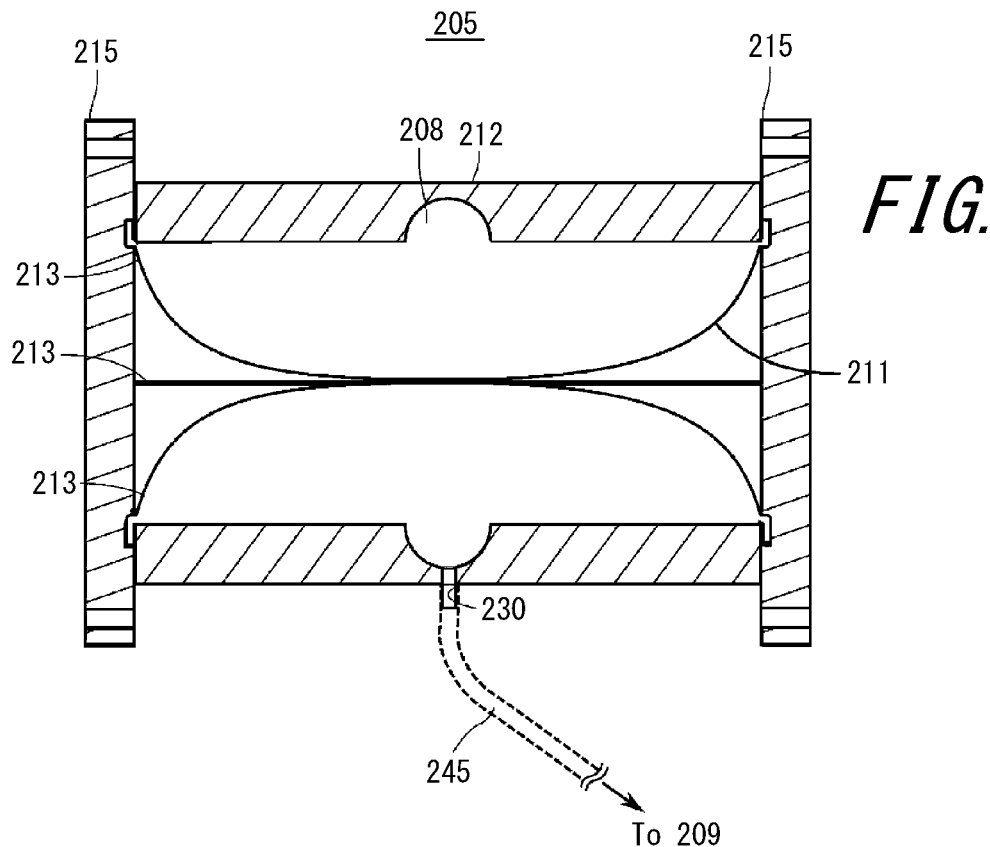
FIG. 24C is a diagram schematically illustrating the configuration of the tube unit.
Figure 24D:
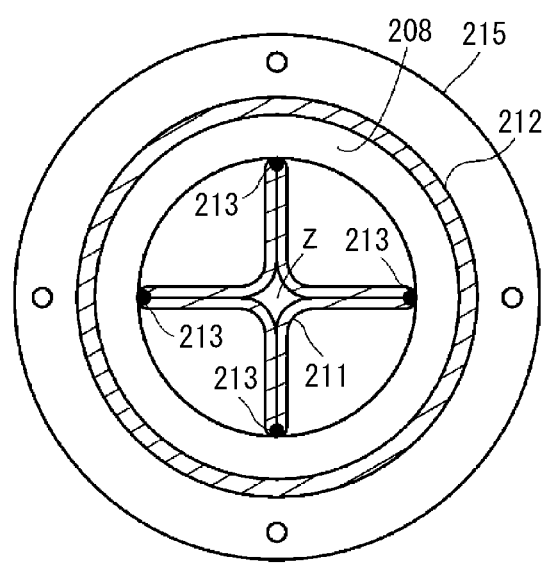
FIG. 24D is a diagram schematically illustrating the configuration of the tube unit.

As illustrated in FIG. 24C and FIG. 24D, in the tube unit 205, when the air (the pressurizing medium) is supplied to the groove 208 through the hole 230 described above, the air enters between the inner tube 211 and outer tube 212 and expands the inner tube 211 in the radially inward direction. That is, the groove 208 forms an annular gas chamber (the pressurized space) between the inner tube 211 and outer tube 212. The expansion of the inner tube 211, due to the restriction of the restricting members 213, causes a portion of the inner tube 211 between the restricting members 213 to expand in the radially inward direction. When the air is discharged, the inner tube 211 restores its original cylindrical shape.

A gap z is illustrated in FIG. 24D for convenience of the description to explain a state in which the inner tube 211 is expanded in the radially inward direction. However, when the inner tube 211 is expanded to its maximum, the portions of the inner tube 211 between the restricting members 213 come into contact with one another, and the gap z disappears.

Figure 25A:
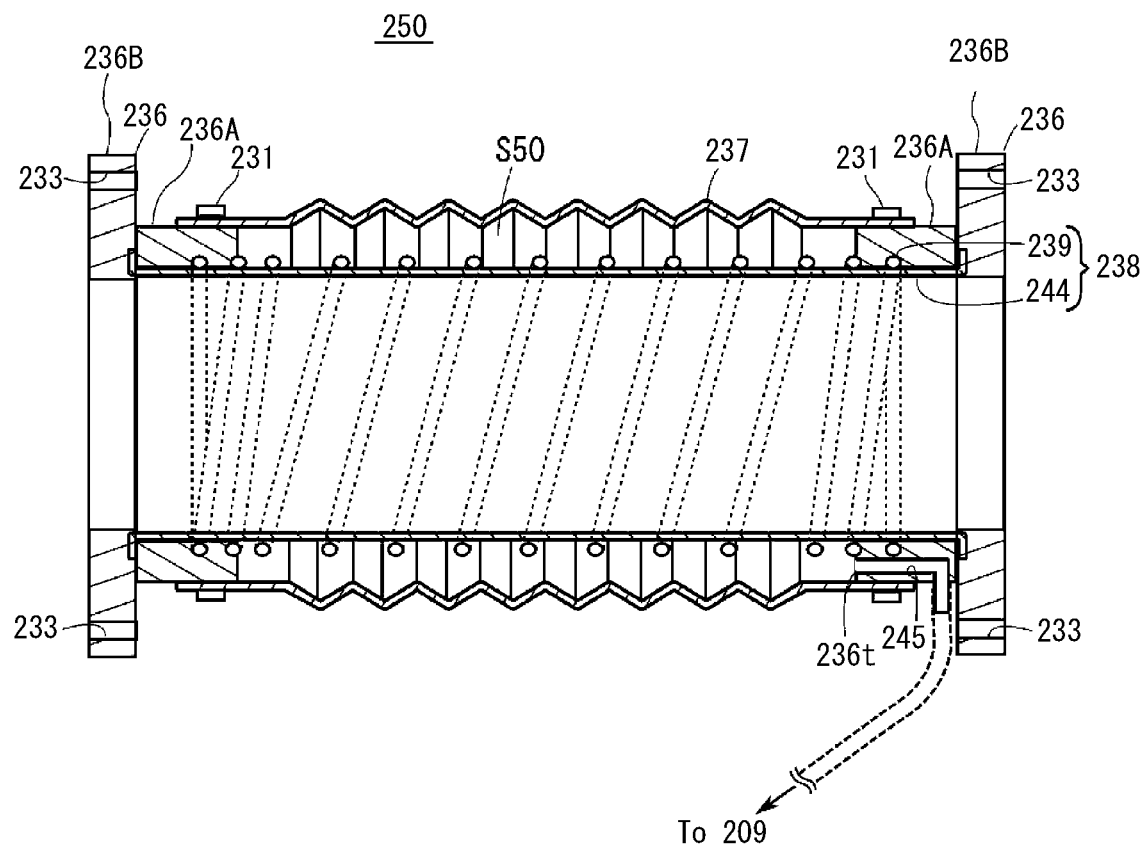
FIG. 25A is a diagram schematically illustrating a configuration of the resilient body.
Figure 25B:
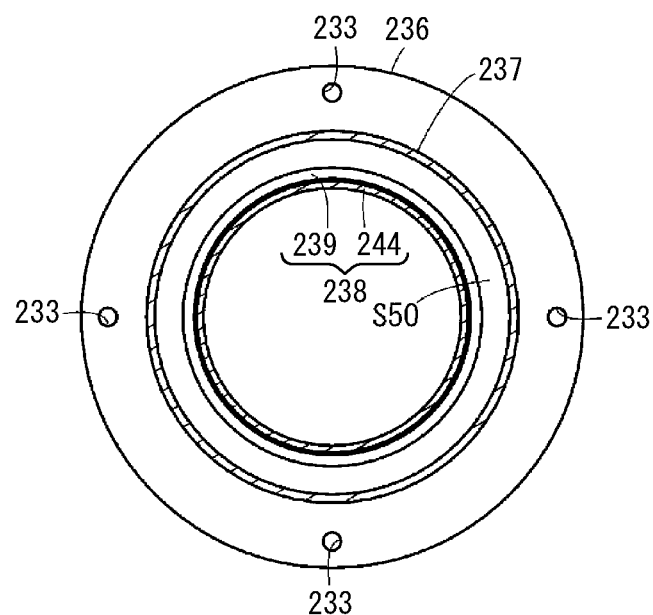
FIG. 25B is a diagram schematically illustrating the configuration of the resilient body.
Figure 25C:
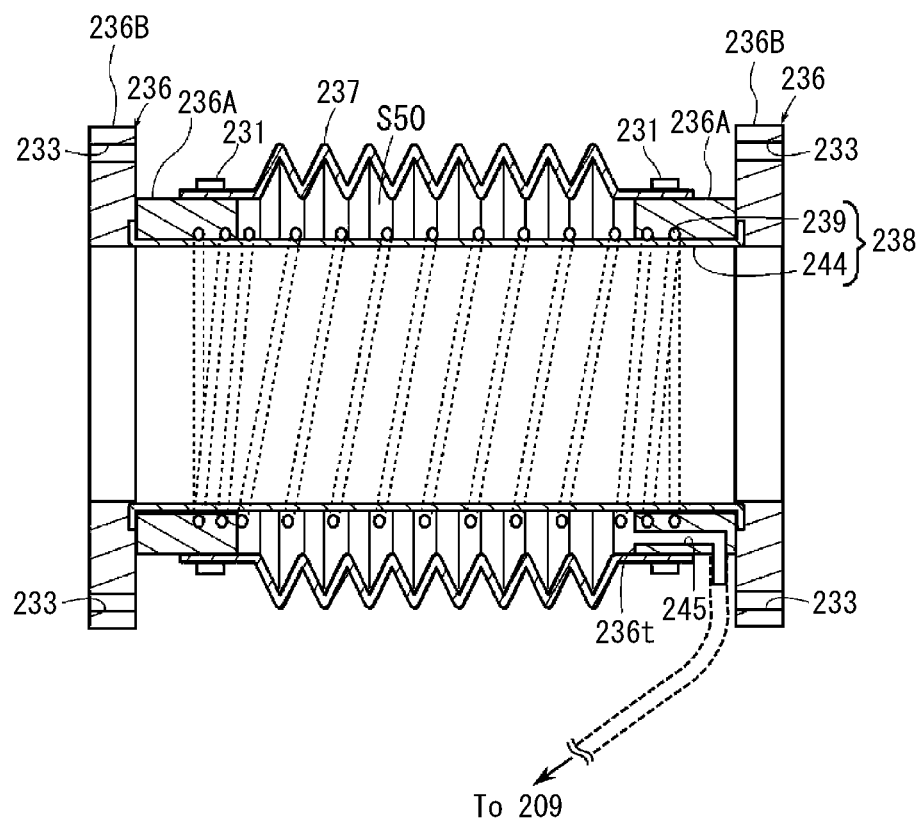
FIG. 25C is a diagram schematically illustrating the configuration of the resilient body.

FIG. 25A to FIG. 25C are cross-sectional views in the axial direction and in the radial direction illustrating an example configuration of the resilient body 250.

The resilient body 250 includes, for example, an outer tube 237 serving as an outer resilient body having a stretchable bellows along the axial direction, an inner tube 238 serving as an inner resilient body capable of expanding and contracting in the axial direction, and a pair of end members 236.

Each of the end members 236 includes a tube 236A having a cylindrical shape configured as a annular body made of, for example, resin, hard rubber, or metal, and a flange 236B having a flat annular shape. The tube 236A and the flange 236B are coaxially fixed together by using, for example, a screw or the like. One of the end members 236 includes a through hole 245 that extends within the tube 236A from the outer periphery of the tube 236A and opens to the end surface 236t opposing to the tubes 236A. The through hole 245 is a hole that enables the air to be supplied/discharged to/from the gas chamber S50, which will be described later, formed in the resilient body 250. Each of the flanges 236B includes a plurality of through holes 233 penetrating in the axial direction arranged at equal intervals on the same circumference. The through holes 233 provided on the flanges 236B correspond to the holes 218 provided to the end plate 215 of the tube unit 205 and enable connection to the tube unit 205 or another resilient body 250.

The inner tube 238 includes a coil spring 239 and a cover 244 that covers the inner periphery of the coil spring 239. The coil spring 239 of the present embodiment is configured as a compression spring. That is, the coil spring 239 is a spring that generates a biasing force in the axially outward direction in such a manner as to separate the end members 236 from each other.

The cover 244 is obtained by, for example, molding a material that is resilient in a manner similar to latex rubber and inhibits a fluid such as air or a liquid from passing or infiltrating therethrough into a cylindrical shape.

The inner tube 238 is fixed to the inner periphery of the tube 236A of each of the end members 236 in a state in which the coil spring 239 covers the outer periphery of the cover 244. According to the inner tube 238 in this configuration, the cylindrical shape of the cover 244 serving as the transport path is maintained by the coil spring 239.

As a method for fixing the inner tube 238, for example, a threading groove or the like may be formed in advance on the inner periphery of the tube 236A, and the coil spring 239 may be screwed into the threading groove. In this way, the coil spring 239 can be secured to the tube 236A. Further, in a state in which the coil spring 239 is secured to the tube 236A, the cover 244 may be inserted into the inner periphery of the coil spring 239, and the end of the cover 244 may be bent in the radially expanding direction and clamped between tube 236A and the flange 236B. The method for fixing the coil spring 239 and the cover 244 to the end member 236 is not limited thereto. For example, the tube 236A may be fixed by a fixing means such as an adhesive. Also, the cover 244 may be fixed such that an abutting force of the coil spring 239 acts to the end members 236 and, further, such that the pair of end members 236 abut each other in an air-tight manner.

Although in the above description the inner tube 238 includes the cover 244 provided on the inner peripheral side of the coil spring 239, this is not restrictive. For example, the inner tube 238 may include the cover 244 provided on the outer peripheral side of the coil spring 239, or the cover 244 provided to the inner peripheral side and the outer peripheral side of the coil spring 239. Alternatively, the inner tube 238 may include the coil spring provided to each of the inner peripheral side and the outer peripheral side of the cover 244. It is appreciated that, when the coil springs are provided to both the inside and outside of the cover 244, each of the coil springs have the same abutting directions.

The outer tube 237 is configured as a tube having a bellows that allows expansion and contraction in the axial direction and inhibits extension (expansion) and contraction in the radial direction (radially outward). In the outer tube 237, each of the axial ends is fixed to the outer periphery of the tube 236A in an air-tight manner. For example, the outer tube 237 is firmly fixed to the outer periphery of the tube 236A by a retaining ring 231 in the air-tight manner as illustrated in FIG. 25A.

When the resilient body 250 is configured as described above, the resilient body 250 includes the gas chamber S50 surrounded by the inner tube 238, the outer tube 237, and the pair of end members 236. The resilient body 250 is biased axially outward by the coil spring 239 constituting the inner tube 238. Thus, the resilient body 250 is contracted when the air is discharged from the gas chamber 50 and expands when the air is supplied to the gas chamber S50. In particular, when the air in the gas chamber S50 is discharged, the inner pressure of the gas chamber S50 becomes a negative pressure and overcomes the biasing force acting in the outward direction of the coil spring 239, the resilient body 240 is contracted as illustrated in FIG. 25C. Then, when the air is supplied to the gas chamber S50, the resilient body 250 is extended in the axial direction by the biasing force of the coil spring 239.

The tube unit 205 and resilient body 250 are coupled to each other in a coaxial manner, as illustrated in FIG. 23. In particular, a bolt B1 is inserted into the hole 218 of the end plate 215 of the tube unit 205 and the through hole 233 of the flange 236B of the resilient body 250, and then a nut B is placed for tightening. Thus, the inner tube 211 of the tube unit 205 and the inner tube 238 of the resilient body 250 communicate with each other, forming the transport path for transporting the transport object.

The tube unit 205 and resilient body 250 are controlled by a driving apparatus (a pressure controller) 209. The driving apparatus 209 according to the present embodiment includes an air supply means 241, a control valve 242, an air discharging means 249, a control valve 246, and a control unit 243.

The air supply means 241 is configured as, for example, an air compressor capable of supplying compressed air, or an air tank for storing compressed air. The compressed air stored in the air tank is supplied to the groove 208 of the tube unit 205 and the gas chamber S50 of the resilient body 250.

The control valve 242 is coupled to the air supply means 241 via the tube 254 and to the groove 208 via the tube 245. The control valve 242 includes a supply valve for controlling the supply of the compressed air from the air supply means 241 to the groove 208, and a discharge valve for discharging the air from the grooves 208. Each of the supply valve and the discharge valve is electrically connected to the controller and control the supply of the compressed air to the groove 208 from the air supply means 241 or the discharge of the air from the groove 208. One set of the supply valve and the discharge valve is provided to one tube unit 205. For example, when the transport apparatus 202 is constituted of a plurality of tube units 205 coupled to one another, the control valve 242 is provided with the number of sets of the supply valve and discharge valve corresponding to the number of the tube units 205.

The air discharge means 249 is configured as, for example, a vacuum pump capable sucking the air, and discharges the air from the gas chamber S50 of the resilient body 250.

The control valve 246 is coupled to the air discharge unit 249 via a tube 247 and to the gas chamber S50 via a tube 248. The control valve 246 includes a discharge valve for discharging the air from the gas chamber S50 by means of the air discharge means 249, and an air discharge valve for supplying air to the gas chamber S50. Each of the discharge valve and the air discharge valve is electrically connected to the controller and controls the discharge of air from the gas chamber S50 by the air discharge means 249 and the supply of air by communicating with the atmosphere in the gas chamber S50. One set of the discharge valve and the air discharge valve is provided to one resilient body 250. For example, when the transport apparatus 202 is constituted of a plurality of the resilient bodies 250 coupled to one another, the control valve 246 is provided with at least the number of sets of the discharge valve and the discharge valve corresponding to the number of the resilient bodies 250. Preferably, each of the tubes 245, 247, 248, and 254 has pressure-resistant and flexible properties.

The control unit 243 includes a microcomputer provided with a CPU serving as an arithmetic unit, and a storage means such as ROM for storing a program for controlling the operation of the transport apparatus 202. The control unit 243 controls signals to be output to the supply valve and the discharge valve of the control valve 242 and to the air discharge valve and the air discharge valve of the control valve 246, on the basis of an instruction input by means of an input means.

In the control unit 243, the storage means stores, for example, a program defining an order to contract the tube unit 205 and the contract of the resilient body 250 constituting the transport apparatus 202. The storage means stores, for example, a program for executing a transport mode for operating the tube unit 205 and the resilient body 250 such that the transport object is transported in one direction, or a program for executing a stirring mode for operating the tube unit 205 and the resilient body 250 such that the transport object is transported back and forth from one side to the other.

FIG. 26A to FIG. 26G are diagrams illustrating the operation of the transport apparatus 202 that is constituted of the tube unit 205 and the resilient body 250 alternately arranged and operated as a pump for transporting the transport object to one side. In the following description, in order to specify each of the tube units 205 and each of the resilient bodies 250, the tube units are denoted as tube units 205A, 205B, and 205C, and the resilient bodies are denoted as resilient bodies 250A, 250B, and 250C. The transport object is loaded from the tube unit 205A.

Figure 26A:
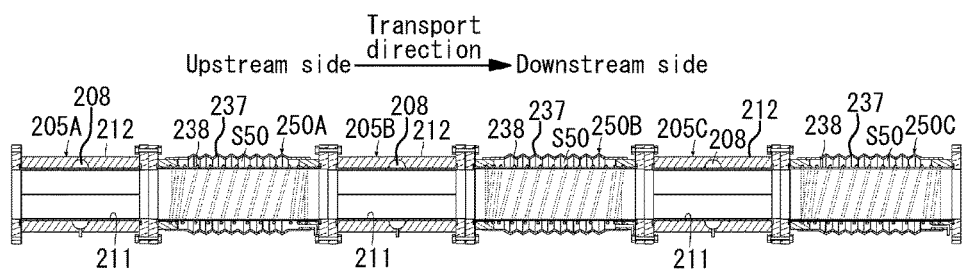
FIG. 26A is a diagram illustrating an operation of the transport apparatus.

FIG. 26A illustrates an initial state in which the transport apparatus 202 is installed. That is, each of the tube units 205A, 205B, and 205C is in a state in which the inner tube 211 is contracted, and the resilient bodies 250A, 250B, 250C are extended maximum in the axial direction.

Figure 26B:
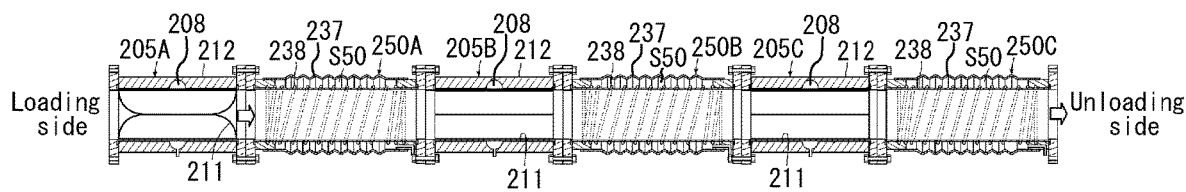
FIG. 26B is a diagram illustrating the operation of the transport apparatus.

As illustrated in FIG. 26B, the compressed air is supplied to the groove 208 of the tube unit 205A such that the inner tube 211 is expanded. This causes the transport object within the tube unit 205A to be pushed toward the tube unit 205A. Then, the expansion of the inner tube 211 of the tube unit 205A causes the inner tube 211 to be expanded in such a manner that the wall surfaces thereof come into contact with each other. Thus, the transport path is closed and separated into an upstream side and a downstream side.

Figure 26C:
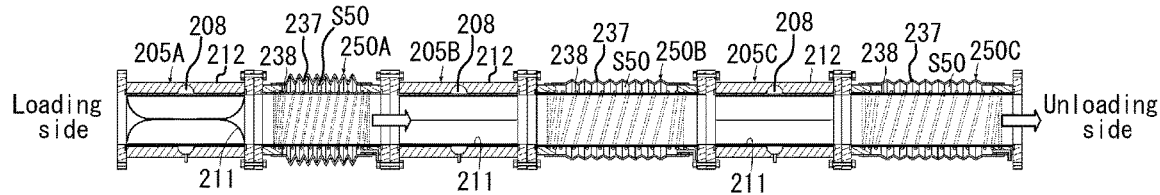
FIG. 26C is a diagram illustrating the operation of the transport apparatus.

As illustrated in FIG. 26C, subsequently, in a state in which the expansion of the inner tube 211 of the tube unit 205A is maintained, the air in the gas chamber S50 of the resilient body 250A is discharged, such that the resilient body 250A contracts in the axial direction. By the axial contraction of the resilient body 250A, the inner tube 211 of the tube unit 205A being expanded functions as a wall and pushes the transport object to the tube unit 205B.

Figure 26D:
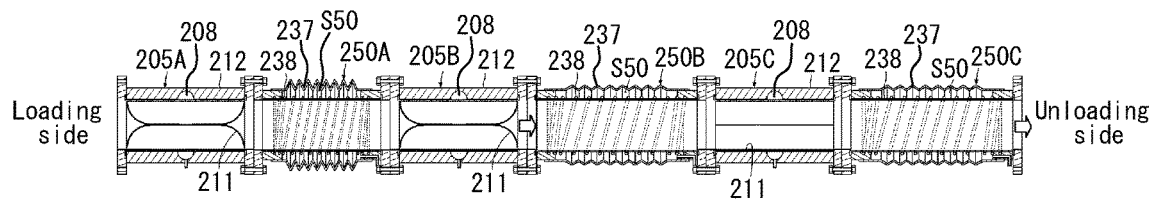
FIG. 26D is a diagram illustrating the operation of the transport apparatus.

As illustrated in FIG. 26D, next, in a state in which the expansion of the inner tube 211 of the tube unit 205A and the contraction of the resilient body 250A are maintained, the compressed air is supplied to the groove 208 of the tube unit 205B to expand the inner tube 211. This causes the transport object within the tube unit 205B to be pushed to the resilient body 250B. Then, the expansion of the inner tube 211 of the tube unit 205B causes the walls of the inner tube 211 come into contact with each other. Thus, the transport path is closed and separated into an upstream side and a downstream side.

Figure 26E:
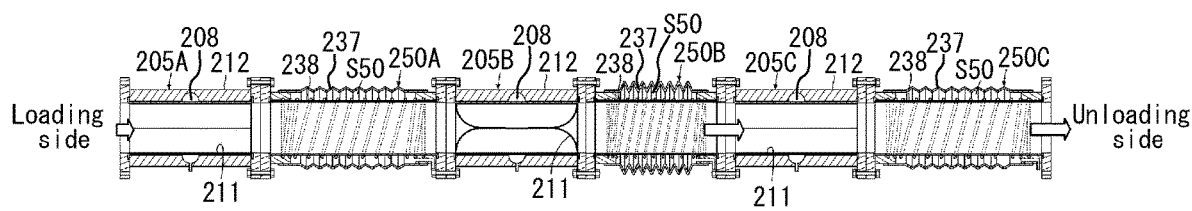
FIG. 26E is a diagram illustrating the operation of the transport apparatus.

As illustrated in FIG. 26E, next, in a state in which the expansion of the inner tube 211 of the tube unit 205B is maintained, the air is discharged from the gas chamber S50 of the resilient body 250B such that the resilient body 250B is contracted in the axial direction. The contraction of the resilient body 250B causes the inner tube 21 of the tube unit 205B being expanded to function as a wall and push the transport object to the tube unit 205C. Concurrently with the contraction of the resilient body 250B, the air is discharged from the groove 208 of the tube unit 205A being expanded such that the inner tube 211 of the tube unit 205A is contracted, and the air is supplied to the gas chamber S50 by allowing the gas chamber S50 of the resilient body 250A being contracted to communicate with the air. Thus, the resilient body 250A is extended in the axial direction. This allows a new transport object to be loaded from the tube unit 205A.

Figure 26F:
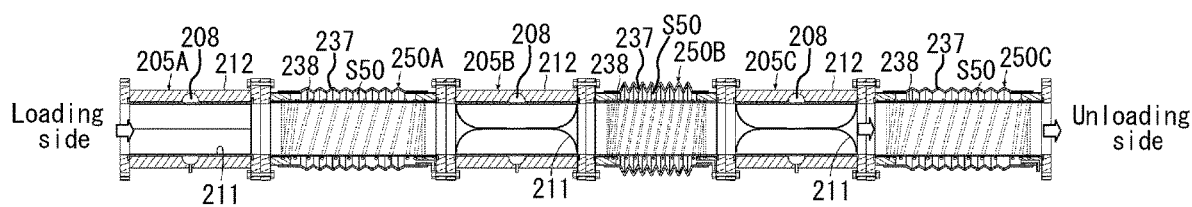
FIG. 26F is a diagram illustrating the operation of the transport apparatus.

As illustrated in FIG. 26F, next, in a state in which the expansion of the inner tube 211 of the tube unit 205B and the contraction of the resilient body 250B are maintained, the compressed air is supplied to the groove 208 of the tube unit 205C to expand the inner tube 211 of the tube unit 205C. This causes the transport object within the tube unit 205C to be pushed to the resilient body 250C. Then, due to the expansion of the inner tube 211 of the tube unit 205C, the wall surfaces of the inner tube 211 being expanded come into contact with each other. Thus, the transport path is closed and separated into an upstream side and a downstream side.

Figure 26G:
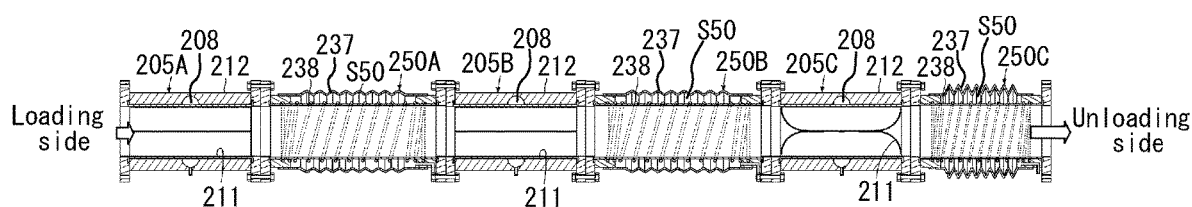
FIG. 26G is a diagram illustrating the operation of the transport apparatus.

As illustrated in FIG. 26G next, while the expansion state of the inner tube 211 of the tube unit 205C is maintained, the air is discharged from the gas chamber S50 of the resilient body 250 such that the resilient body 250C is contracted in the axial direction.

The contraction of the resilient body 250C causes the inner tube 211 of the tube unit 205C being expanded to function as a wall and push the transport object to the downstream side of the resilient body 250C. Concurrently with the contraction of the resilient body 250C, the air is discharged from the groove 208 of the tube unit 205B being expanded such that the inner tube 211 of the tube unit 205B is contracted, and the gas chamber S50 of the resilient body 250B being contracted is caused to communicate with the air such that the air is supplied to the gas chamber S50. Thus, the resilient body 250B is extended in the axial direction.

Then, in the state as illustrated in FIG. 26B, that is, in the state in which the expansion of the inner tube 211 of the tube unit 205A and the contraction of the resilient body 250A are maintained, the compressed air is supplied to the groove 208 of the tube unit 205B such that the inner tube 211 is expanded and, simultaneously, the tube unit 205C is contracted and the resilient body 250C is extended in the axial direction. By repeating the operation illustrated in FIG. 26B to FIG. 26Q the tube units 205A to 205C and the resilient bodies 250A to 250C constituting the transport path can function as a pump to transport the transport object to downstream.

Note that FIG. 26A to FIG. 26G illustrate an example of the order to expand/extend and contract the tube units 205A to 205C and the resilient bodies 250A to 250C functioning as the pump. The order can be otherwise determined as appropriate.

As illustrated in FIG. 26B, for example, when the tube unit 205A positioned on the most upstream side is expanded, all of the resilient bodies 250A to 250C positioned on the downstream side of the tube unit 205A may be contracted. When the tube unit 205B is expanded as illustrated in FIG.

26D, both of the resilient bodies 250B and 250C positioned on the downstream side of the tube unit 205B may be contracted. When the transport apparatus 202 is constituted of the resilient bodies 250A to 250C which are extended in their original states and the tube units 205A to 204C are alternately arranged as described in the present embodiment, the resilient body positioned on the downstream side of the tube units 205A to 205C being expanded is contracted. In this way, the transport object in a greater quantity can be transported downstream.

Although in the above embodiment the transport apparatus 202 is described as being constituted of the three tube units 205 and the three resilient bodies 250 alternately arranged, the number of the tube units 205 and the number of the resilient bodies 250 constituting the transport apparatus 202 are not limited thereto. The transport apparatus 202 may function as a pump for transporting a transport object when being constituted of at least one tube unit 205 and one resilient body 250.

Figure 27A:
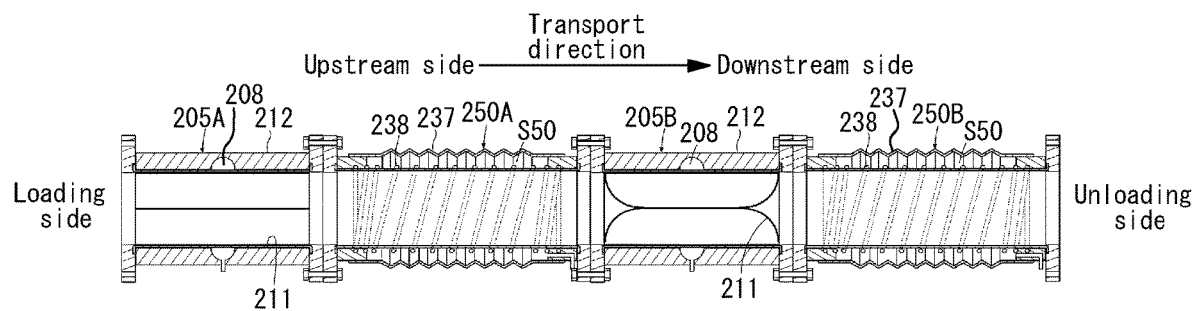
FIG. 27A is a diagram illustrating another operation of the transport apparatus.

FIG. 27A to FIG. 27E are diagrams illustrating another operation of the transport apparatus 202. Although FIG. 26A to FIG. 26G illustrate the transport operation for transporting the transport object in one direction, the stirring operation may be performed during the transportation as illustrated in FIG. 27A to FIG. 27E. FIG. 27A to FIG. 27 illustrate the tube units 205A and 205B and the resilient bodies 250A and 250B constituting the transport apparatus 202 illustrated in FIG. 26A to FIG. 26G.

As illustrated in FIG. 27A, first, the compressed air is supplied to the groove 208 of the tube unit 205B such that the inner tube 211 is expanded. This causes the transport object in the tube unit 205B to be pushed to the resilient bodies 250A and 250B. Then, the wall surfaces come into contact with each other due to the expansion of the inner tube 211 of the tube unit 205B and closes the transport path.

Figure 27B:
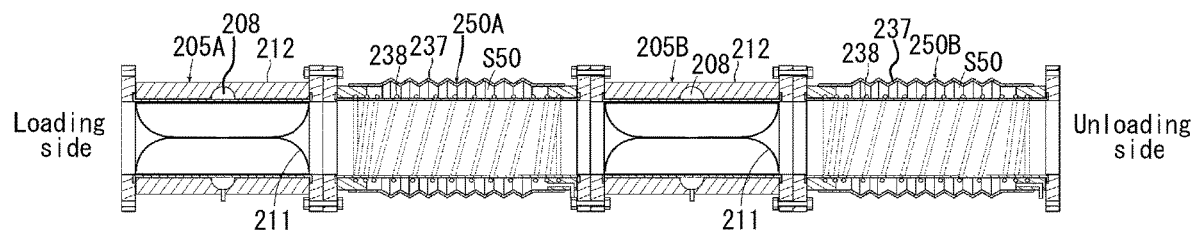
FIG. 27B is a diagram illustrating the another operation of the transport apparatus.

As illustrated in FIG. 27B, subsequently, in a state in which the expansion of the inner tube 211 of the tube unit 205B is maintained, the compressed air is supplied to the groove 208 of the tube unit 205A such that the inner tube 211 is expanded. This causes the transport object to stay between the tube unit 205A and the tube unit 205B.

Figure 27C:
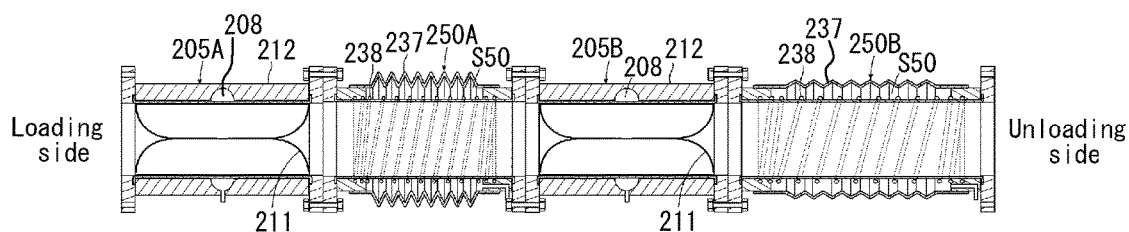
FIG. 27C is a diagram illustrating the another operation of the transport apparatus.

As illustrated in FIG. 27C, next, in a state in which the expansion of the inner tube 211 of the tube unit 205B and the expansion of the inner tube 211 of the tube unit 205A are maintained, the air is discharged from the gas chamber S50 of the resilient member 250A such that the resilient member 250A is contracted in the axial direction.

As illustrated in FIG. 27B, next, the operation to supply the air to the gas chamber S50 of the resilient body 250A in a state in which the expansion of the inner tube 211 of the tube unit 205B and the expansion of the inner tube 211 of the tube unit 205A are maintained such that the resilient body 250A is axially extended as illustrated in FIG. 27B and the operation to discharge the air from the gas chamber S50 of the resilient body 250A in a state in which the expansion of the expansion of the inner tube 211 of the tube unit 205B and the expansion of the inner tube 211 of the tube unit 205A are maintained such that the resilient body 250A is contracted in the axial direction as illustrated in FIG. 27C are repeated. In this way, the transport object is stirred between the tube unit 205A and the tube unit 205B.

Figure 27D:
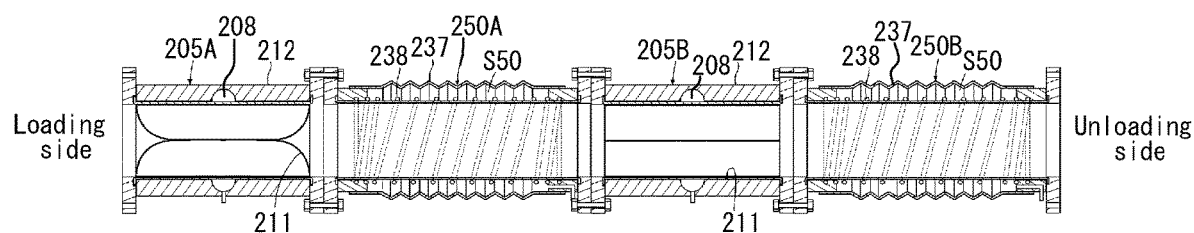
FIG. 27D is a diagram illustrating the another operation of the transport apparatus.

Then, after the stirring operation is repeated for predetermined times, the resilient body 250A is extended in the axial direction and, simultaneously, the tube unit 205B is contracted as illustrated in FIG. 27D in a state in which the expansion of the inner tube 211 of the tube unit 205A is maintained.

Figure 27E:
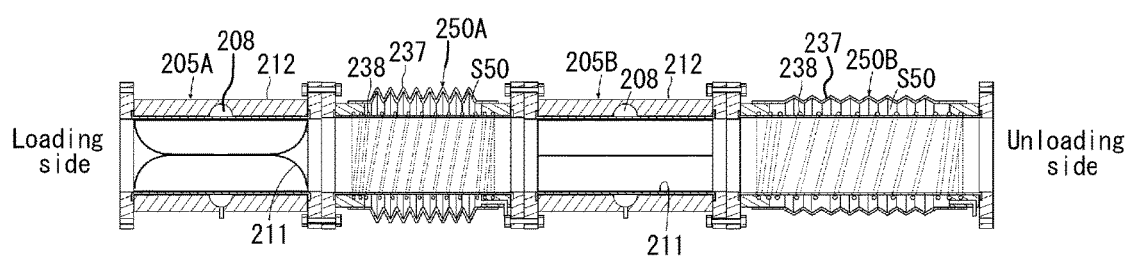
FIG. 27E is a diagram illustrating the another operation of the transport apparatus.

As illustrated in FIG. 27E, next, in a state in which the expansion of the inner tube 211 of the tube unit 205A is maintained, the air is discharged from the gas chamber S50 of the resilient body 250A such that the resilient body 250A is axially contracted. Thus, the transport object having been stirred is pushed to the tube unit 205B. Then, each of the tube unit and the resilient body is operated in the manner as illustrated in FIG. 26C to FIG. 26G Thus, the transport object can be transported downstream.

FIG. 28A to FIG. 28E are diagrams illustrating still another operation of the transport apparatus 202. In the present embodiment, the transport apparatus 202 functions as a pump for pumping a fluid such as water. The transport apparatus 202 according to the present embodiment is constituted of two tube units 205A and 205B and one resilient member 250 arranged therebetween.

Figure 28A:
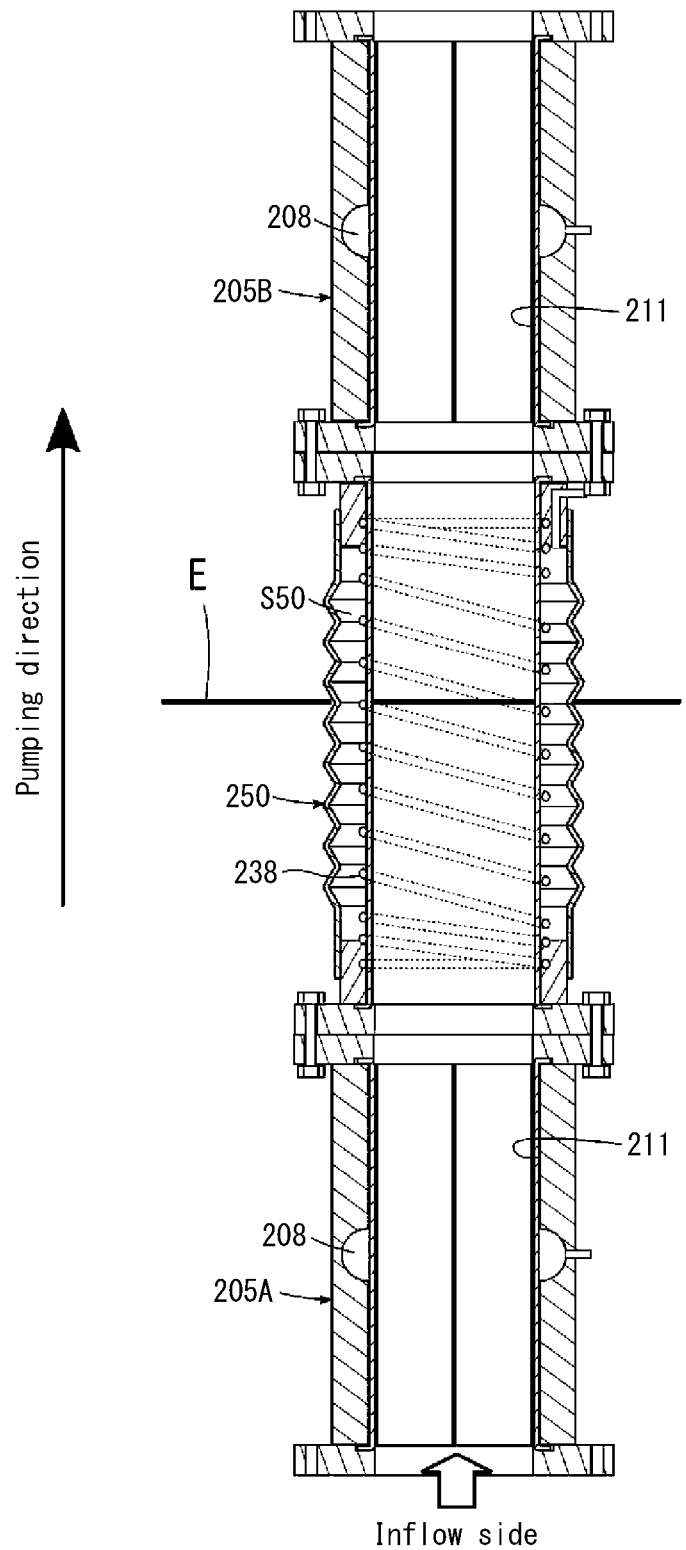
FIG. 28A is a diagram illustrating still another operation of the transport apparatus.

As illustrated in FIG. 28A, in the transport apparatus 202, the tube unit 205B is fixed by a fixing means, which is not illustrated, in such a manner that the tube unit 205A is submerged and a liquid surface E is positioned at the center of the height of the resilient body 250.

Figure 28B:
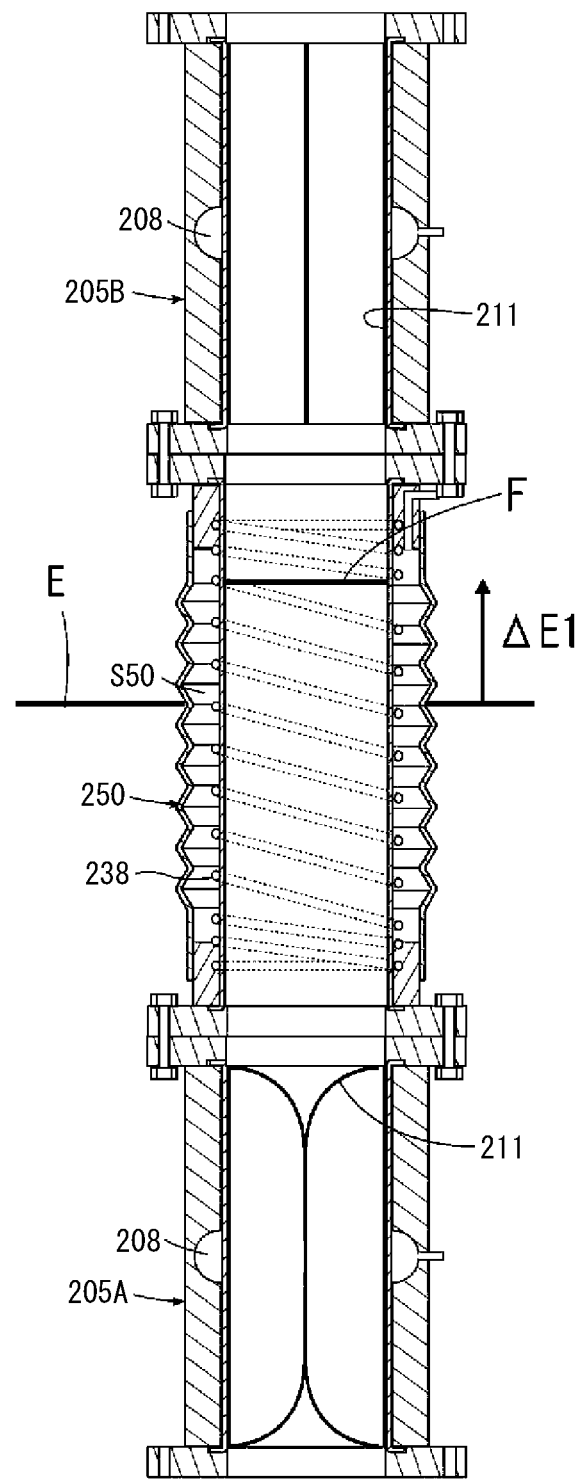
FIG. 28B is a diagram illustrating the still another operation of the transport apparatus.

As illustrated in FIG. 28B, first, the inner tube 211 of the tube unit 205A submerged under the liquid surface E is expanded. This causes the liquid surface F of the fluid taken into the transport apparatus 202 to rise by ΔE1 from the liquid surface E.

Figure 28C:
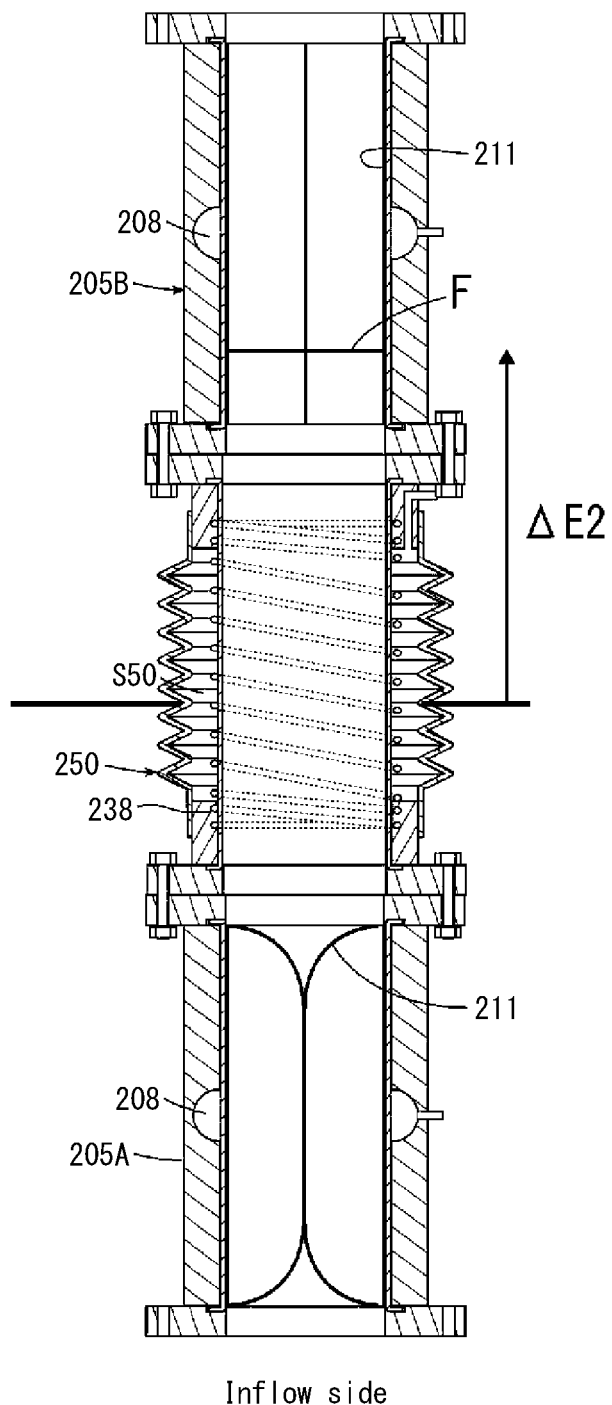
FIG. 28C is a diagram illustrating the still another operation of the transport apparatus.

As illustrated in FIG. 28C, subsequently, in a state in which the expansion of the tube unit 205A is maintained, the resilient body 250 is contracted in the axial direction. This causes the liquid surface F of the fluid within the transport apparatus 202 rises by ΔE2 from the liquid surface E.

Figure 28D:
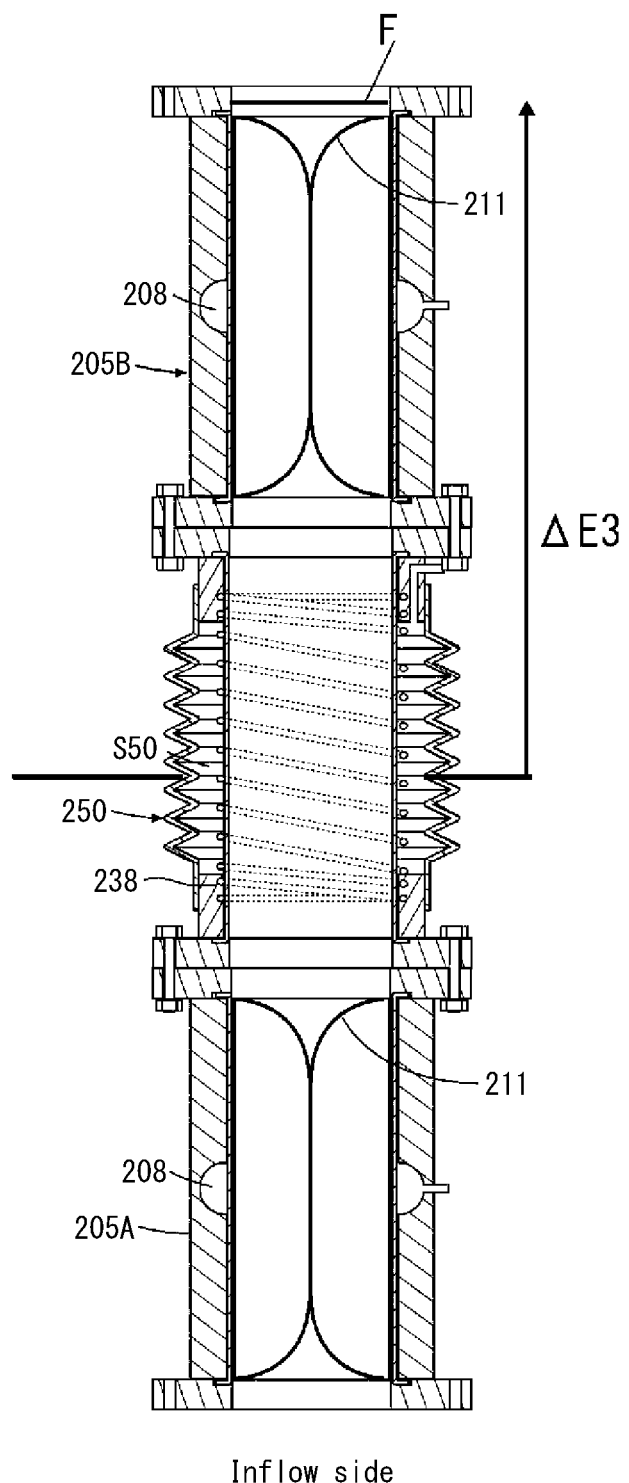
FIG. 28D is a diagram illustrating the still another operation of the transport apparatus.

As illustrated in FIG. 28D, next, in a state in which the expansion of the tube unit 205A and the contraction of the resilient body 250 are maintained, the tube unit 205B is expanded. This causes the liquid surface F of the fluid within the transport apparatus 202 to rise by ΔE3 from the liquid surface E.

Figure 28E:
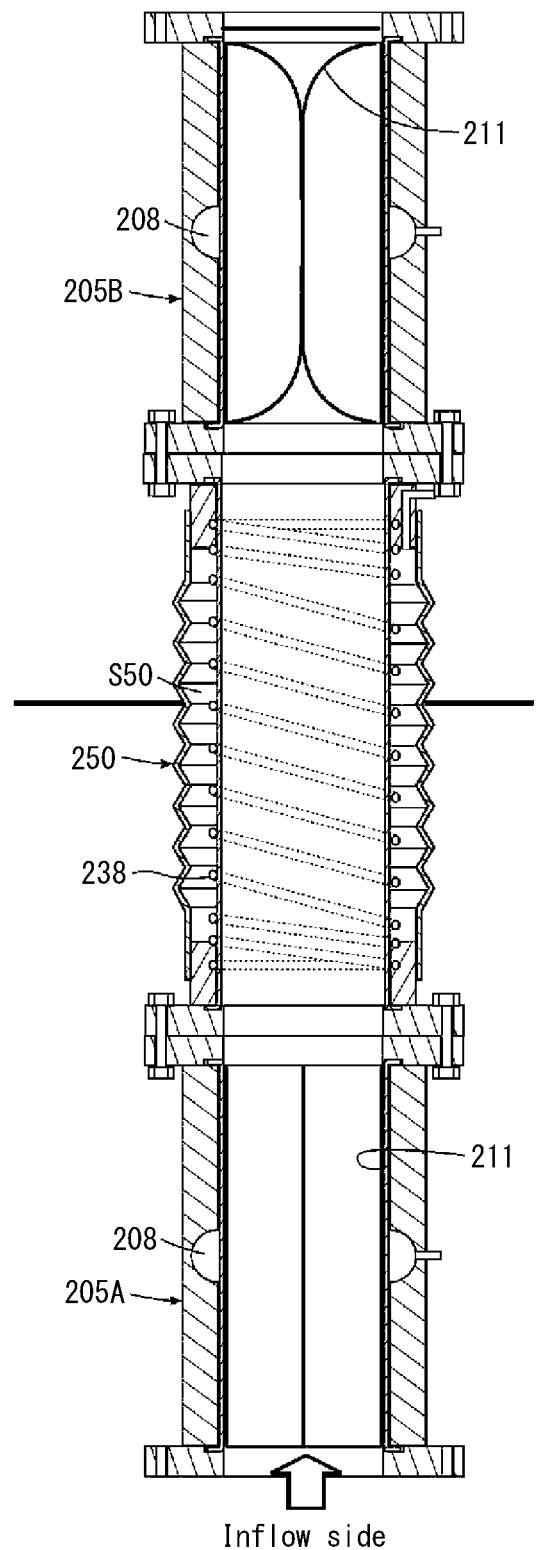
FIG. 28E is a diagram illustrating the still another operation of the transport apparatus.

As illustrated in FIG. 28E, next, in a state in which the expansion of the tube unit 205B is maintained, the tube unit 205A is contracted and, simultaneously, the resilient member 250 is extended. This causes the fluid to flow into the transport apparatus 202 from the opening of the tube unit 205A.

Figure 28F:
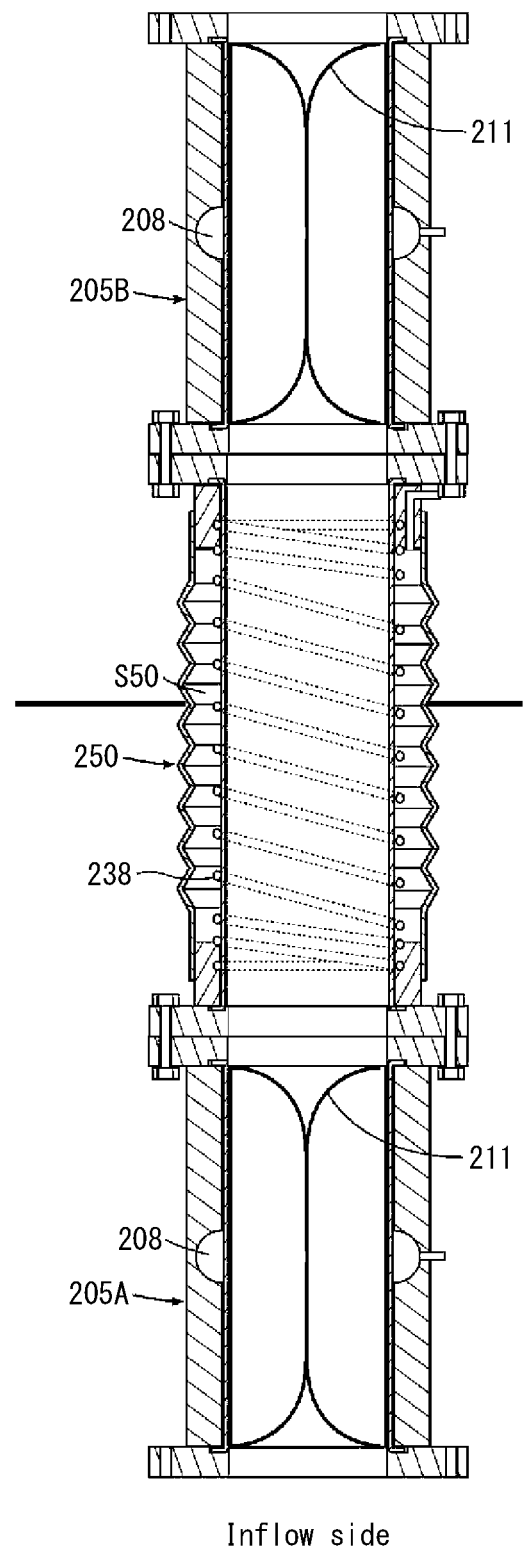
FIG. 28F is a diagram illustrating the still another operation of the transport apparatus.

As illustrated in FIG. 28F, next, in a state in which the expansion of the tube unit 205B and the extension of the resilient body 250 are maintained, the tube unit 205A is expanded.

As illustrated in FIG. 28C, then, in a state in which the expansion of the tube unit 205A is maintained, the tube unit 205B is contracted and, simultaneously, the resilient body 250 is contracted in the axial direction. This causes the fluid in the transport apparatus 202 to be pumped up above the tube unit 205B.

By repeating the operations of FIG. 28C to FIG. 28F, the fluid may be continuously pumped up. When the transport apparatus 202 functions as the pump as described above, a preprocessing such as priming necessary for conventional pumps is eliminated.

Figure 29:
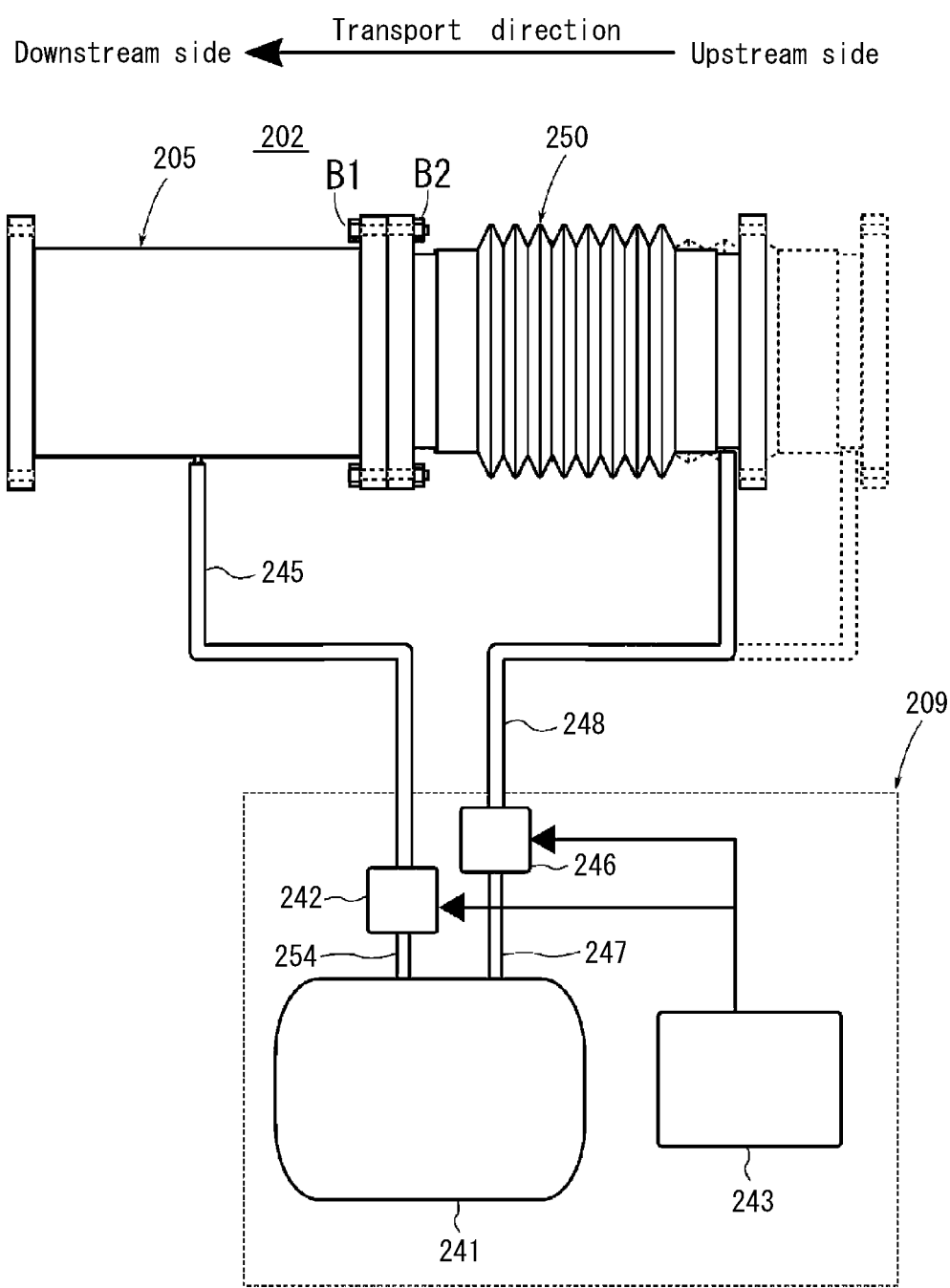
FIG. 29 is a diagram illustrating still another example configuration of the transport apparatus.

FIG. 29 is a diagram illustrating still another example configuration of the transport apparatus 202. Although the coil spring 239 constituting the inner tube 238 of the resilient body 250 has been described as being configured as the compression spring in the above embodiment, the coil spring 239 may be configured as a tension spring. That is, a spring that causes abutment in the axially inward direction so as to bring the end members 236 close to each other is used.

In this case, the driving apparatus 209 is configured as illustrated in FIG. 29. The driving apparatus 209 according to the present embodiment includes an air supply means 241 configured to store the compressed air to be supplied to the groove 208 of the tube unit 205 and the gas chamber S50 of the resilient body 250, a control valve 242 configured to control the supply and discharge of the air to and from the groove 208, a control valve 246 configured to control the supply and discharge of the air to and from the gas chamber S50, and a control unit 2430 configured to control the operations of the valves 242 and 246.

The air supply means 241 is constituted of, for example, an air compressor capable of supplying compressed air, and a tank for storing the compressed air.

The control valve 242 is coupled to the air supply means 241 via the tube 254 and to the groove 208 via the tube 245. The control valve 242 includes a supply valve for controlling the supply of the compressed air from the air supply means 241 to the groove 208, and an discharge valve for discharging the air from the grooves 208. Each of the supply valve and the discharge valve is electrically coupled to the control unit to control the supply of the compressed air from the air supply means 241 to the groove 208 or to control the air discharge from the groove 208. One set of the supply valve and the discharge valve is provided to one tube unit 205. For example, when the transport apparatus 202 is constituted of a plurality of tube units 205 coupled to one another, at least the number of sets of the supply valve and the discharge valve corresponding to the number of the tube units 205 is provided.

The control valve 246 is coupled to the air supply means 241 via a tube 247 and to the gas chamber S50 via a tube 248. The control valve 246 includes a supply valve for controlling the supply of the compressed air from the air supply means 241 to the gas chamber S50, and a discharge valve for discharging the air from the gas chamber S50. Each of the supply valve and the discharge valve is electrically coupled to the control unit to control the supply of the compressed air from the air supply means 241 to the gas chamber S50 and the air discharge from gas chamber S50. One set of the supply valve and the discharge valve is provided to one tube unit 250. For example, when the transport apparatus 202 is constituted of a plurality of resilient bodies 250 coupled to one another, at least the number of sets of the supply valve and the discharge valve corresponding to the number of the resilient bodies 250 is provided. The control unit 243 controls the operations of the supply valve and the discharge valve of the control valve 242 and the operations of the supply valve and the discharge valve of the control valve 246.

Figure 30A:
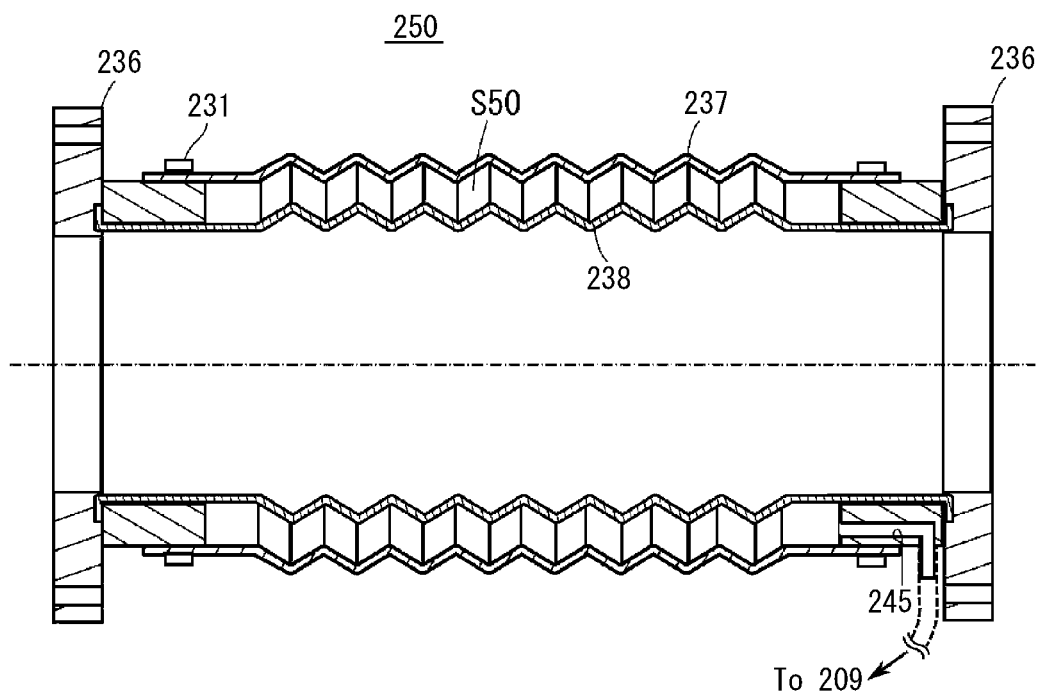
FIG. 30A is a diagram illustrating another embodiment of the resilient body.
Figure 30B:
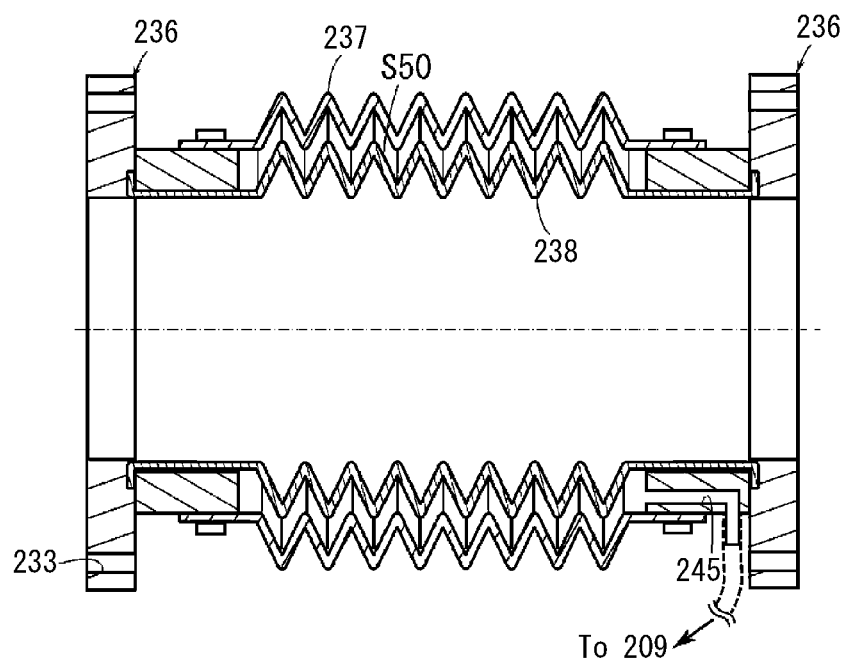
FIG. 30B is a diagram illustrating another embodiment of the resilient body.

FIG. 30A and FIG. 30B illustrate another embodiment of the resilient body 250. In the above embodiment, the inner tube 238 of the resilient body 250 is illustrated as being constituted of the coil spring 239 and the cover 244 covering the inner periphery of the coil spring 239. However, the inner tube 238 may be constituted of an axially extendable tube having a bellows, in a manner similar to the outer tube 237. In this case, by supplying and discharging the air to and from the gas chamber S50 defined by the inner tube 238 and the outer tube 237, the inner tube 238 and the outer tube 237 are axially extended and contracted in synchronization with each other. Thus, the resilient body 250 can be extended and contracted.

Figure 31A:
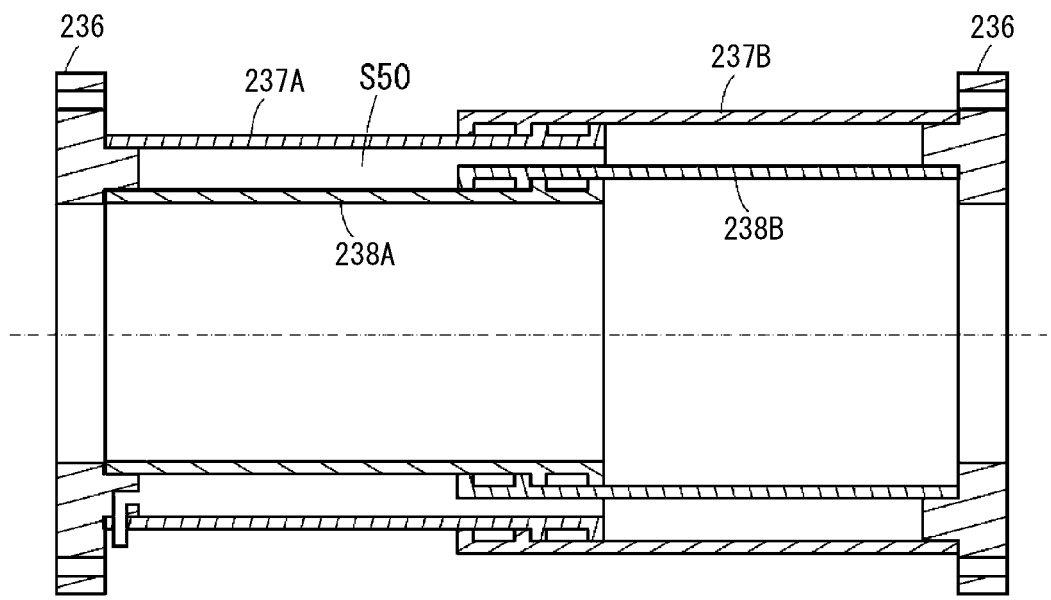
FIG. 31A is a diagram illustrating still another embodiment of the resilient body.
Figure 31B:
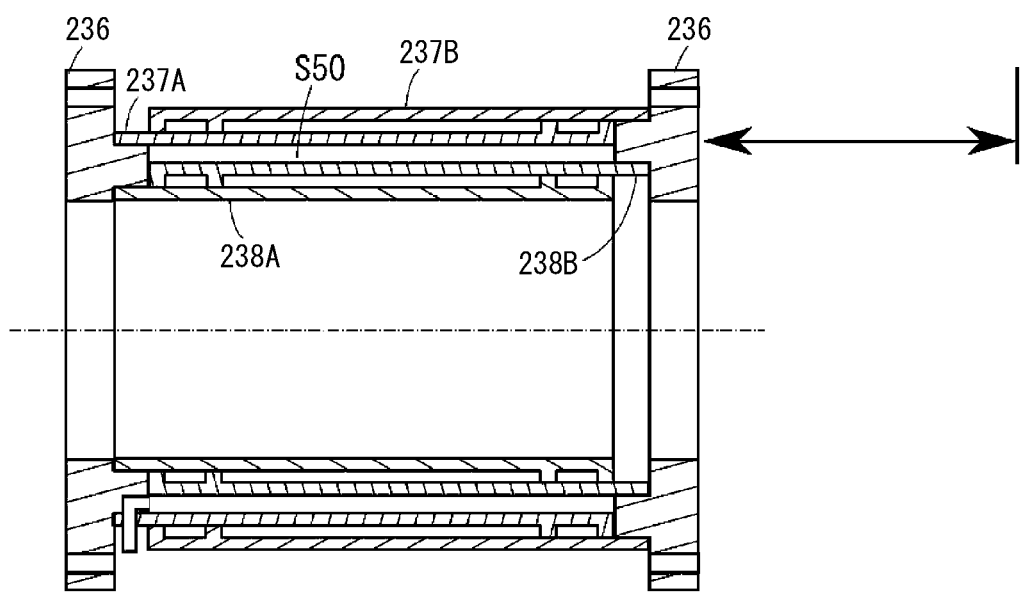
FIG. 31B is a diagram illustrating still another embodiment of the resilient body.

FIG. 31A and FIG. 31B are diagrams illustrating another embodiment of the resilient body 250. In this embodiment of the resilient body 250, the inner tube and the outer tube may be made of materials such as a metal or a hard synthetic resin that is not deformed by air pressure or the like. As illustrated in FIG. 31A and FIG. 31B, the inner tube 238 may be constituted of a pair of tubes 238A and 238B which are configured to be slidable with respect to each other and, in a manner similar to the inner tube 238, the outer tube 237 may be constituted of a pair of tubes 237A and 237B which are configured to be slidable with respect to each other. Each of the tube 238A and the tube 238B constituting the inner tube 238 maintains an air-tight state by using a sealing portion provided therebetween. Also, each of the tube 237A and the tube 237B constituting the outer tube 237 maintains an air-tight state by using a sealing portion provided therebetween. The air supplied to the gas chamber S50 defined by the inner tube 238 and the outer tube 237 changes the volume of the gas chamber S50. As a result, the inner tube 238 and the outer tube 237 move relative to each other in their axial directions, extending and contracting the resilient body 250.

Note that, also in the resilient body 250 illustrated in FIG. 30A to FIG. 30B and FIG. 31A to FIG. 31B, an abutting means such as a coil spring or a spiral spring may be provided to bring the ends 236 close to each other or separate from each other. Thus, the operation time for the extension and contraction can be reduced and the transportation efficiency can be improved.

Figure 32A:
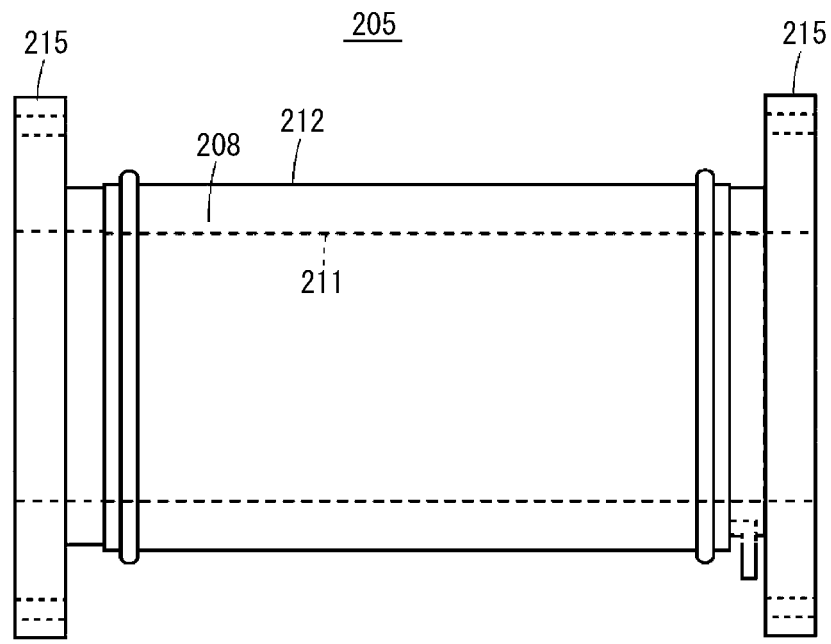
FIG. 32A is a diagram illustrating another embodiment of the tube unit.
Figure 32B:
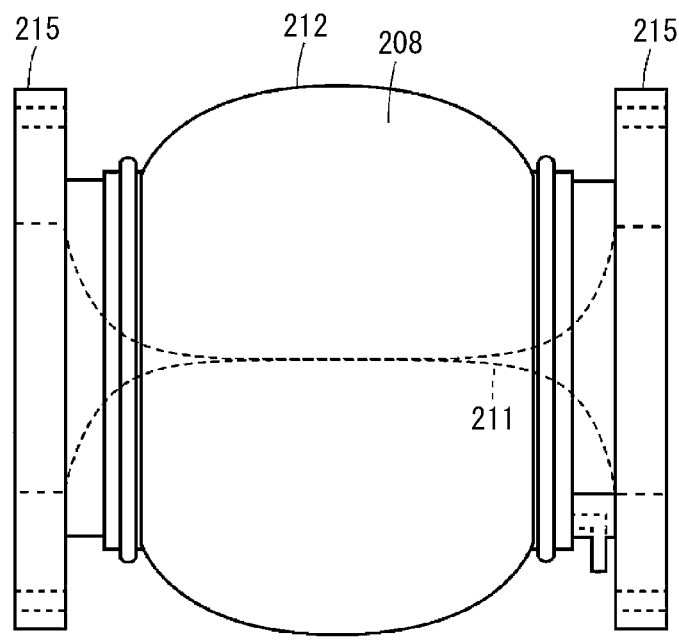
FIG. 32B is a diagram illustrating another embodiment of the tube unit.

FIG. 32A and FIG. 32B are diagrams illustrating another embodiment of the tube unit 205. In the above embodiment, the outer tube 212 of the tube unit 205 is configured as a tube made of a material such as a metal or a hard synthetic resin that is not deformed by air pressure or the like. However, the outer tube 212 may be configured as a tube made of an expandable matrix material such as a rubber or elastomer having a thickness of 0.2 to 5 mm provided with high modulus fibers such as carbon roving arranged in the axial direction. When the outer tube 212 of the tube unit 205 is configured as described above, the outer tube 212 is restricted to extend in the axial direction by the high modulus fibers and expands in the radially outward direction at the time of expansion of the inner tube 211 of the tube unit 205 in the radially inward direction. Consequently, the axial length of the tube unit 205 can be reduced.

Note that the configuration to extract and contract the tube unit 205 in the axial direction at the time of expansion of the inner tube 211 is not limited to be caused by the fiber layers that restricts the extension of the outer tune 212 in the axial extension as described above. For example, a so-called McKibben type structure in which a rubber ring is covered with fiber cords woven in a sleeve-shape for restricting the extension in the axial direction may be employed.

In each of the embodiments described above, the inner tube 211 of the tube unit 205 and the inner tube 238 of the resilient body 250 are coaxially arranged so as to arrange the tube unit 205 and the resilient body 250 in series. However, this is not restrictive. The sizes of the tube unit 205 and the resilient body 250 may be appropriately determined. Hereinafter, the transport apparatus 202 constituted of the tube unit 205 and the resilient body 250 in different sizes will be described.

Figure 33A:
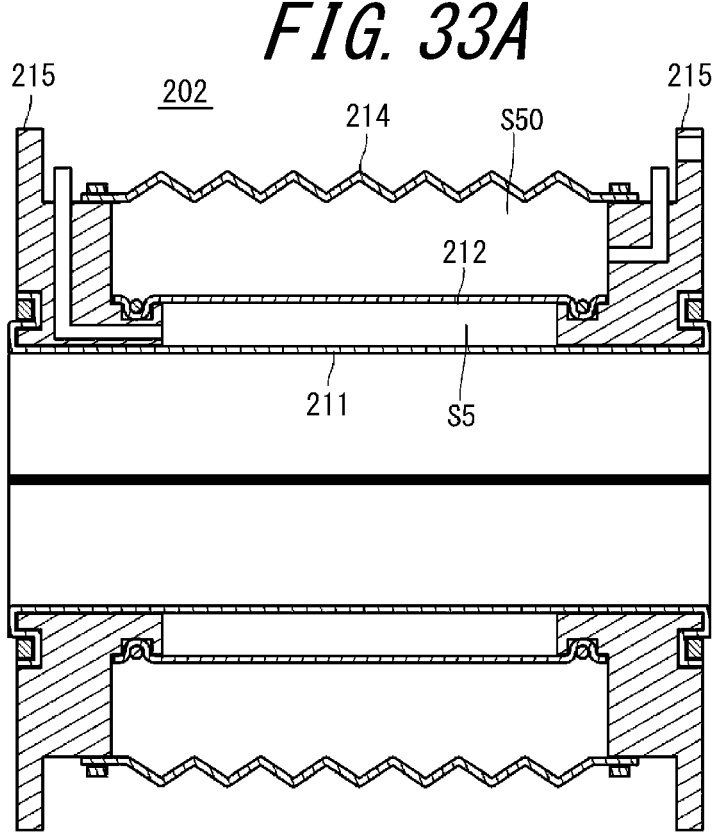
FIG. 33A is a diagram illustrating still another example configuration of the transport apparatus.
Figure 33B:
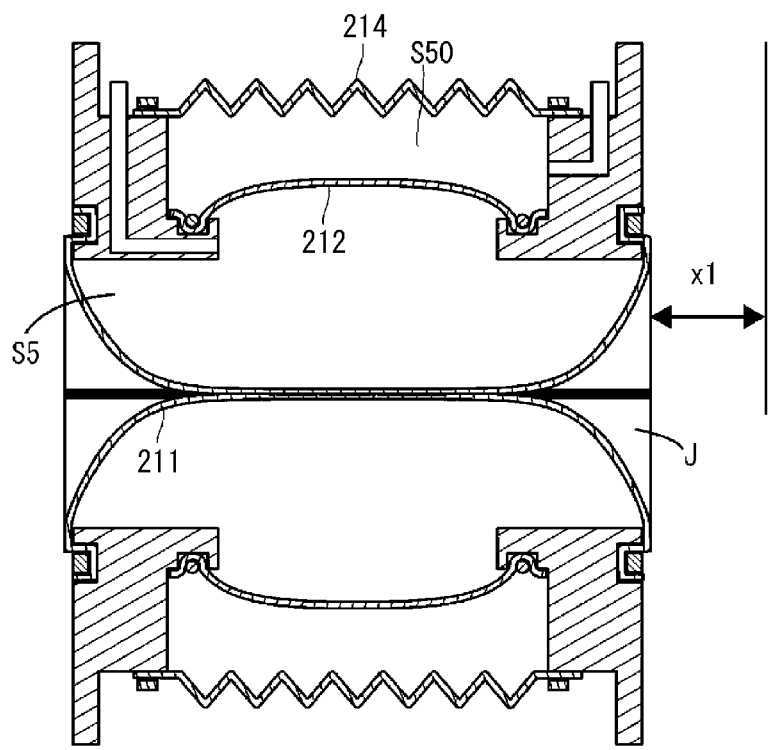
FIG. 33B is a diagram illustrating the still another example configuration of the transport apparatus.
Figure 33C:
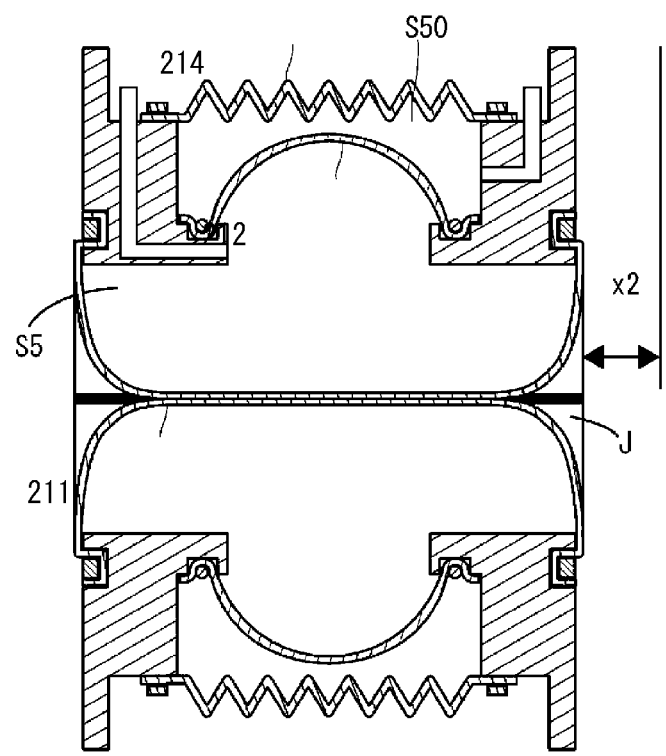
FIG. 33C is a diagram illustrating the still another example configuration of the transport apparatus.

FIG. 33A to FIG. 33C are diagrams illustrating still another configuration of the transport apparatus 202.

For example, when the tube unit 205 is configured as illustrated in FIG. 32A and FIG. 32B, the transport apparatus 202 may be configured as illustrated in FIG. 33A to FIG. 33C. In the transport apparatus 202 according to the present embodiment, the tube unit 205 is arranged on the inner peripheral side of the tube 214 that is capable of extending and contracting in the axial direction, and the ends of the tube 214 are closed by the end plates 215 constituting the tube unit 205. That is, the inner tube 211 and the outer tube 212 constitute the tube unit 205, and the outer tube 212 and the tube 214 constitute a resilient body 250'.

The transport apparatus 202 according to the present embodiment causes the expansion of the inner tube 211 by supplying the compressed air to the gas chamber (the pressurized space) S5 defined by the inner tube 211 and the outer tube 212 as illustrated in FIG. 33B, and thus is contracted in the x1-axis direction from the extended state illustrated in FIG. 33A. When the air in the gas chamber S50 defined by the outer tube 212 and the tube 214 is discharged in the state in which the expansion of the inner tube 211 is expanded, the apparatus 202 is further contracted in the x2-axis direction.

The transport apparatus 202 configured as described above can improve the expansion ratio of the inner tube 211 of the tube unit 205. The expansion ratio used herein refers to a ratio obtained by dividing the volume of the inner tube 211 in the expanded state as illustrated in FIG. 33B by a volume obtained by multiplying the axial length of the tube unit 205 when the inner tube 211 is expanded by the diameter of the inner tube 211 before being expanded as illustrated in FIG. 33A. The smaller the expansion rate, the larger the volume of the space indicated by the arrow J illustrated in the figures. That is, as the expansion ratio of the inner tube 211 of the tube unit 205 increases, the volume of the space indicated by the arrow J becomes smaller, allowing a transport object in a larger quantity in the tube unit 205 to be moved in the transport direction. Thus, the transportation efficiency of the transport object can be improved.

Note that the outer tube 212 of the tube unit 205 in the above embodiment may be configured with the outer tube 237 having the bellows as illustrated in FIG. 25A to FIG. 25, FIG. 31A and FIG. 31B, or the tubes 237A and 237B illustrated in FIG. 32A and FIG. 32B.

In another embodiment of the transport apparatus 202 that increases the expansion rate of the inner tube 211 as described above, a plurality of resilient bodies 250 having a diameter smaller than the inner tube 211 of the tube unit 205 may be coupled in parallel to one of the end plates 215 of the tube unit 205. That is, in the transport apparatus 202, a plurality of resilient bodies 250 may be arranged in parallel with the axial line of the tube unit 205 on the outer peripheral side of the tube unit 205, and the end member 236 of each of the resilient bodies 250 may be fixed to the end plate 215 constituting the tube unit 205.

In the transport apparatus 202 configured as described above, by contracting the plurality of contract bodies 250 after expanding the inner tube 211 of the tube unit 205, the expansion ratio of the inner tube 211 of the tube unit 205 can be increased, and the transportation efficiency of the transport object can be improved. Note that the resilient body 250 in this embodiment does not need to have the double-pipe structure constituted of the inner tube 238 and the outer tube 237 but may include the gas chamber S50 between an axially-extendable tube, e.g., a tube having the bellows structure, and the outer tube 212 of the tube unit 205.

Figure 34:
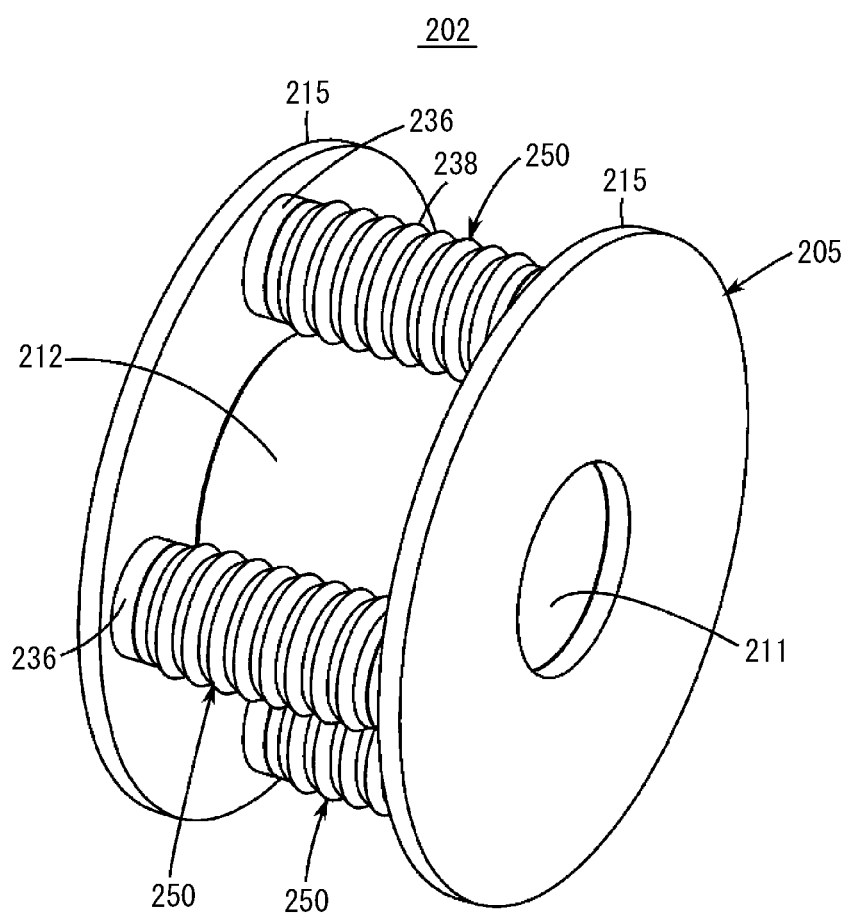
FIG. 34 is a diagram illustrating still another example configuration of the transport apparatus.

The relationship between the resilient body 250 and the tube unit 205 illustrated in FIG. 34 may be reversed. That is, the tube unit 205 may have smaller diameter than the inner tube 238 of the resilient body 250, and a plurality of tube units 205 may be coupled in parallel to one of the end members 236 of the resilient body 250.

The configuration of the transport apparatus 202 described in the above embodiments are illustrated by way of example only. The coupling order and the number of the tube units 205 and the resilient bodies 250 to be coupled together may be appropriately determined. That is, the transport apparatus 202 may have a basic configuration in which at least one tube unit 205 and one resilient body 250 are coupled together and, depending on the transport object, may be arranged between existing pipes or may replace all existing tubes, for the purpose of efficient transportation.

In the above description, the inner tube 211 of the tube unit 205 is expanded and then the resilient body 250 is axially contracted. However, this is not restrictive. The timing to expand the inner tube 211 of the tube unit 205 and the timing to contract the resilient body 250 may be appropriately determined. For example, when the transport object is a foamed liquid containing gas or powder containing air, the timings may be determined on the basis of the viscosity or the compressibility so as to, for example, "expand the expansion body and contract the bellows, simultaneously". Thus, the transportability and the mixing property can be improved.

In the above description, the gas chamber S50 is formed in the resilient body 250 and expanded and contracted by the supply and discharge of the air caused by the driving apparatus 209, which is also used for driving the tube unit 205. However, for example, the extension and contraction of the resilient body 250 may be caused in such a manner that the driving apparatus 209 supplies and discharges air to and from an air cylinder that functions as a driving means and is coupled between the end members 236.

Further, a linear driving mechanism such as a mechanical ball screw mechanism may be provided as a driving means between the end members 236, and a control apparatus configured to control the linear driving mechanism may be provided in addition to the driving apparatus 209. The control apparatus may control an advancing and retracting operation of the linear driving mechanism such that the end members 236 are moved to close to or apart from each other, causing the extension and contraction of the resilient body 250. When the resilient body 250 is mechanically extended and contracted in this manner, the resilient body 250 may be configured as a tube that can be simply extended and contracted in the axial direction, such as a tube having a bellows.

As described above, the transport apparatus 202 according to the present embodiments is suitable for the transportation of powder, a high viscosity fluid, a gas-liquid mixture, and a continuous body (a stick-like object or the like).

Further embodiments of the present disclosure have been described above with reference to FIG. 23 to FIG. 34. However, these embodiments are described merely as examples the present disclosure, and it is apparent that various modifications may be made without departing from the gist of the present disclosure. For example, in the tube units of these embodiments, the shape regulating portion or the ring according to the first to fifth embodiments may be used.

Examples

As an example of the present disclosure, a pump apparatus illustrated in FIG. 12 including the tube unit 1a illustrated in FIG. 10A to FIG. 10C was used for experimental transportation of powder. Dimensions and operating conditions of the pump apparatus were as follows:

Circumference of the inner peripheral surface of the inner tube 2a: 100.6 mm
Thickness of the inner tube 2a: 1.1 mm Axial length of the movable tube 6a (the length of one tube): 25 mm Operation period (period for supplying and discharging the pressurizing medium): 20 ms Pressurizing medium: air When the pump apparatus was operated under the above conditions, it demonstrated that an excellent transport speed of powder, i.e., 80 g/s, can be achieved. It is considered that this transportation speed was achieved by virtue of the realization of stable elastic deformation (expanding deformation) of the inner tube according to the present disclosure.

REFERENCE SIGNS LIST 1a, 1b, 1c, 1d, 1e, 1f tube unit
1A, 1B, 1C, 1D, 1E, 1F transport apparatus
2 inner tube
3 outer tube (pressurized space forming portion)
4 outer peripheral surface of inner tube
5 pressurized space
6, 26 pressurized space forming portion
7 flange (pressurized space forming portion)
8 inner member
9 outer member
10, 27 pressure controller
11 inner space
12, 28 shape regulating portion
13, 20, 22, 25, 29 contact portion
14, 15, 16, 17 protrusion
18, 23 ring
19, 24 opening
21 resilient tube
30 separating wall (pressurized space forming portion)
O1 central axis of inner tube
O2 central axis of outer tube
T tube
V check valve
101a to 101j tube unit
102a to 102j transport apparatus
103a to 103c, 103e, 103f, 103j inner tube
104a, 104b, 104d, 104f, 104h pressurized space
105a to 105c, 105f outer tube
106a to 106j movable tube
107a, 107f non-movable tube
108a circumferential groove
109a pressure controller
110f peripheral member
111f, 111g, 111i support
θ rotation angle
202 transport apparatus
205 tube unit
209 driving apparatus
211 inner tube
212 outer tube
237 outer tube
238 inner tube
250 resilient body

The invention claimed is:

1. A tube unit comprising:
an inner tube that is elastically deformable and having a tubular shape, the inner tube being configured to:
operate between: (a) a minimum pressure state in which an inner pressure of the pressurized space is minimized by discharge of a pressurizing medium, and (b) a maximum pressure state in which the inner pressure is maximized by supply of the pressurizing medium and the inner tube is deformed expanding in a radially inward direction due to an increase in the inner pressure from the minimum pressure state, whereby an inner space formed by an inner peripheral surface of the inner tube is contracted;
a pressurized shape forming portion configured to form a pressurized space in contact with an outer peripheral surface of the inner tube between the outer peripheral surface and the pressurized shape forming portion; and
a shape regulating portion that includes a contact portion that contacts the inner tube at least in the minimum pressure state and is configured to cause the contact portion to change a shape of a cross-section orthogonal to an axial direction of the inner tube from an original shape before being elastically deformed by external force into a predetermined shape.

2. The tube unit according to claim 1, wherein, at least in the minimum pressure state, a shape of a cross-section of the inner tube in a position adjacent to the contact portion in the axial direction is different from a shape of a cross-section of the inner tube in a position in contact with the contact portion.

3. The tube unit according to claim 1, wherein the inner tube originally has a cylindrical shape before being deformed by the contact portion of the shape regulation unit.

4. The tube unit according to claim 1, wherein the inner tube is made of rubber or a soft synthetic resin.

5. The tube unit according to claim 1, wherein the predetermined shape is a substantially triangular shape or a star-like shape.

6. The tube unit according to claim 1, wherein
the shape regulating portion is configured as a ring having a plate-like shape and an opening into which the inner tube is inserted, and
an outer peripheral edge of the opening includes the contact portion.

7. The tube unit according to claim 6, wherein the ring is arranged between axial ends of the inner tube in the pressurized space.

8. The tube unit according to claim 6, wherein
the ring is provided to at least one of axial ends of the inner tube in the pressurized space, and
the opening of the ring is joined to the outer peripheral surface of the inner tube over the entire circumference of the opening.

9. The tube unit according to claim 1, wherein
the pressurized space forming portion forms a plurality of pressurized spaces separated from one another,
each portion of the inner tube surrounded by the plurality of pressurized spaces is operable between the minimum pressure state and the maximum pressure state, and
the shape regulating portion includes the contact portion that contacts the each portion at least in the minimum pressure state and causes the contact portion to change the shape of the each portion from the original shape into the predetermined shape.

10. A transport apparatus comprising:
a tube unit according to claim 1; and
a pressure controller configured to control supply and discharge of the pressurizing medium to and from the pressurized space in the tube unit.

11. The transport apparatus according to claim 10, further comprising
a tubular resilient body that is coupled to the tube unit and configured to be extended and contracted in an axial direction; and
a driving means configured to extend and contract the resilient body, wherein the pressurized space forming portion of the tube unit includes an outer tube that forms the pressurized space between the outer tube and an outer peripheral surface of the inner tube.

12. The transport apparatus according to claim 11, wherein the outer tube is configured to be restricted in extending in the axial direction and to expand in a radially outward when the pressurizing medium is supplied to the pressurized space, and to be able to expand and the contract the tube unit in the axial direction.

13. The transport apparatus according to claim 11, wherein
the resilient body includes an outer tube and an inner tube arranged on an inner peripheral side of the outer tube, and
the resilient body is extended and contracted when the driving means expands and contracts the outer tube and the inner tube in synchronization in the axial direction.

14. The transport apparatus according to claim 13, wherein the resilient body includes a gas chamber defined by the outer tube and the inner tube and is expanded and contracted by supply and discharge of a fluid into and from the gas chamber.

15. The transport apparatus according to claim 11, wherein
the resilient body includes an outer tube and an inner tube arranged on an inner peripheral side of the outer tube, and
the resilient body is extended and contracted when the driving means moves the outer tube and the inner tube relative to each other in the axial direction.

\* \* \* \* \*